(12) United States Patent
Ly et al.

(10) Patent No.: US 12,363,573 B2
(45) Date of Patent: Jul. 15, 2025

(54) TRAFFIC STEERING ENHANCEMENTS FOR CELLULAR NETWORKS

(71) Applicant: CONVIDA WIRELESS, LLC, Wilmington, DE (US)

(72) Inventors: Quang Ly, Wilmington, DE (US); Michael Starsinic, Wilmington, DE (US); Hongkun Li, Wilmington, DE (US); Jiwan Ninglekhu, Wilmington, DE (US); Catalina Mladin, Wilmington, DE (US)

(73) Assignee: CONVIDA WIRELESS, LLC, Wilmington, DE (US)

( * ) Notice: Subject to any disclaimer, the term of this patent is extended or adjusted under 35 U.S.C. 154(b) by 390 days.

(21) Appl. No.: 17/759,233

(22) PCT Filed: Jan. 29, 2021

(86) PCT No.: PCT/US2021/015618
§ 371 (c)(1),
(2) Date: Jul. 21, 2022

(87) PCT Pub. No.: WO2021/155090
PCT Pub. Date: Aug. 5, 2021

(65) Prior Publication Data
US 2023/0056442 A1 Feb. 23, 2023

Related U.S. Application Data

(60) Provisional application No. 63/012,969, filed on Apr. 21, 2020, provisional application No. 62/967,125, filed on Jan. 29, 2020.

(51) Int. Cl.
*H04W 24/10* (2009.01)
*H04W 24/08* (2009.01)

(52) U.S. Cl.
CPC .......... *H04W 24/10* (2013.01); *H04W 24/08* (2013.01)

(58) Field of Classification Search
CPC ...... H04W 24/08; H04W 24/04; H04W 24/10
See application file for complete search history.

(56) References Cited

U.S. PATENT DOCUMENTS

| 2012/0064873 A1* | 3/2012 | Farnsworth | H04W 24/10 |
| | | | 455/418 |
| 2017/0048739 A1* | 2/2017 | Jeong | H04W 88/06 |

(Continued)

FOREIGN PATENT DOCUMENTS

WO 2020/014214 A1 1/2020

OTHER PUBLICATIONS

International Search Report and Written Opinion of PCT Application No. PCT/US2021/015618, issued on May 25, 2021, 11 pages of ISRWO.

*Primary Examiner* — Abdullahi E Salad
(74) *Attorney, Agent, or Firm* — CHIP LAW GROUP

(57) ABSTRACT

Methods, systems, and devices may assist in enhancements to PMF protocol and new ATSSS steering modes to enable support for analytics driven or multi-USIM steering. The following functionalities are disclosed: 1) Enable UEs to use the PMF protocol to provide UE specific data to the NWDAF for analytics purposes; 2) Enable multi-USIM UEs to notify the core network over the user plane of the UE's desire to pause communications with the CN associated with one USIM so the UE can communicate with the CN associated with another USIM; 3) Define new ATSSS steering modes to support data analytics driven steering; and 4) Define new ATSSS steering modes to support Multi-USIM steering, among other things.

20 Claims, 25 Drawing Sheets

(56) References Cited

U.S. PATENT DOCUMENTS

2019/0297515 A1* 9/2019 Futaki ................... H04W 24/10
2020/0112868 A1* 4/2020 Shariat ................. H04W 48/17
2021/0314795 A1* 10/2021 Li ..................... H04W 28/0231

* cited by examiner

TRAFFIC STEERING ENHANCEMENTS FOR CELLULAR NETWORKS

CROSS REFERENCE TO RELATED APPLICATIONS

This application is a U.S. National Phase of International Patent Application No. PCT/US2021/015618 filed on Jan. 29, 2021, which claims priority benefit of U.S. Provisional Application No. 63/012,969 filed on Apr. 21, 2020 and U.S. Provisional Application No. 62/967,125 filed on Jan. 29, 2020 in the United States Patent and Trademark Office. Each of the above-referenced applications is hereby incorporated herein by reference in its entirety.

BACKGROUND

5G System Architecture

FIG. 1 shows the 3GPP 5G non-roaming system architecture where various entities interact with each other over the indicated reference points. A user Equipment (UE) may communicate with a Core Network (CN) to establish control signaling and enable the UE to use services from the network. Examples of control signaling functions are: registration, connection and mobility management, authentication and authorization, session management, etc.

The following descriptions highlight some of the Network Functions (NFs) from FIG. 1 that are involved with control signalling:

Access and Mobility Function (AMF): The UE sends an N1 message through the RAN node to the AMF to perform many control plane signaling such as registration, connection management, mobility management, access authentication and authorization, etc.

Session Management Function (SMF): The SMF is responsible for session management involved with establishing PDU sessions to allow UEs to send data to Data Networks (DNs) such as the internet or to an application server and other session management related functions.

Policy and Control Function (PCF): The PCF provides the policy framework that governs network behavior, accesses subscription information to make policy decisions, etc.

Authentication Server Function (AUSF): The AUSF supports authentication of UEs for 3GPP and untrusted non-3GPP accesses.

Unified Data Management (UDM): The UDM supports generation of 3GPP AKA Authentication Credentials, user identification handling, subscription management, etc.

Network Slice Selection Function (NSSF): The NSSF is involved with aspects of network slice management such as selection of network slice instances for UEs, management of NSSAIs, etc.

Radio Access Network (RAN): The RAN node offers communication access from the UE to the core network for both control plane and user plane communications.

Access Traffic Steering, Switching, Splitting

Cellular systems already have support for UE connectivity to both 3GPP access and non-3GPP access such as wi-fi. However, until Rel-16, a data flow could only utilize either 3GPP access or non-3GPP access at any instance in time but not both simultaneously in a standardize way. As mobile data traffic increases, network operators are seeking ways to balance that data traffic between the two accesses to maintain quality of service while also being transparent to the user. With the increasing ubiquity of wi-fi networks, operators can leverage their resources by offloading data traffic from mobile networks to wi-fi networks more dynamically, especially for indoor scenarios where mobile coverage tends to degrade. This would improve the user experience, especially for newer use cases introduced for 5G systems, such as real time video streaming, virtual or augmented reality, gaming, etc.

FIG. 2 shows the 5G architectural support for the Access Traffic Steering, Switching, Splitting (ATSSS) feature in Rel-16. This feature allows both the UE and the CN to steer, switch, and split traffic between 3GPP and non-3GPP accesses. In other words, the UE uses ATSSS rules to determine whether to send UL data over 3GPP access or over non-3GPP access, or over both accesses. Similarly, the UPF in the CN uses N4 rules to route DL data to the UE over 3GPP or non-3GPP access, or over both accesses. The ATSSS and N4 rules are created by the SMF and provided to the UE and UPF respectively during MA PDU session establishment procedure. An MA PDU session is defined in 3GPP TS 23.501, System Architecture for the 5G System; Stage 2, V16.2.0 (2019-09) (hereinafter [1]) as "a PDU session that provides PDU session connectivity service, which can use one access network at a time, or simultaneously one 3GPP access network and one non-3GPP access network."

FIG. 3 shows a UE-requested PDU session establishment procedure. A PDU session is used to transfer UL or DL data between a UE and a Data Network (DN) through the user plane (UP) of the CN.

The MA PDU session establishment procedure is based on the PDU Session Establishment procedure shown in FIG. 3 with the following differences (from 3GPP TS 23.502, Procedures for the 5G System; Stage 2, V16.2.0 (2019-09)—hereinafter [2]).

The PDU Session Establishment Request message may be sent over the 3GPP access or over the non-3GPP access. In the steps below, it is assumed that it is sent over the 3GPP access.

In step 1, the UE provides a "MA PDU Request" indication in UL NAS Transport message and an ATSSS Capability (e.g. an "MPTCP Capability" or an "ATSSS-LL Capability"), as defined in TS 23.501, clause 5.32.2 (Multi Access PDU Sessions) in PDU Session Establishment Request message.

In step 2, if the AMF supports MA PDU sessions, then the AMF selects an SMF, which supports MA PDU sessions.

In step 3, the AMF informs the SMF that the request is for a MA PDU Session (e.g., it includes an "MA PDU Request" indication) and, in addition, it indicates to SMF whether the UE is registered over both accesses.

In step 7, the SMF sends an "MA PDU Request" indication to the PCF in the SM Policy Control Create message. The PCF decides whether the MA PDU session is allowed or not based on operator policy and subscription data.

The PCF provides PCC rules for the MA PDU session, e.g., PCC rules that include ATSSS policy control information, as specified in 3GPP TS 23.503, Policy and Charging Control Framework for the 5G System; Stage 2, V16.2.0 (2019-09) (hereinafter [3]). From the received PCC rules, the SMF derives (a) ATSSS rules, which will be sent to UE for controlling the traffic steering, switching and splitting in the uplink direction, and (b) N4 rules, which will be sent to UPF for controlling the traffic steering, switching and splitting in the downlink direction. If the UE indicates the support of "ATSSS-LL Capability", the SMF may derive the Measurement Assistance Information.

In the remaining steps of FIG. 3, the SMF establishes the user-plane resources over the 3GPP access, e.g., over the access where the PDU Session Establishment Request was sent on:

In step 10, the N4 rules derived by SMF for the MA PDU session are sent to UPF and two N3 UL CN tunnels info are allocated by the SMF or by the UPF. If the ATSSS Capability for the MA PDU Session indicates "ATSSS-LL Capability", the SMF may include information for measurement into the N4 rule to instruct the UPF to initiate performance measurement for this MA PDU Session. In step 10a, the UPF allocates addressing information for the Performance Measurement Function (PMF) in the UPF. In step 10b, the UPF sends the addressing information for the PMF in the UPF to the SMF.

In step 11, for the MA PDU session, the SMF includes an "MA PDU session Accepted" indication in the Namf_Communication_N1N2MessageTransfer message to the AMF. The AMF marks this PDU session as MA PDU session based on the received "MA PDU session Accepted" indication.

In step 13, the UE receives a PDU Session Establishment Accept message, which indicates to UE that the requested MA PDU session was successfully established. This message includes the ATSSS rules for the MA PDU session, which were derived by SMF. If the ATSSS Capability for the MA PDU Session indicates "ATSSS-LL Capability", the SMF may include the addressing information of PMF in the UPF into the Measurement Assistance Information.

After step 18, if the SMF was informed in step 2 that the UE is registered over both accesses, then the SMF initiates the establishment of user-plane resources over non-3GPP access too. The SMF sends an N1N2 Message Transfer to AMF including N2 SM Information and indicates to AMF that the N2 SM Information should be sent over non-3GPP access. The N1N2 Message Transfer does not include an N1 SM Container for the UE because this was sent to UE in step 13. After this step, the two N3 tunnels between the PSA and RAN/AN are established.

When creating an MA PDU session, a UE specifies the steering functionality that it supports, whether it is ATSSS-LL or MPTCP, or both. The steering functionality determines how data traffic is sent along the protocol stack of the UE 201. FIG. 4 shows an example of a UE model with both the ATSSS-LL and MPTCP steering functionalities. The ATSSS-LL is a lower layer steering function that supports all traffic types, such as TCP, UDP, Ethernet, etc. The MPTCP steering functionality, on the other hand, is a higher layer steering function that supports the MPTCP protocol.

A steering mode is specified in each ATSSS rule to inform the UE how to distribute UL traffic over 3GPP and non-3GPP accesses. The following steering modes are currently defined in [1].

Active-Standby: It is used to steer a SDF on one access (the Active access), when this access is available, and to switch the SDF to the available other access (the Standby access), when Active access becomes unavailable. When the Active access becomes available again, the SDF is switched back to this access. If the Standby access is not defined, then the SDF is only allowed on the Active access and cannot be transferred on another access.

Smallest Delay: It is used to steer a SDF to the access that is determined to have the smallest Round-Trip Time (RTT). As defined in clause 5.32.5, measurements may be obtained by the UE and UPF to determine the RTT over 3GPP access and over non-3GPP access. In addition, if one access becomes unavailable, all SDF traffic is switched to the other available access, if allowed by the PCC rules (as specified in clause 5.32.4).

Load-Balancing: It is used to split a SDF across both accesses if both accesses are available. It includes the percentage of the SDF traffic that should be sent over 3GPP access and over non-3GPP access. Load-Balancing is only applicable to non-GBR QoS flow. In addition, if one access becomes unavailable, all SDF traffic is switched to the other available access, as if the percentage of the SDF traffic transported via the available access was 100%.

Priority-based: It is used to steer all the traffic of an SDF to the high priority access, until this access is determined to be congested. In this case, the traffic of the SDF is sent also to the low priority access, e.g., the SDF traffic is split over the two accesses. In addition, when the high priority access becomes unavailable, all SDF traffic is switched to the low priority access. How UE and UPF determine when a congestion occurs on an access is implementation dependent.

To support the ATSSS feature, access network performance measurements are obtained by both the UE and the UPF. A Performance Measurement Function (PMF) exists in the UE and the UPF to obtain these measurements. The performance measurements are sent over the PMF protocol between the PMFs in the UE and the UPF when using ATSSS-LL. For MPTCP steering function, the MPTCP protocol provides the Round-Trip Time (RTT) measurement. For ATSSS-LL, the RTT measurement is obtained from Echo request/response messaging between the PMFs of the UE and the UPF. Currently, the performance measurements consist of an availability report and the RTT measurement. The availability report specifies whether an access is available for traffic steering and the RTT measurement provides the time a request-response message pair takes to traverse the access network.

The 3GPP FS_ATSSS_Ph2 SID (SP-190558, Study on Access Traffic Steering, Switch, and Splitting support in the 5G system architecture Phase 2; SP #84 (2019-06)— hereinafter [5]) has identified that although ATSSS support was added to Rel-16, there are still certain aspects from the initial scope that are still not supported. As a result, the SID discloses to continue the study to add support for these aspects of the ATSSS feature. Some of the objectives of the SID are listed below for convenience:

Whether and how to support traffic splitting for GBR traffic.

Whether and how to support additional steering mode(s)

Whether and how to support additional steering methods (s)

Whether additional measurements of the performance of both paths of a multi-access PDU session are needed to better support existing and newly defined steering modes and how such measurements may be performed, e.g. by extensions of the performance monitoring function.

Whether and how to improve the performance measurement mechanisms (e.g. other than Echo Request/Echo Response), that can minimize the UE battery consumption and can reduce the overhead traffic between the UE and UPF.

Whether and how to support ATSSS for the roaming scenarios which are not supported in Rel-16.

Whether and how to support further differentiation of 3GPP accesses within the ATSSS rules and to improve ATSSS rules with conditions related with access quality.

Whether and how to support multi-access PDU session with one access leg over EPC and the other access leg over non-3GPP access 5GS.

Whether and how a UE, under both 3GPP and non-3GPP coverage, can switch traffic from one access to another access based on various conditions, e.g. access quality conditions.

Whether and how to support routing traffic to a secondary PDU Session anchor (using a UPF acting as a UL-CL/ Branching point) for multi-access PDU Sessions Network Data Analytics Function The Network Data Analytics Function (NWDAF) provides data analytics services to different Network Functions (NFs) over the Nnf interface as shown in FIG. 5. The NWDAF can requests subscription to collect data from NFs over the Nnf interface based on a particular context. In addition to the NFs, the NWDAF also provides data analytics services for OAM systems. The entities the NWDAF interfaces to are: AMF, SMF, PCF, UDM, AF (directly or via NEF), and OAM.

Some of the data the NWDAF collects pertain to loading information such as within network slice instance(s), within specific NF, and within an area of interest. However, other data that NWDAF collects pertains to UE centric information, such as service experience of a UE, UE mobility, UE communication, user data congestion, and QoS statistics. The NWDAF collects these data from the corresponding NFs and OAM, performs analytics on the data, and makes the analytics available to NFs and the OAM system.

There is ongoing work in the 3GPP FS_eNA_Ph2 (SP-190557, Study on Enablers for Network Automation for 5G—phase 2; SP #84 (2019-06)— hereinafter [6]) study to investigate further enhancements to NWDAF. One key issue that hasn't been addressed in Rel-16 is how NWDAF can collect data from UEs for analytics. The questions raised from this key issue from 3GPP TR 23.791, Study of Enablers for Network Automation for 5G; SP #84 (2019-06) (hereinafter [7]) are listed below for convenience.

What type of information from the UE could be collected by the network (e.g., NWDAF) as input for analytics generation?

What types of analytics information could be provided by NWDAF to other NFs to leverage the data provided by the UE?

How frequently such data provided by the UE are to be shared with the NWDAF?

What are the triggers for the UE to provide data to the NWDAF as input for analytics?

How to ensure the integrity and Operator-level accessibility of UE-provided information in order to avoid using misleading or untrusted information in the network?

Whether there are privacy aspects that need to be considered, e.g., related to the information provided by the UE? If so, how to ensure privacy on collection and utilisation of UE data?

How the NWDAF collects the UE's information (the method of collection of data)? Multi-USIM SID The 3GPP FS_MUSIM study (3GPP SP-190248, Study on system enablers for multi-USIM devices; SP #83 (2019-03)—hereinafter [8]) identified a need for 3GPP to standardize operations for devices with multiple USIMs. According to [8], "support for multi-USIM is currently handled in an implementation-specific manner without any support from 3GPP specifications, resulting in a variety of implementations and UE behaviours. For cost efficiency reasons, a multi-USIM device implementation typically uses common radio and baseband components that are shared among the multiple USIMs, which can lead to several issues that impact the 3GPP system performance." The study further describes issues with paging collisions between USIMs in such an implementation.

Some identified objectives in [8] are listed below for convenience.

A mechanism for delivering paging destined to USIM A while the UE is actively communicating with USIM B.

A mechanism allowing for suspension (or release) and resumption of an ongoing connection in the 3GPP system associated with USIM A, so that the UE can temporarily leave to the 3GPP system associated with USIM B, and then return to the 3GPP system in a network-controlled manner. The study shall determine how the network handles MT data or MT control-plane activity occurrence on a suspended connection.

A mechanism for avoidance of paging collisions occurring in the UE between USIM A and USIM B.

This background information is provided to reveal information believed by the applicant to be of possible relevance. No admission is necessarily intended, nor should be construed, that any of the preceding information constitutes prior art.

SUMMARY

The ATSSS, eNA, and MUSIM work, which may be found in 3GPP, provides potential synergies with each other. For example, a PMF in the ATSSS feature may be utilized for UEs to provide data to the NWDAF in the eNA work for analytics purposes. In addition, the PMF may also assist multi-USIM UEs to notify a network of one USIM to pause communications while the UE communicates with a network of another USIM. Furthermore, new ATSSS steering modes may be introduced to enable support for analytics driven or multi-USIM steering. The following functionalities are disclosed: 1) Enable UEs to use the PMF protocol via the user plane to provide UE specific data to the NWDAF for analytics purposes; 2) Enable multi-USIM UEs to notify the network over the user plane of the UE's desire to pause communications with the network associated with one USIM so the UE can communicate with the network associated with another USIM; 3) Define new ATSSS steering modes to support data analytics driven steering; and 4) Define new ATSSS steering modes to support Multi-USIM steering, among other things.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Use Case 1

Figure 6:
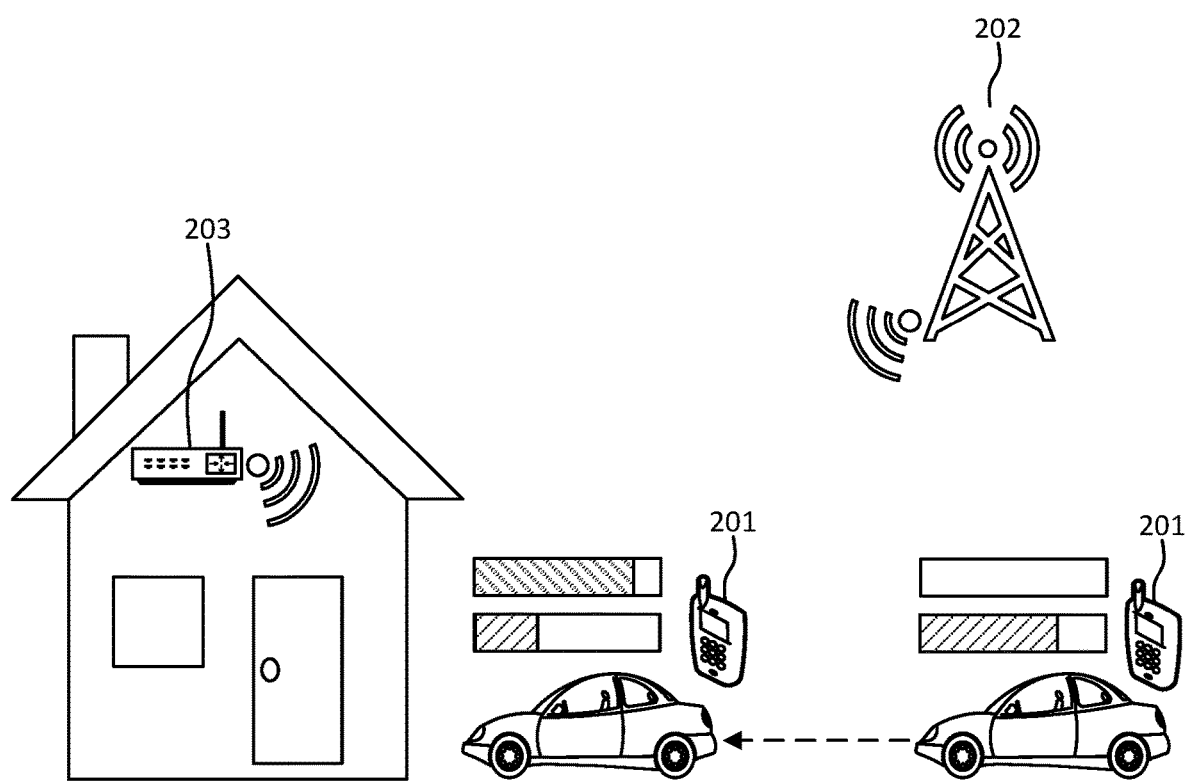
FIG. 6 illustrates an exemplary Road Trip Use Case.

A use case that displays a potential benefit of the ATSSS feature can be found in a road trip use case shown in FIG. 6. In this scenario, a family may be travelling to their grandparent's house for the holidays. During the commute, the kids may be watching different videos that are streamed onto their respective phones (e.g., UE 201) using cellular access (e.g., connect with RAN base station 202). When the family arrives at the grandparent's house, UE 201 may switch to use both wi-fi (e.g., connect with wireless local area network (WLAN) base station 203) and cellular accesses to avoid interrupting the videos. Once inside the house, UE 201 may switch to using wi-fi only, but soon thereafter congestion may occur on the wi-fi network as more devices connect to it. UE 201 may then transparently and dynamically switch back and forth between RAN base station 202 and WLAN base station 203 to avoid interrupting the videos (e.g., the switching would not be readily perceptible to the user). With the ATSSS feature, UE 201, one or more devices of the WLAN, or one or more devices of the RAN may dynamically monitor network connections and determine how best to steer traffic between the cellular access (e.g., RAN base station 202) and wi-fi accesses (e.g., WLAN base station 203) to provide a favorable user experience, such as reduced latency, reduced data bandwidth, or increased connectivity and therefore reliability of a connection, etc. that meet certain thresholds. Use Case 2

UE 201 data may help the network (e.g., a one or more network devices) make decisions to optimize the overall 5G system. For example, location data for UE 201 may help recognize UE crowd in various geographic sectors and hence help network adjust and optimize resources accordingly. Shared UE capabilities data from UEs 201 may allow network to identify the nature of data and interfaces among UEs 201 so that data can be transferred efficiently among UEs 201 and across the networks. Having various UE data may help the network identify if UE 201 is vulnerable and the network may be able to protect it. UE data may also help identify if UE 201 is a threat to the network and mitigate a wider risk of cyberattack. Collective data from the UEs may help the network to identify wider problems and user social behavior etc. Hence, having UE data may help the network manage UEs 201 collectively so that the most efficient and optimal service may be provided. Furthermore, data collected from a UE 201 may help the network to offer value added services to the UE 201.

Data driven security is one of the most recent techniques in computer security, which constitutes data collection from various points in the network and analysis of the collected data. The analysis of the data has proven to help identify cyber threat, nature of cyber-attack and degree of risks with significant probability, which otherwise wouldn't have been possible. Hence collection of data may be a significant step in identifying potential cyber risks.

Figure 7:
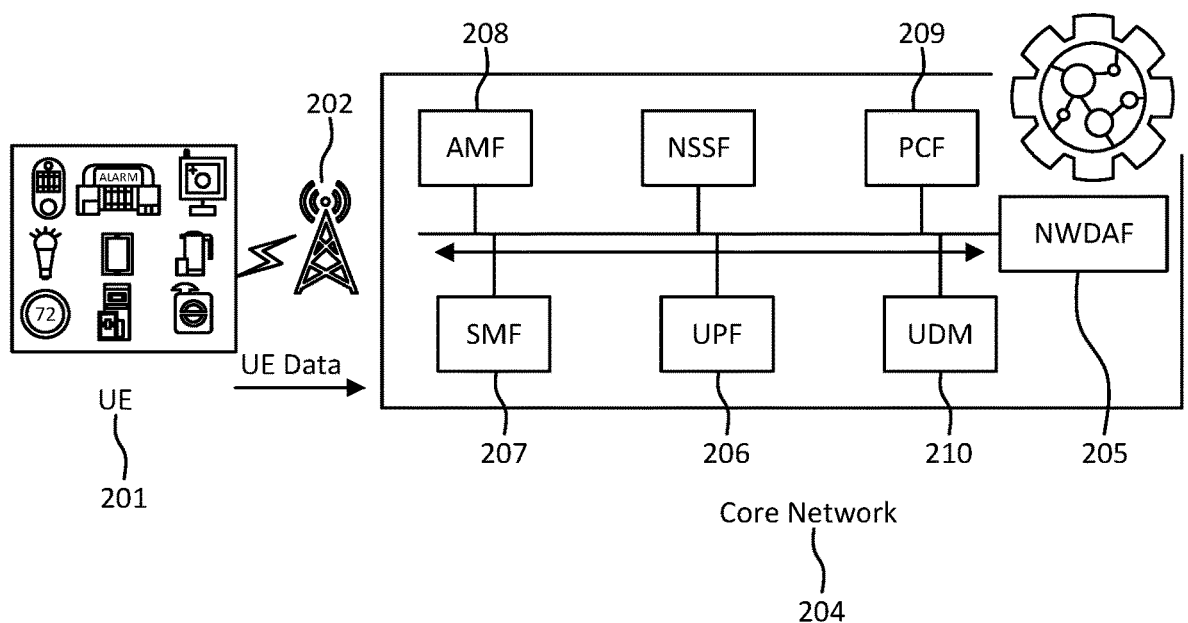
FIG. 7 illustrate an exemplary NWDAF data analytics from the UE data and other NF data.

FIG. 7 illustrates an exemplary system that may use NWDAF for analysis. Since, cyberattacks may occur in unfamiliar ways and may be significantly difficult to detect, data analysis can offer the administrator a probability of early detection of attacks. In a 5G system cyber-attacks as well as potential cyber-attack risks may be effectively detected by monitoring events and gathering data from UE 201 and network with the help of tools such as machine learning (ML) algorithms, rule-based reasoning or graph-based analysis in NWDAF 205. Some examples of cyber-attacks include distributed denial of service (DDoS), replay attacks, a hijacked UE 201, denial of UE connectivity, etc. Furthermore, certain UE behaviors such as frequency of certain requests, request of certain services at unusual times, UE sensor data and corresponding time stamps, or data from the NFs when put together can provide a bigger picture of potential vulnerabilities or risk of future attacks. FIG. 7 shows an example, where UE 201 (IoT device, mobile telephony, etc.) data may be sent to NWDAF 205 for analysis. The data analytics produced by NWDAF 205 may help optimize over all 5GS including mitigating cyber-attacks.

NWDAF 205 may be configured to collect information from UEs 201 and NFs in the network. In addition, NWDAF 205 may have algorithms that process the collected data/ information. Based on the outcome of the algorithms, NWDAF 205 may be able to help identify cyber-attacks and the associated risks, the probability of future cyber-attacks and mitigate the risk of cyber-attacks. The cyber-attack risk indicators may include vulnerable points in network, malicious activities, or potential targets in network. Network may be able to take appropriate actions to mitigate or stop cyber-attacks upon risk detection.

While NWDAF 205 may help identify potential cyber-attacks that may be conducted towards network (e.g., a core network 204) by a hijacked UE 201, NWDAF 205 may also be able to help identify a potentially hijacked UE 201 that could further a wider cyber-attack.

As highlighted by the FS_ATSSS_Ph2 study which was discussed herein, there are still many aspects of the ATSSS feature that still needs to be addressed. The support for ATSSS defined a PMF protocol that is used to communicate access network performance measurements between UE 201 and UPF 206. Currently, only two performance measurements have been defined for Rel-16 and more measurements may be added in support of ATSSS. In addition, the capability of the network to collect data from UEs 201 for analytics may be added. The PMF protocol may be expanded to support this functionality by providing a mechanism for UEs 201 to send NWDAF data that can then be analyzed. The PMF protocol may also be utilized in multi-USIM scenarios where UE 201 notifies network (e.g., one or more devices) to pause communications with an active USIM of UE 201 for a certain period of time to allow UE 201 to switch communication to an inactive USIM of UE 201.

Additional steering modes may be added to the ones already defined in Rel-16. Conventionally, all the ATSSS steering modes defined are not able to adapt to changing network or UE conditions. Coupled with the enhancement to the PMF protocol where UE 201 provides data to NWDAF 205 for analytics, a new steering mode may be defined to take advantage of this new capability. NWDAF 205 may be able to analyze network and UE conditions and adapt traffic steering and splitting accordingly between 3GPP and non-3GPP accesses. This not only improves the user's experience but also optimizes network utilization and threat assessment. Similarly, a new steering mode may be defined for multi-USIM cases where traffic from one USIM on one access network may be steer to another access network used by another USIM. For example, USIM A on UE 201 may utilize 3GPP access while USIM B utilizes non-3GPP access at the same time. A new steering mode may be created to allow UE 201 to configure the network to dynamically steer traffic for different USIMs between the two accesses depending on the availability of each access.

Furthermore, the Rel-17 eNA_Ph2 study [9] and Rel-16 eNA study [7] illustrate with use cases similar to the one previously discussed, how UE data collection and data collection from NFs in the network can be used to optimize the 5G network.

This disclosure describes how a UE can be configured with rules and policies that are used by the UE to determine what UE specific data and when UE specific data needs to be reported for analytics. The disclosure describes how protocols such as NAS and PMF may be used to configured the UE with the rules and policies. In addition, the disclosure describes how a UE can report UE specific information that needs to be reported for analytics. The disclosure describes how protocols such as NAS and PMF may be used by the UE to report the UE specific data.

As depicted in FIG. 7, NWDAF 205 in core network 204 may collect data from UE 201 and perform data analytics. Based on the type of analysis that is required of NWDAF 205, NWDAF 205 may also require data from other NFs. The results of the analysis may be sent to OAM system or other NFs. In this scenario, UE 201 needs to be configured with information on what data to collect and send to the network for processing in NWDAF 205. Conventionally, no such configuration mechanism exists in the 5G system.

Some data collection may be scheduled. That is, the data to be collected are guaranteed to occur and hence, data parameters, frequency of collection, batch, etc., can be defined ahead of data collection. On the other hand, data collection may be event driven. Therefore, different types of data collection rules may trigger UE 201 to send different data at different times. The enhanced 5GS needs to address how data collection is triggered at UE 201.

When analytics results from UE driven data are produced by NWDAF 205, the 5G network may need to take certain actions based on the corresponding event. This action may simply be a notification to the corresponding NFs or forwarding notifications to UE 205. Furthermore, the action may include system level actions such as commands for regrouping UEs 201, steering or isolating UEs 201, slice reconfigurations, etc. 5GS needs to provide mechanisms for NWDAF 205 to take action whenever these events are detected.

In addition, core network 204 may need to reconfigure UE 201 (e.g., UE policies, new timers etc.) based on events that are detected at NWDAF 205. Current 5GS does not provide such mechanisms.

The variety of data collected from UE 201 may need to be limited in its utilization to mitigate certain privacy and security risks such as the misuse of data. Furthermore, users may need to have at least some control over the collection of data from their UEs 201, for example, accept or reject data collection from the network. Therefore, 5GS may need to provide a mechanism to mark the data and specify rules about data usage control.

ATSSS, eNA, and MUSIM, which is being worked on for 3GPP, provides potential synergies with each other. For example, a PMF in the ATSSS feature may be utilized for UEs 201 to provide data to NWDAF 201 in the eNA work for analytics purposes. In addition, the PMF may also assist multi-USIM UEs to notify a network of one USIM to pause communications while UE 201 communicates with a network of another USIM. Furthermore, new ATSSS steering modes may be introduced to enable support for analytics driven or multi-USIM steering. The following functionalities are disclosed: 1) Enable UEs 201 to use the PMF protocol to provide UE specific data to NWDAF 205 for analytics purposes; 2) Enable multi-USIM UEs 201 to notify the network over the user plane of the UE's 201 desire to pause communications with the network associated with one USIM so UE 201 can communicate with the network associated with another USIM; 3) Define new ATSSS steering modes to support data analytics driven steering; or 4) Define new ATSSS steering modes to support Multi-USIM steering, among other things.

The 3GPP eNA_Ph2[9] study further attempts to investigate the type of information that needs to be collected from the UE 201, the methods for data collection, and data privacy and utilization. Hence, this disclosure further discloses the following. UE configuration mechanism may identify the data that can be collected from the UE 201, which are not already available in the core network 204. The configuration mechanism also identifies the triggers that enables UE 201 to send data to the core network 204 for analysis. Disclosed is a mechanism by which a network entity with data analytics capability analyses the data collected from the UE 201 and other network functions, and generates data analytics report. Based on the analytics, network functions in the core network 204 may take action that may impact the UE 201 indirectly, for example, by regrouping of the UEs 201, steering the UE 201 to a different slice etc. Disclosed is a mechanism by which a network entity with data analytics capability analyses the data collected from the UE 201 and other network functions, and generates data analytics report. Based on the analytics, a network function in the core network 204 may take actions that impact the UE 201 directly, for instance by a UE Configuration Update command. Disclosed are mechanisms by which some aspects of UE data privacy can be managed, and utilization of the data collected from the UE 201 can be controlled.

In a first exemplary implementation (also referred herein as concept 1) UE 201 may provide data for analytics purposes using PMF protocol. UE 201 may include an analytics reporting capability indicator in a request message to network; network may generate a data analytics collection policy; network may return the data analytics collection policy in the response to UE 201; and UE 201 may report data for analytics purposes using the PMF protocol.

Supporting features for the first exemplary implementation (e.g., concept 1) are disclosed herein. For a first feature, the request message may be a registration request or a PDU session establishment request message. For a second feature, network may prompt UE 201 in the response to the request on whether UE 201 supports analytics reporting capability if UE 201 did not indicate such a capability indicator in the request message. For a third feature, network may use local policy or subscription data to create the data analytics collection policy. For a fourth feature, network may contact an analytics function for information to create the data analytics collection policy. For a fifth feature, data analytics collection policy may comprise rules describing what data UE 201 should provide for analytics, how often UE 201 may need to provide the data, the contact information of a network node to send the data to, a data analytics identifier to include when sending the data, or an expiration of the data analytics collection policy.

In a second exemplary implementation, UE 201 may request network to pause and suspend communications for a first USIM over the user plane. UE 201 may send a pause request to a user plane function of the CN; the request may be forwarded to a session management entity or a mobility management function; the mobility management function may determine whether to enable the suspension of communications and returns session information of other UE sessions impacted by the suspension to the session management entity; session management entity may notify user plane functions of the suspension for the sessions associated with UE 201; and user plane function returns the status of the pause request to UE 201.

Supporting exemplary features for the second exemplary implementation are disclosed herein. For a first feature, the pause request may be sent using the PMF protocol. For a second feature, the pause request may include one or more of: the length of time to pause, a list of PDU sessions associated with UE 201, a list of paging causes to ignore during the suspension, a list of paging causes to page UE 201 during the suspension, or a request to buffer future downlink data. For a third feature, a suspension indication may be added to UE context maintained by the mobility management function. For a fourth feature, a suspension timer may be enabled to indicate the time duration for the suspension. For a fifth feature, the registration timer may be suspended during the suspension period. For a sixth feature, the suspension may be applied to one or more PDU sessions associated with UE 201. For a seventh feature, data may be buffered by network for UE 201. For a eighth feature, the connection state of UE 201 may be set to idle in both the mobility management function and UE 201.

In a third exemplary implementation, there may be a data analytics driven steering mode. UE 201 may inform core network 204 that UE 201 may support providing data for analytics and has traffic steering capability; core network 204 may generate and may return to UE 201 a data analytics reporting policy; UE 201 may dynamically steer UL traffic between 3GPP and non-3GPP access based on performance measurements obtained by UE 201; and network may dynamically steer DL traffic to UE 201 between 3GPP and non-3GPP access based on analytics information provided by analytics function.

Supporting exemplary features for the third exemplary implementation are disclosed herein. For a first feature, UE 201 may send a data analytics capability indication to the core network 204 to indicate support of providing data for analytics. For a second feature, the data analytics capability indication may be included in a MA or standalone PDU session establishment request. For a third feature, analytics driven indicator or steering mode is specified as an informational element in the Multi-Access Rule (MAR) and in the ATSSS rules. For a fourth feature, steering of traffic involves sending data traffic to 3GPP access, non-3GPP access, or over both accesses. For a fifth feature, the UE 201 performance measurements may include one or more of: received signal strength, UL data bit rate, UL data latency, number of UL retransmissions, access availability, mobility pattern, MOS, or battery level. For a sixth feature, analytics information may be derived from data provided by the UE 201 such as received signal strength, wi-fi network measurements, signal to noise ratio and interference, DL data bit rate, DL data latency, access availability, mobility pattern, mobility type, battery level, number of connection failures, or location.

In a fourth exemplary implementation, Multi-USIM driven steering mode is disclosed herein. UE 201 creates a PDU session for a first USIM over a first access network with a multi-USIM indicator (e.g., It is an indication to notify the core network the UE has multi-SIM capability. From that knowledge, the network can enhance certain procedures to account for the UE having multiple USIMs) and a temporary identifier (e.g., The temporary identifier is used to identify a UE's subscription associated with a USIM. The temporary identifier may be changed periodically and hence why it is "temporary") of a second USIM; UE 201 creates a PDU session for a second USIM over a second access network with a multi-USIM indicator, a temporary identifier of a first USIM, and optionally a PDU session identifier associated with the first USIM; depending on access network availability, the network steers data traffic for a first USIM to the access network of a second USIM and vice versa; and depending on access network availability, the UE 201 steers data traffic for a first USIM to the access network of a second USIM and vice versa. Note that when the UE creates a PDU session the UE sends a message through the base station to the core network and the core network returns a response on whether the PDU session was successfully established. Further note that a PDU session ID is associated to an established PDU session.

Supporting features for the fourth exemplary implementation are disclosed herein. For a first feature, a multi-USIM steering mode is added to the steering rules in the UE 201 and in the UPF. For a second feature, the steering rules are ATSSS rule for the UE 201 and Multi-Access Rule for the UPF. For a third feature, the PDU session is an MA PDU session or a standalone PDU session. For a fourth feature, the first and the second PDU sessions are linked together. For a fifth feature, the first and the second PDU session IDs are the same.

In a fifth exemplary implementation, UE 201 may identify data parameters and collect UE 201 data based on the UE data collection rules and policies that were received from the network or locally configured. UE 201 may send collected data to the network based on triggers specified by configured UE data collection rules and policies.

Supporting features that may build on the fifth exemplary implementation may include the following. For a first feature, UE data collection rules and policies may be pre-configured in the UE 201 or may be delivered to the UE 201 by the network. For a second feature, data collection rules may be on-demand, which may include scheduled data collection from the UE 201. For a third feature, data requests may be originated from the network without schedule. For a fourth feature, data collection policies may be event based. For a fifth feature, data may be collected, held and delivered to the network after a trigger. For a sixth feature, data may be collected only when UE 201 may be out of coverage, stored and sent to the network when UE 201 comes back on coverage. For a seventh feature, UE 201 may continue to collect data when UE 201 goes out of coverage with constraints such as data priority, time limitation and storage limitation. For a eighth feature, data collection from a UE 201 may be based on UE's data collection capabilities shared with the network.

In a sixth exemplary implementation, network entity may send data analytics outcome to other network entities in the network that may take action based on the analytics received, which may impact UE 201 indirectly.

Supporting features that may build on the sixth exemplary implementation may include the following. For a first feature, the actions taken by the network may be internal change within the network. For a second feature, the internal action taken by the network entities may impact UE 201 because of the change in the entities that UE 201 may depend on.

In a seventh exemplary implementation, a network entity may send data analytics outcome to other network entities in the network that may take action based on the analytics received which may impact UE 201 directly.

Supporting features that may build on the seventh exemplary implementation may include the following. For a first feature, the data analytics report may impact UE 201 by change in UE data collection rules and policies. For a second feature, the data analytics report may impact UE 201 via configuration policy update, registration update etc. led by other network entities that subscribe to data analytics report.

In an eighth exemplary implementation, UE 201 may offer an option for UE data collection to be discarded or allowed from the UE 201. UE 201 may limit the UE data to be sent to the network. UE 201 may be compliant with the network on data collection, data delivery, or data utilization. Supporting features that may build on the eighth exemplary implementation may include the following. For a first feature, UE 201 may limit collected data by preprocessing before sending the data to the network. For a second feature, UE 201 may limit data based on what sector of the UE 201 the data originates from. For a third feature, UE 201 may allow data collection to be discarded or allowed from the UE 201 via a GUI.

PMF Protocol Enhancements

The following disclosed PMF protocol enhancements extends the UE 201 to CN communications. In the first enhancement, the PMF protocol is used by UEs 201 to provide the NWDAF 205 with information that may be utilized for analytics. In other words, UEs 201 can provide the NWDAF 205 UE specific information for analytics using the user plane of the network. Some of the information from the UE 201 may be viewed as complimentary to the information the NWDAF 205 already collects about the UE 201 from other NFs in the cellular systems while other information is UE specific and may only be provided by the UE 201. As a result, the UE information may be used as validation for the predictions the NWDAF 205 currently performs or it may be used to provide a more complete analysis of the operations of the entire system. The analysis can be wide ranging and account for several interested parties, from network functions such as AMFs 208, SMFs 207, PCFs 209, and UPFs 206 to UEs or groups of UEs.

A second enhancement allows a multi-USIM UE 201 to use a first USIM to notify the network of a need to pause communications with the network in order to allow the UE 201 to communicate with the network of a second USIM. When the UE 201 uses the second USIM to communicate, it may be communicating with the same or another network. In other words, the other network may be the same network as the first USIM or a different network associated with the second USIM. The multi-USIM UE 201 sends a pause request over the user plane to the PMF within a UPF and indicates the UE 201 wants to temporarily suspend communications with the network. The PMF forwards a request to the SMF, which forwards a request to the AMF serving the UE 201 to enable the temporary suspension of communications with the UE 201. Note that the PMF is a logical entity that is shown to reside within a UPF 206 but the PMF may be located separate from a UPF 206. For example, one PMF may be grouped together with multiple UPFs in a network slice. Hereinafter, PMF and UPF 206 are used interchangeably in the context of the PMF protocol.

Enhancements for NWDAF

As previously mentioned, the PMF protocol introduced for the ATSSS feature provides a mechanism for both the UE 201 and the UPF 206 to obtain performance measurements that enables traffic steering, switching, or splitting. To further utilize this capability, the protocol may be expanded to include the collection of UE information that may be used by the NWDAF 205 for analytics purposes. To enable this functionality, a UE 201 may indicate that it supports gathering data for analytics purposes when registering to the core network 204 and in turn, the core network 204 provides a data analytics collection policy to the UE 201. The UE 201, using these policies, may then be triggered to send the collected data to a PMF using the PMF protocol. The triggers may be periodic in nature or it may be event driven, for example, based on a mobility or handover event. The NWDAF 205 may retrieve the data from the PMF (or UPF 206) using service-based interface. This procedure will be described in examples hereinafter.

Figure 8A:
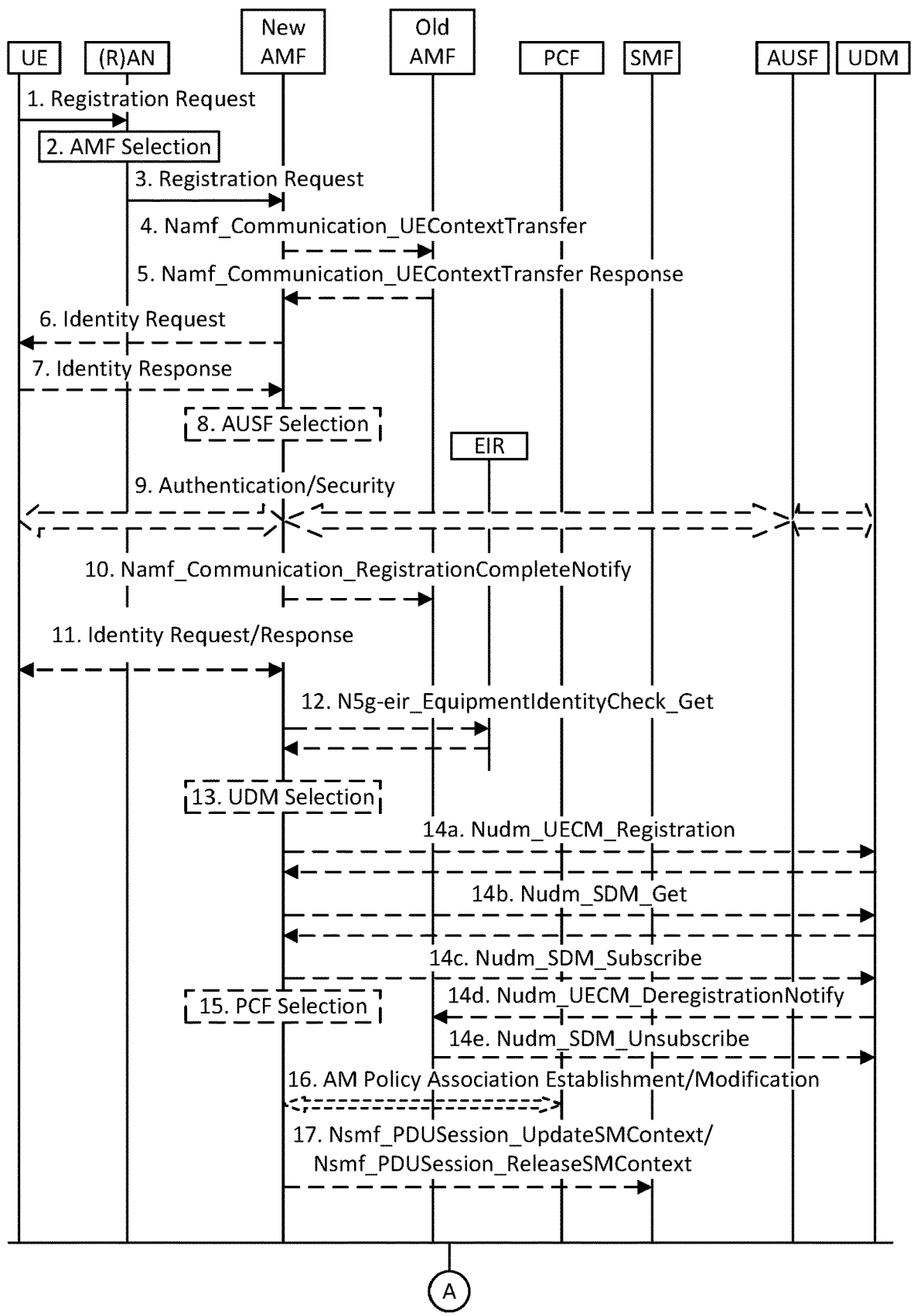
FIG. 8A illustrates an exemplary Registration procedure.
Figure 8B:
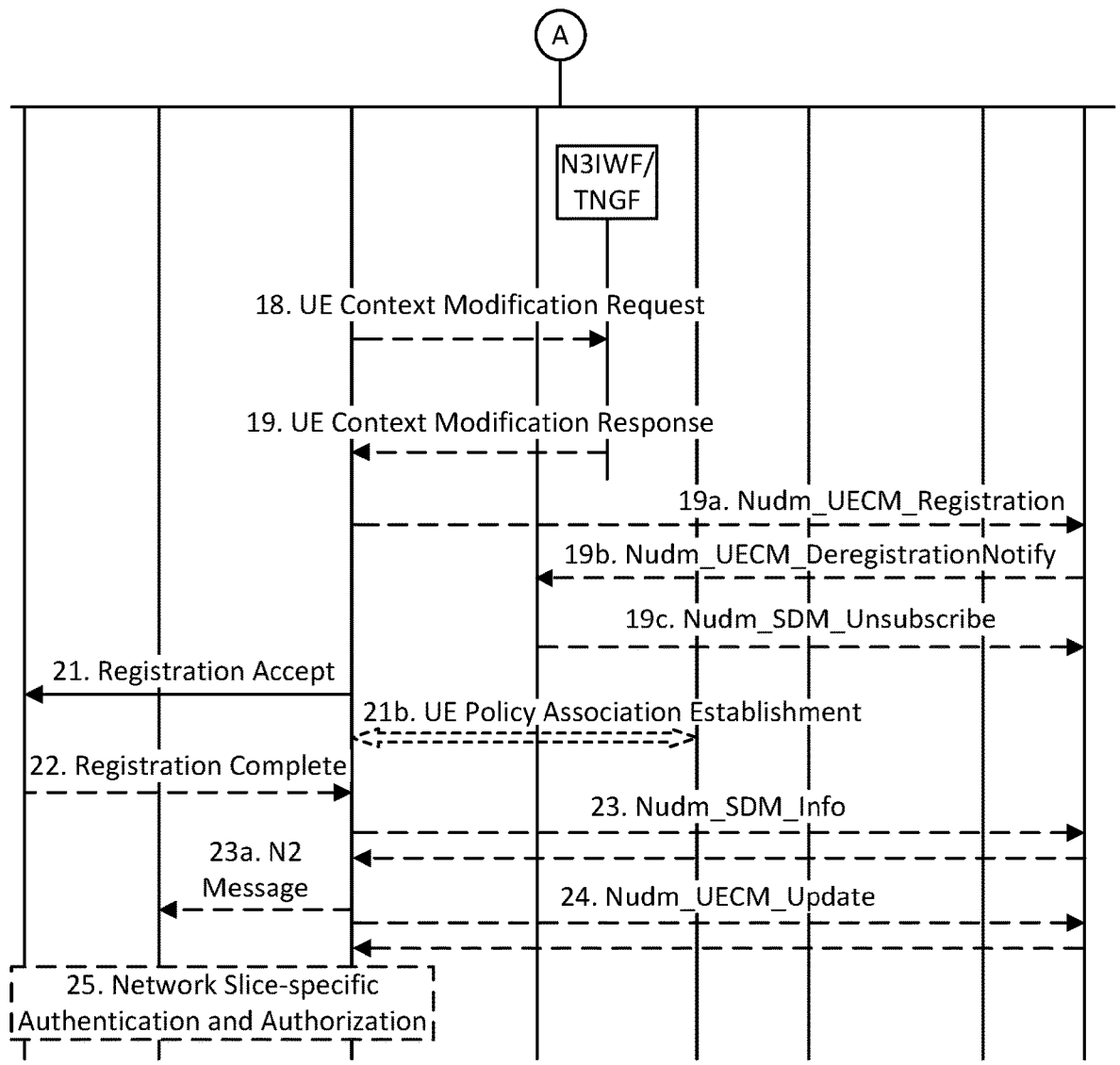
FIG. 8B illustrates an exemplary Registration procedure.

FIGS. 8A and 8B (also referred herein as FIGS. 8A and 8B) shows the general registration procedure from TS 23.502 [2]. This registration procedure is enhanced to allow a UE 201 to communicate its support of providing data for analytics purposes in the Registration request message. Alternatively, the CN may prompt the UE 201 to determine if the UE 201 supports providing data for analytics purposes in the Registration Accept response. The UE 201 can respond with an indication that the UE 201 supports providing data for analytics purposes in the Registration Complete message.

With reference to FIGS. and 8B, the following enhancements are disclosed to enable the UE 201 to receive the data analytics collection policy. In step 1 of FIG. 8A, the UE 201 includes an analytics reporting capability indicator within the registration request to inform the core network 204 that the UE 201 can provide data for analytics purposes to the NWDAF 205. This may also signify that the UE 201 supports using the PMF protocol to provide the data to a PMF. This registration request is forwarded to the AMF 208 in step 3 of FIG. 8A. In step 16 of FIGS. 8A and 8B, the AMF 208 includes the analytics reporting capability indicator to the PCF when establishing an AM Policy Association for the UE 201. The indicator is sent with other information in the Npcf_AMPolicyControl_Create request. The PCF 209 uses information from local policy or subscription data to generate a data analytics collection policy suitable for the UE 201. The data analytics collection policy may comprise of rules describing what data the UE 201 should provide for analytics, how often the UE 201 needs to provide the data, the contact information of a PMF to send the data to, a data analytics identifier to include when sending the data, the expiration of the data analytics collection policy, etc. The PCF 209 may have been provisioned with such information or the PCF 209 may have communicated with an NWDAF 205 to obtain such information. Alternatively, the PCF may provide the AMF 208 with data analytics reporting information and the AMF 208 then derives a data analytics collection policy from the information provided by the PCF. The AMF 208 may also communicate with an NWDAF 205 to obtain information for the data analytics collection policy, such as the contact information of a PMF to send data to and a data analytics identifier.

Additional enhancements with regards to FIGS. 8A and 8B, in step 21 of FIGS. 8A and 8B, the data analytics collection policy is returned to the UE 201 in the Registration Accept message. If the UE 201 had not included an analytics reporting capability indicator in step 1 of FIG. 8A, the AMF 208 may prompt the UE 201 if it wants to provide analytics data for the NWDAF 205 in the Registration Accept message. This prompt may be realized by the inclusion of an analytics reporting capability indicator. In step 22, if the UE 201 was prompted by the AMF 208 to enable analytics reporting and the UE 201 accepts, the UE 201 returns the analytics reporting capability indicator to the AMF 208 in the Registration Complete message. Upon receiving the analytics reporting capability indicator, the AMF 208 may trigger the execution of a UE Configuration Update procedure for transparent UE Policy delivery to generate and send the UE 201 the data analytics collection policy. After receiving the data analytics collection policy, the UE 201 will collect the necessary data specified by the policy and send them at the indicated frequency to a PMF using the PMF protocol.

In order for the PCF 209, SMF, or another NF to obtain necessary information to generate a data analytics collection policy for the UE 201, it is disclosed to add support for an additional operation to the NWDAF services that are already offered to NFs. Table 1 shows the existing NF services provided by NWDAF 205 as well as a newly disclosed service Nnwdaf_AnalyticsPolicyInfo listed in bold. This new service enables NFs such as the PCF 209 or AMF 208 to request from NWDAF 205 information that are required to generate a data analytics collection policy for the UE 201. In other words, the service can be used to query what types of analytics the NWDAF 205 is interested in for a given UE, groups of UEs, slice, or a combination of information elements. The output of the request may even be the data analytics collection policy itself, which the requesting NF may then relay to the UE 201.

TABLE 1

NF services provided by NWDAF

| Service Name | Service Operations | Operation Semantics | Example Consumer(s) |
| --- | --- | --- | --- |
| Nnwdaf_AnalyticsSubscription | Subscribe | Subscribe/ Notify | PCF, NSSF, AMF, SMF, NEF, AF |
|  | Unsubscribe |  | PCF, NSSF, AMF, SMF, NEF, AF |
|  | Notify |  | PCF, NSSF, AMF, SMF, NEF, AF |
| Nnwdaf_AnalyticsInfo | Request | Request/ Response | PCF, NSSF, AMF, SMF, NEF, AF |
| Nnwdaf_AnalyticsPolicyInfo | Request | Request/ Response | PCF, NSSF, AMF, SMF, NEF, AF |

The following describes an exemplary Nnwdaf_AnalyticsPolicyInfo service operation in more detail.

Service operation name: Nnwdaf_AnalyticsPolicyInfo Request.

Description: Requests information required to generate data analytics collection policy for a UE 201.

Inputs, Required: UE 201 (e.g. SUPI) or group identifier.

Inputs, Optional: Serving AMF or NF ID, list of recently visited areas (TAIs or cell IDs), S-NSSAI.

Outputs Required: Data Analytics policy ID, set of the tuple (Analytics ID, analytics specific parameters, reporting frequency, reporting events, correlation ID), target address of PMF receiving UE data.

Outputs, Optional: Policy expiration, area ID(s).

3GPP TS 23.288, Architecture enhancements for 5G System (5GS) to support network data analytics services; V16.1.0 (2019-09) (hereinafter [4]) describes the list of Analytics IDs NWDAF 205 provides to its consumers. The data for these analytics may be collected from NFs or OAM entities in the system and the output may be in the form of statistics or predictions. For the case where NWDAF 205 provides predictions, there is a lack of validation of the NWDAF's predictions. Therefore, the data collected from the UE 201 can be considered as complimentary to those predictions which impacts the analytics concerning the UE 201, such as UE Mobility, UE Communications, etc. As a result, the NWDAF 205 may use the information provided by the UE 201 as feedback to evaluate the efficacy of its analytics output or the system configuration in general.

While the UE 201 may utilize some of the existing Analytics ID defined in [4] to report data to the NWDAF 205, it may be advantageous to group the UE specific information into a new, separate Analytics ID. This simplifies the reporting structure for the UE 201 and minimizes the number of subscription requests required by the NWDAF 205. Table 2 shows an example of a list of data elements a UE 201 can provide to the NWDAF 205 when reporting data for analytics. Some of the information are from other Analytics IDs found in [4] while others are new information that are UE specific and that only the UE 201 can provide. This information can be grouped into a separate Analytics ID that an NWDAF 205 configures in the UE 201 via the data analytics collection policy and also uses to subscribe to the PMF within a UPF to collect the data from the UE 201.

TABLE 2

Disclosed UE specific information for Analytics Report

| Information | Source | Description |
| --- | --- | --- |
| Timestamp | UE | A time stamp for when the report was made. |
| Reporting period | UE | The period in which the report was obtained. |
| Battery Level | UE | Percentage of remaining battery in the UE. |
| DNN | UE | DNN of PDU session which includes the QoS flow. |
| S-NSSAI | UE | S-NSSAI of PDU session which includes the QoS flow. |
| PDU Session ID | UE | The PDU Session ID associated with this report |
| Application IDs | UE | The application IDs the report is based on. |
| Location Information | UE | The location of the UE when the report was made (e.g. TAIs, cell IDs, etc.). |
| Mobility Type | UE | Identify type of mobility: pedestrian, vehicular, etc. for reporting period |
| Mobility Pattern | UE | List of recently visited areas during the reporting period. |
| Number of Handovers | UE | The number of handovers performed during the reporting period |
| MOS | UE | The Mean Opinion Score for the reporting period |
| Data Bit Rate | UE | The received data bit rate in both DL and UL direction over 3GPP and non-3GPP accesses. The data bit rate may be extended to include minimum, average, and maximum bit rates for the reporting period. |
| Data Latency | UE | The experienced packet delay in both DL and UL direction over 3GPP and non-3GPP accesses. The packet delay may be extended to include minimum, average, and maximum delay for the reporting period. |
| Packet retransmissions | UE | The number of packet retransmissions in UL direction over 3GPP and non-3GPP accesses during the reporting period. |
| Number of PDU sessions | UE | The total number of active PDU sessions since the last reporting period. |
| PDU session establishment failures | UE | The number of PDU session establishment failures since the last reporting period. |
| Access availability | UE | The percentage of availability of 3GPP and non-3GPP accesses for the reporting period. |
| Connection Percentages | UE | The percentage of connections for 3GPP and non-3GPP accesses for the reporting period |
| RRC Connection failures | UE | The number of times the UE failed to establish RRC connection for the reporting period |
| Non-3GPP connection failures | UE | The number of times the UE failed to establish connection with non-3GPP access for the reporting period |
| Reference Signal Received Power | UE | The measurement of the received power level in a network cell, including SS-RSRP, CSI-RSRP as specified in clause 5.5 of TS 38.331 and E-UTRA RSRP as specified in clause 5.5.5 of TS 36.331 |
| Reference Signal Received Quality | UE | The measurement of the received quality in a network cell, including SS-RSRQ, CSI-RSRQ as specified in clause 5.5 of TS 38.331 and E-UTRA RSRQ as specified in clause 5.5.5 of TS 36.331 |
| Signal-to-noise and interference ratio | UE | The measurement of the received signal to noise and interference ratio in a network cell, including SS-SINR, CSI-SINR, E-UTRA RS-SINR, as specified in clause 5.1 of TS 38.215 |
| Non-3GPP AN measurements | UE | The received signal power measurement associated with the non-3GPP access network. This may include desired channel and adjacent channel signal power measurements. |

The approach of using the analytics reporting capability indicator in the registration request is one way the UE 201 may notify the core network 204 that it supports sending data for analytics. This method provides a mechanism in which data may be collected for some or all PDU sessions associated with the UE's registration to give the NWDAF information to provide data analytics for. The data analytics collection policy may require the UE 201 to collect data for: mobility scenarios, handover scenarios, the connection percentages on 3GPP vs non-3GPP access, received network bandwidth, received network latencies, received signal strengths, etc.

Figure 3:
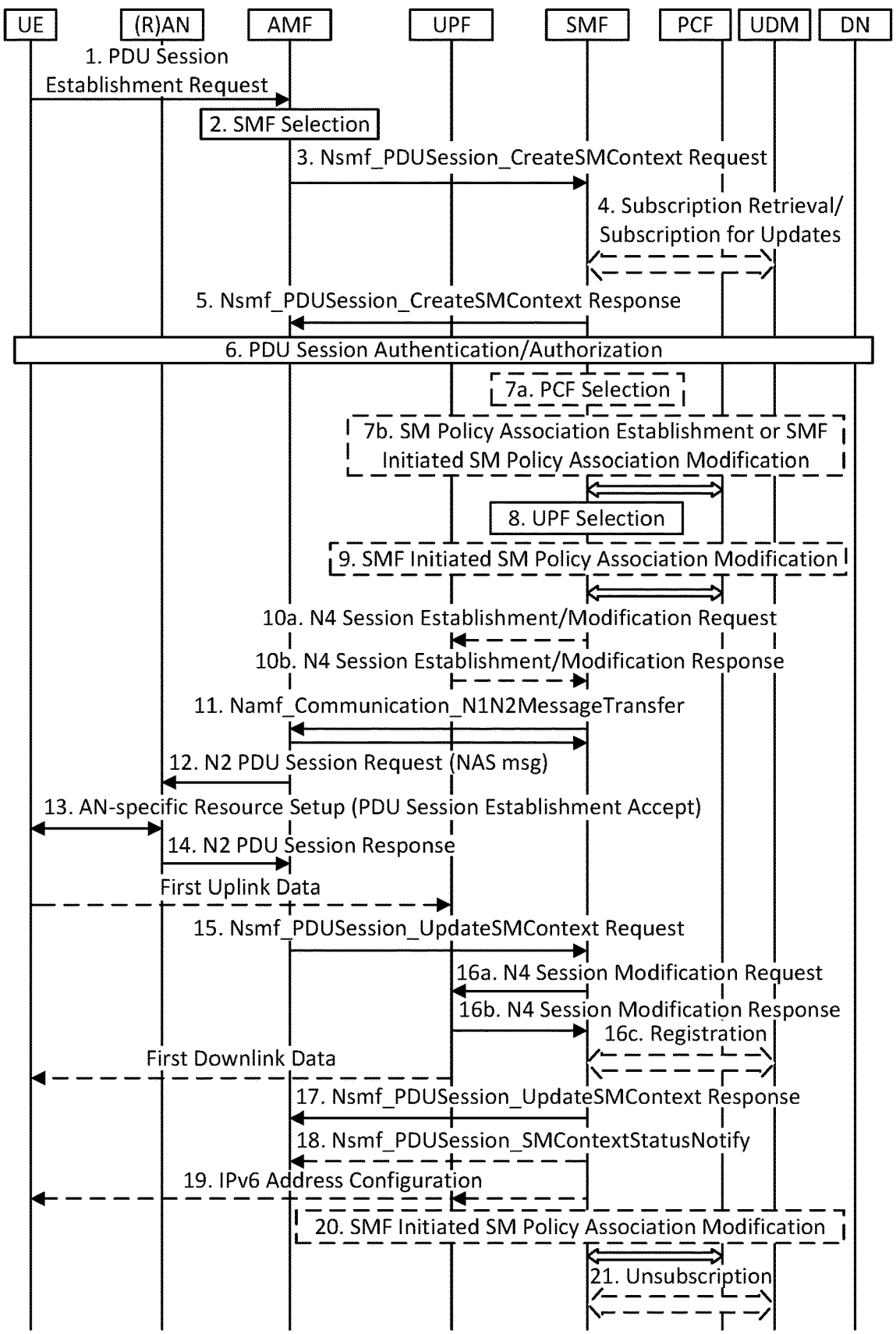
FIG. 3 illustrates an exemplary UE-requested PDU Session Establishment for non-roaming and roaming with local breakout.

The UE 201 may alternatively send the analytics reporting capability indicator as part of a PDU Session establishment procedure as shown in FIG. 3 (steps 1-21). In this scenario, a UE 201 may include the analytics reporting capability indicator in the PDU Session Establishment request or when modifying a PDU session. The SMF 207 in this case will receive the indicator and when it communicates to the PCF 209, e.g. in step 7b of FIG. 3, the data analytics collection policy may be generated by the PCF 209 and returned to the SMF 207. Alternatively, the data analytics collection policy may be generated by the SMF 207 after steps 9 or 10b of FIG. 3 after the SMF 207 obtains data analytics collection information from the PCF. The data analytics collection policy is then returned to the UE 201 in the PDU Session Establishment Accept response. Another alternative is to integrate the analytics reporting capability indicator within the MA PDU Session Establishment procedure. In this case, the data analytics collection policy may be part of the Measurement Assistance Information that are return to the UE 201. The PDU Session Establishment Accept response may include an indication that the UE 201 should send analytics information in the PDU session or the presence of a data analytics collection policy in the PDU Session Establishment Accept response may be an indication that the UE 201 should send analytics information in the PDU session.

As an alternative to introducing a new service operation within the NWDAF 205 to provide information for the data analytics collection policy, the PCF 209 may be enhanced to provide this information. The PCF 209 may obtain this information from operator policy, local configuration, or externally through an OAM or an AF via the NEF. The PCF 209 may provide the data analytics collection policy to the AMF 208 or SMF 207 during the respective Policy Association Establishment/Modification step of the registration or PDU session procedures. The data analytics collection policy is then returned to the UE 201 in the respective responses to these procedures.

The target address found in the output of the Nnwdaf_AnalyticsPolicyInfo request or in the data analytics collection policy may be the address of the PMF within a specific UPF 206. Note that if the data analytics collection policy is sent as part of the Measurement Assistance Information (MAI) that is returned to the UE 201 for a MA PDU Session procedure, the IP address of the PMF is already included as part of the MAI. The configuration of the PMF address in the data analytics collection policy may be specified as the PMF within the UPF 206 that is responsible for an associated PDU session. For example, the UE 201 may send the data analytics reports to the PMF within the UPF 206 that manages the user plane tunnel(s) of the PDU session for the UE 201. However, if the UE 201 has multiple PDU sessions on different UPFs each with their own PMF, this may segregate the data collection into multiple UPFs and require the NWDAF 205 to subscribe to multiple UPFs to get data from the UE 201. An alternative to having PMFs within multiple UPFs gathering UE data for analytics, the target address in the data analytics reporting policy may be specified such that the UE 201 report to a single PMF when sending data for analytics. This may be realized when a single PMF handles data collection for multiple UPFs within the same network slice. The PCF 209 or SMF 207 may have been provisioned with the PMF address in a network slice as part of network configuration or policy. The NWDAF 205 may also provision this address to other NFs in the response to the Nnwdaf_AnalyticsPolicyInfo request.

It may also be likely that operator policies identify one or more PMFs to serve as anchor PMFs for saving data analytics reports from UEs in the system. In that scenario, NFs may be provided with the address of the anchor PMF via operator policy or provisioning via OAM system. One reason for having dedicated anchor PMFs is that UPFs will be required to implement a PMF internally to process PMF protocol signaling from UEs. Therefore, certain UPFs may be deployed with a PMF so that other UPFs are not required to implement a PMF. Another reason for having separate anchor PMFs is that the metrics collected over the user plane are not distorted by the presence of PMFs receiving data analytics reports from UEs.

Enhancements for Multi-USIM UEs

Figure 9:
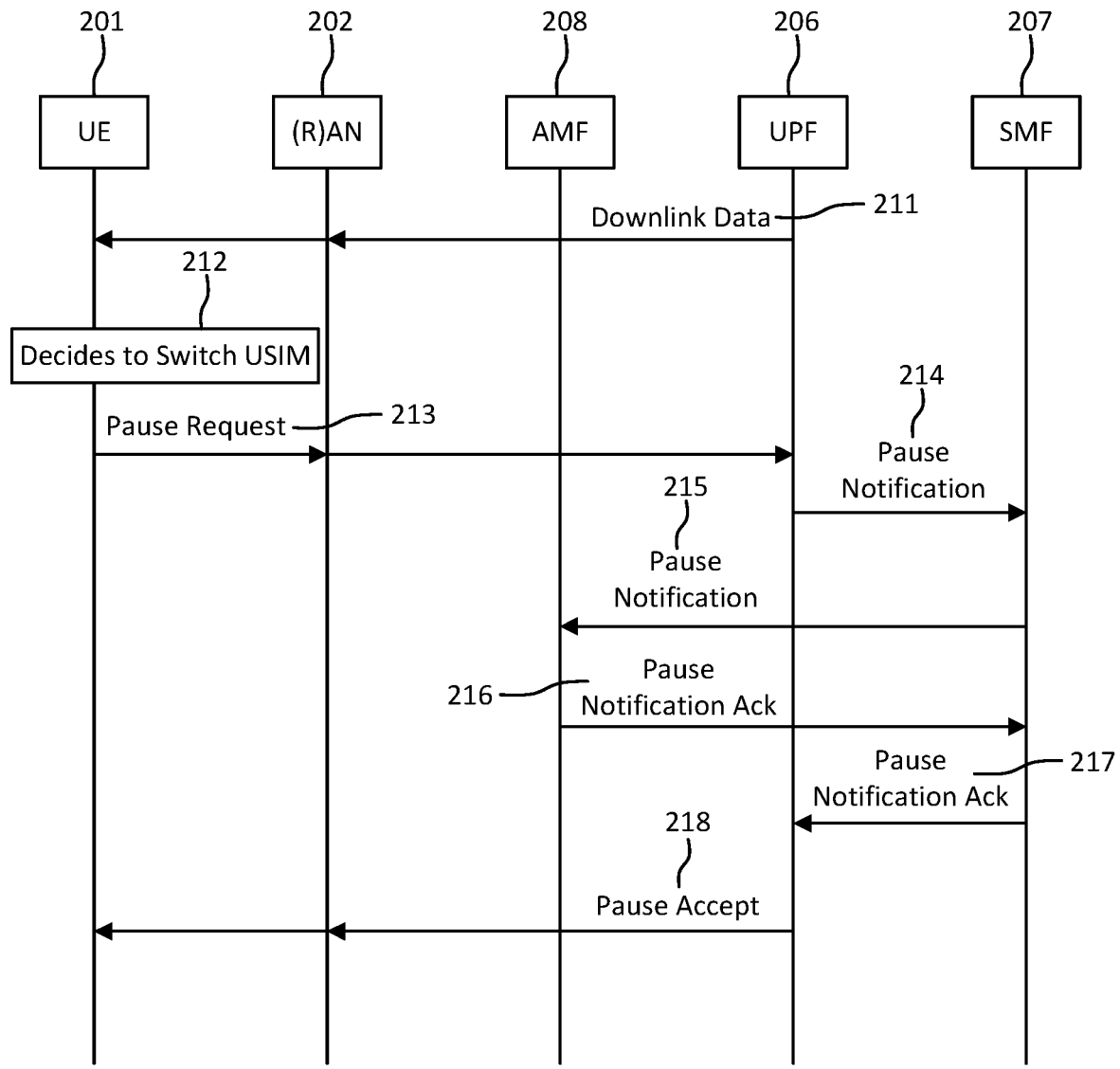
FIG. 9 illustrates an exemplary Multi-USIM Pause Request Procedure.

The operations of a multi-USIM UE 201 with single Rx, single Tx capability require that the UE time division multiplex (TDM) communications between USIM A and USIM B for the dual USIM case. To that end, the dual USIM UE 201 may be configured with a periodic service gap in order to switch communications between the network of the USIMs. FIG. 9 shows an exemplary method flow in which a dual USIM UE 201 may be initially receiving downlink data for USIM A and then on a service gap, the UE 201 receives a page for USIM B. The page may include a paging cause that causes the UE 201 to decide to switch to using USIM B. Then on another service gap or in response to a user request, the UE 201 notifies the network of USIM A to temporarily pause the communications with the UE 201 using the PMF protocol over the user plane. A pause request is then forwarded to the SMF 207 and eventually to the AMF 208 where the UE context is updated so future communications with the UE 201 may be suspended until the UE 201 resumes communications with the network of USIM A. The disclosed enhancement allows a multi-USIM UE 201 to use the user plane to initiate the suspension of communications with the network of a USIM in order to connect to the network of another USIM. The network of the USIMs in this case may be the same or different network operators. With reference to FIG. 9, at step 211: The UE 201 may be in CM_CONNECTED state for USIM A and may be currently receiving downlink data. The UE 201 may be in CM_IDLE state for USIM B. At step 212, on a service gap for USIM B, the UE 201 monitors for and receives a page associated with USIM B. The UE 201 retrieves the Paging Cause associated with the page and decides it wants to switch to using USIM B. The Paging Cause may indicate a service that is of interest to the user of the UE 201. At step 213, on a service gap for USIM A or when the user of the UE 201 prompts the UE 201 to switch SIMs (e.g. via a GUI), the UE 201 makes a request over the user plane to pause the downlink data using the PMF protocol. This request signifies that the UE 201 would like to temporarily suspend activities associated with the network of USIM A and may include a list of PDU sessions to be suspended. The request may include the length of time the UE 201 may be requesting to pause its operations for USIM A. It may also include information on what paging causes are important to the UE 201 for USIM A and hence, to page the UE 201 during the pause. Alternatively, the UE 201 may request that all pages regardless of paging cause are suspended for the duration of the pause. This page filtering may be a white list or black list of paging causes. The UE 201 may also request that all new mobile terminated data be buffered until the UE 201 returns and performs a service or resume request to reestablish communications.

With continued reference to FIG. 9, at step 214: The UPF 206 forwards a pause notification to the SMF 207 to notify the SMF 207 of the UE's request. The notification includes the information provided by the UE 201 in step 213 as well as the PDU session ID and other context information the UPF has for the UE 201. At step 215: The SMF 207 forwards a pause notification to the AMF 208 with the information provided by the UE 201 in step 213 and from the UPF in step 214. The SMF 207 may also include other information, such as the UE's SM context ID for the current PDU session ID or other PDU session IDs associated with the UE 201. At step 216, the AMF 208 updates the UE context maintained internally within the AMF 208 to suspend the UE's CM state while keeping the UE registered, e.g. in RM_REGISTERED state. In other words, communications with the UE 201 are temporarily suspended until the UE 201 resumes communications with the core network 204 by performing a service request or a resume request, e.g. a pause indication may be associated with the UE's context in the AMF 208. The AMF 208 may also implement a timer to associate an expiration for the suspension in case the UE 201 does not resume communications with the network within a timely manner. The AMF 208 may use the time provided by the UE 201 or some other value, possibly from network configuration or policy, for the expiration timer. If necessary, the AMF 208 updates the UE's CM state to CM_IDLE or may pause the registration update timer of the UE 201. The AMF 208 returns an acknowledgement to the SMF 207 that may include: whether the suspension was activated, an expiration time the AMF 208 is maintaining for the suspension, whether the SMF 207 or UPF 206 should buffer data for the UE 201 and for which PDU sessions of the UE 201, etc.

With reference to FIG. 9, at step 217, the SMF 207 receives the acknowledgement from the AMF 208. If the suspension is activated, the SMF 207 may also update the SM context it maintains for the UE 201 and enables data buffering for the UE 201 for PDU sessions belonging to the UE 201 that the AMF 208 had indicated the SMF 207 should buffer data for the UE 201. It may also contact other UPFs that the UE 201 may have PDU sessions with and inform them to buffer any future data while the suspension is active if the AMF 208 had indicated that the UPFs should buffer data for the UE 201. The SMF 207 may provide those UPFs with the time provided by the AMF 208 to indicate how long to buffer the data. The SMF 207 returns a pause notification to the requesting UPF with the status of the pause request from the AMF 208, the expiration time for the pause, whether the UPF 206 should buffer data for the UE 201, pause and buffering status of other PDU sessions associated with the UE 201, etc. At step 208, the UPF 206 notes whether the buffering is enabled and the time the buffering is active for so it can buffer any downlink data for the UE 201 if requested to do so. The UPF 206 then returns a pause accept response to the UE 201 with information about the status of the pause request, an expiration time for the pause, whether data buffering is enabled and for which PDU session IDs, and other information from the responses of both the AMF 208 and SMF 207. At this point, the UE 201 may release any RRC signaling with the network and switch operations to the network of USIM B. The RAN node may also release the RRC signaling automatically to save on signaling overhead between the UE 201 and the RAN node so the UE 201 does not need to explicitly release the RRC connection.

When the UE 201 may be ready to return to using USIM A, the UE 201 may perform the procedures associated with PLMN selection, cell (re)selection, and RRC connection establishment with a RAN node 202 associated with USIM A before sending the core network 204 a service request procedure to resume operations with the network. The service request will cause the AMF 208 to send a notification to the SMF 207 that the connection can be resumed. The notification to the SMF 207 will cause the SMF 207 to send a notification to the UPFs that the connection can be resumed, and any buffered data can be sent to the UE 201. Alternatively, the UE 201 could resume the connection by sending a resume request to the PMF. The UPF 206 may then notify the SMF 207 that the connection is resumed and the SMF 207 may inform the AMF 208 that the connection is resumed.

The resume request would be similar to the pause request shown in FIG. 9 and would follow the same steps as step 213 to step 218 but to resume instead of pausing communications with the network. The UE contexts within the UPF 206, SMF 207, and AMF 208 would (where appropriate) disable the pause, any expiration timer for the pause would be disabled, buffered data will be sent to the UE 201, the registration update timer would be re-enabled, the UE's CM state would transition to CM-CONNECTED, etc.

ATSSS Steering Modes

The 3GPP FS_ATSSS_Ph2 SID has identified that there may be additional steering modes defined in addition to those that are already defined in Rel-16. The operations of the existing steering modes depend on the two performance measurements defined: availability report and round-trip time. However, a more dynamic steering mode may be introduced based upon data analytics provided by the NWDAF 205. This new steering mode may adapt to changing network conditions and UE conditions and offer more dynamic steering capabilities than the existing steering modes.

In addition to the data analytics driven steering mode, another steering mode may be introduced to take advantage of multiple accesses for multi-USIM use cases. This new steering mode may be configured in which one USIM is used to connect with the 3GPP access network (e.g., gNode-Bs 180*a*) while another USIM is used to connect to the non-3GPP access network (e.g., non-3GPP Access Point 180*c*). The steering mode may then direct a UPF to steer data traffic for a UE 201 from an unavailable access network to the other access network where the UE 201 may be in active communications with. In addition, this new steering mode can also support when a multi-USIM UE 201 connects with multiple 3GPP RATs, such as simultaneously between 5G systems or between 5G and LTE systems with interworking support for ATSSS. In one scenario, the UE TDMs operations between one USIM on 5G and another USIM on the same or different 5G systems.

Data Analytics Driven Steering

Utilizing the disclosed capabilities of enabling UE driven analytics, a new steering mode may be supported that autonomously steers, switches, or splits traffic based on analytics generated by the NWDAF 205. The NWDAF 205 may combine data from NFs and UEs 201 to perform analytics that provides a holistic approach to traffic steering. UEs may provide feedback to the analytics that NWDAF 205 already generates based on data collected from various NFs. The resulting analytics may represent both system conditions and UE QoS experiences to optimize traffic steering such that it benefits both the network and the UE 201. On the one hand, system resources are optimized to load balance traffic in the network; while on the other hand, user experiences for the UE 201 are maintained or improved due to traffic steering that automatically selects the best access.

A UE 201 may influence the selection of this new steering mode by providing the previously disclosed analytics reporting capability indicator in the MA PDU session establishment procedure. This indicator may signal to the SMF 207 to generate MAR rules to include a newly disclosed "Analytics Driven" or "Dynamic" steering mode for more dynamic traffic steering or splitting. An example of the use of this new steering mode is shown in Table 3 for Multi-Access Rule (MAR) where the Analytics Driven steering mode indicates to the UPF 206 to use analytics from NWDAF 205 to assist in steering traffic over 3GPP or non-3GPP accesses. The NWDAF 205 may even provide the weight of the MAR splitting percentages based on its analytics results.

TABLE 3

Structure of MAR Rules with disclosed new Steering Modes

| Attribute | | Description | Comment |
|---|---|---|---|
| N4 Session ID | | Identifies the N4 session associated to this MAR. | |
| Rule ID | | Unique identifier to identify this rule. | |
| Steering functionality | | Indicates the applicable traffic steering functionality: Values "MPTCP functionality", "ATSSS-LL functionality". | |
| Steering mode | | Values "Active-Standby", "Smallest Delay", "Load Balancing" or "Priority-based", "Analytics Driven", "MUSIM". | |
| Per-Access Forwarding Action information (NOTE 1) | Forwarding Action Rule ID | The Forwarding Action Rule ID identifies a forwarding action that has to be applied. | For "MUSIM" steering, the FAR ID represents the FAR associated with the other access when the current access is not available, e.g. if the MAR rule is for 3GPP access and 3GPP access is not available, then FAR ID is of the ID of a FAR for non-3GPP access. |
| | Weight | Identifies the weight for the FAR in case steering mode is "Load Balancing" | The weights for all FARs need to sum up to 100. When "Analytics Driven" steering mode is enabled, the weight is obtained from NWDAF or determined autonomously by the UPF. |
| | Priority | Values "Active or Standby" or "High or Low" for the FAR | "Active or Standby" for "Active-Standby" or "MUSIM" steering mode and "High or Low" for "Priority-based" steering mode |
| | List of Usage Reporting Rule ID(s) | Every Usage Reporting Rule ID identifies a measurement action that has to be applied. | This enables the SMF to request separate usage reports for different FARs (e.g., different accesses) |

(NOTE 1):
The Per-Access Forwarding Action information is provided per access type (e.g., 3GPP access or Non-3GPP access).

For the Analytics Driven steering mode disclosed in Table 3, the initial traffic splitting may be set at a 50-50 split as a default. Then as analytics data becomes available, the traffic split may be determined by the NWDAF 205 based on analytics data. The NWDAF 205 may present the analytics data to the UPF 206 as a percentage of traffic that is split between 3GPP and non-3GPP access. The split percentages may be specified as the weight of the Forwarding Action on a per-access basis within the structure of the MAR rules. Alternatively, the UPF may determine the splitting percentages based on analytics provided by the NWDAF 205 or performance measurements obtained by the UPF 206.

Similarly, the UE 201 may take advantage of this steering mode if the SMF 207 creates ATSSS rules incorporating the Analytics Driven steering mode as shown in Table 4 when MA PDU sessions are established or modified. In this case, the UE 201 uses data it has of UL re-transmissions, possibly signal strengths of the access networks, and other metrics to adapt traffic splitting between 3GPP and non-3GPP accesses. Some of the data from Table 2 may be used by the UE 201 for this purpose. The split percentages may be adapted by the UE 201 to changing network or UE conditions such as lower received signal strength, UE mobility, or battery level.

TABLE 4

Structure of ATSSS Rules with disclose Analytics Driven indicator

| Information name | Description | Category | SMF permitted to modify in a PDU context | Scope |
|---|---|---|---|---|
| Rule Precedence | Determines the order in which the ATSSS rule is evaluated in the UE. | (NOTE 1) | Yes | PDU context |
| Traffic Descriptor | This defines the Traffic descriptor components for the ATSSS rule. | (NOTE 2) | | |

TABLE 4-continued

Structure of ATSSS Rules with disclose Analytics Driven indicator

| Information name | Description | Category | SMF permitted to modify in a PDU context | Scope |
|---|---|---|---|---|
| Application descriptors | One or more application identities that identify the application(s) generating the traffic (NOTE 3). | | Yes | PDU context |
| IP descriptors (NOTE 4) | One or more 5-tuples that identify the destination of IP traffic. | | Yes | PDU context |
| Non-IP descriptors (NOTE 4) | One or more descriptors that identify the destination of non-IP traffic, e.g., of Ethernet traffic. | | Yes | PDU context |
| Access Selection Descriptor | This defines the Access Selection Descriptor components for the ATSSS rule. | | | |
| Steering Mode (NOTE 6) | Identifies the steering mode that should be applied for the matching traffic. | | Yes | PDU context |
| Steering Functionality | Identifies whether the MPTCP functionality or the ATSSS-LL functionality should be applied for the matching traffic. | (NOTE 5) | Yes | PDU context |

(NOTE 1):
Each ATSSS rule has a different precedence value from the other ATSSS rules.
(NOTE 2):
At least one of the Traffic Descriptor components is present.
(NOTE 3):
An application identity consists of an OSId and an OSAppId.
(NOTE 4):
An ATSSS rule cannot include both IP descriptors and Non-IP descriptors.
(NOTE 5):
If the UE supports only one Steering Functionality, this component is omitted.
(NOTE 6):
When "Analytics Driven" steering mode is enabled, the UE uses UL transmission metrics such as data bit rate or access network signal strength to make traffic splitting decisions. Alternatively, an "Analytics Driven" indicator may be used instead as an indication that is separate from the Steering Mode.

Using these analytics driven steering modes, both the UE 201 and UPF 206 may dynamically steer traffic to the best available access network for any instance in time and as conditions in the access network or UE 201 changes, the traffic steering is adjusted to account for those changes. As a result, the traffic steering is optimally adjusted to changing network and UE conditions.

To provide this data analytics driven steering, an NWDAF 205 may collect data from a UE 201 as previously disclosed for the PMF protocol enhancements. The NWDAF 205 may use the data from the UE 201 to develop an analytics prediction confidence level for an analytics ID relating to the UE 201. Then using network performance and system load metrics, the NWDAF 205 can then assign splitting percentages between 3GPP and non-3GPP accesses. As system conditions changes, the NWDAF 205 can adjust the steering percentages accordingly. The UE 201 or UPF 206 may use a rule, or formula, to determine what access a packet, or flow, should use. The NWDAF 205 may send the rule to the UPF 206 via the SMF 207 or alternatively, the rule may be provided as an operator policy, from another NF, or locally configured. The NDWAF 205 may send the rule to the UE 201 via the SMF 207 and NAS messaging as an ATSSS rule. An input to the rule may be measurement data. The NWDAF 205 may update the rule as network conditions change.

Figure 10:
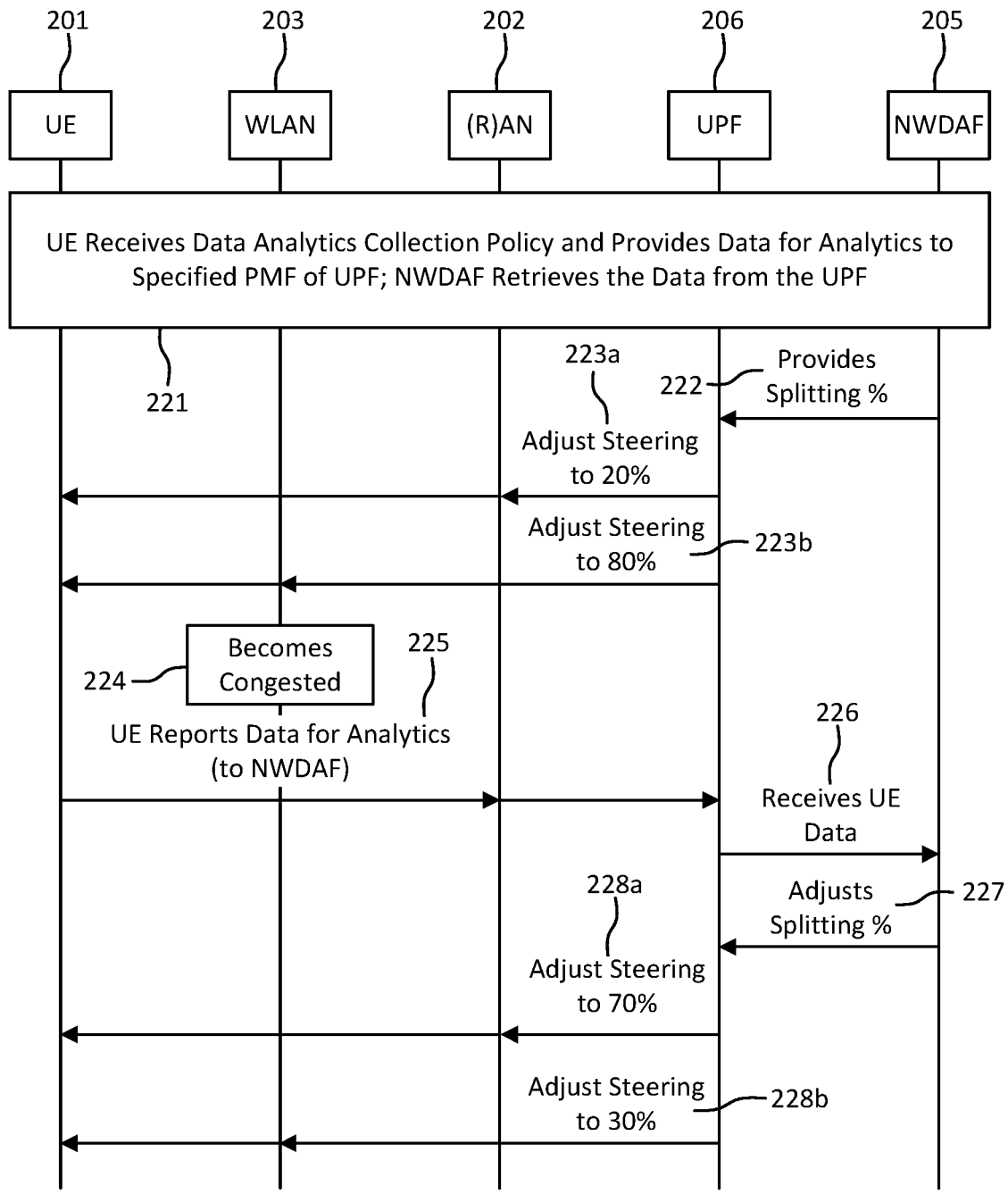
FIG. 10 illustrates an exemplary Data Analytics Driven Steering.

To illustrate the methodology further, an example is provided as shown in FIG. 10. This example shows the NWDAF 205 receiving data from the UE 201 and adjusting the splitting percentages between 3GPP (RAN) and non-3GPP (WLAN) accesses; the same procedure may be used to adjust a splitting, steering, or switching formula. With reference to FIG. 10, at step 221: The UE 201 has received the data analytics collection policy from one of the methods presented in this disclosure. Based on this policy, the UE 201 periodically provides data to the PMF within a UPF 206, which then notifies NWDAF 205. It is assumed the NWDAF 205 has subscribed to be notify of the data collected from the UE 201 to the PMF. In addition, the UE 201 may also be configured to report data due to certain events, such as loss of connection, lowered service experience or QoS, or based on mobility. At step 222: NWDAF 205 provides traffic splitting percentages for both 3GPP and non-3GPP accesses to the PMF. In this case, the UE data from step 221 indicates that wifi (e.g., WLAN 203) is available and the received bandwidth is good. As a result, NWDAF 205 supplies the following percentages as an example: 20% over 3GPP access and 80% over non-3GPP access. As an alternative, the NWDAF 205 may provide data to the UPF 206 to evaluate using the rule or formula the NWDAF 205 had previously provided to the UPF 206. At step 223a and step 223b: The UPF 206 splits the traffic to the UE 201 based on the percentages specified by the NWDAF 205 or based on the results from evaluating the rule or formula.

With continued reference to FIG. 10, at step 224: Some time later, the wifi network becomes congested due to more users connecting to the network. This may occur for example at a coffee shop where in the beginning, there were only a handful of users. Then as the day progresses, more users arrive and connect to the wifi network. The UE 201 experiences service degradation and notices the wifi network congestion based on the bandwidth it is currently receiving. At step 225: The UE 201 may be configured to report events that impacts service experience and hence sends data to the UPF 206 via the PMF protocol. The data sent may be packaged collectively as one Analytics ID as disclosed in Table 2 or the data may be categorized according to the Analytics ID defined in [4]. When using the disclosed Analytics ID, the UE 201 may provide the available data from Table 2. Not all data from Table 2 needs to be available before sending the report to PMF. At step 226: The UPF 206 notifies NWDAF 205 of the new data from the UE 201. At step 227: Based on data from the UE 201, the NWDAF 205 adjusts the traffic splitting percentages to move some traffic from non-3GPP access to 3GPP access. In this case, the NWDAF 205 sets the splitting percentages, for example, at: 70% for 3GPP access and 30% for non-3GPP access. Alternatively, the NWDAF 205 may provide data to the UPF 206 for evaluation using the NWDAF 205 provided rule or formula. At step 228a and step 228b: The UPF 206 splits the traffic to the UE 201 based on the new percentages specified by NWDAF 205 or based on the results of the evaluation of the NWDAF 205 provided rule or formula.

The use case shown in FIG. 10 may be extended further when the UE 201 exits the coffee shop then the UE 201 sends a report to the PMF that non-3GPP access is no longer available. The NWDAF 205 will then receive a notification and adjusts the steering percentages such that 100% of the traffic is routed through the 3GPP access and 0% is routed through the non-3GPP access.

Multi-USIM Steering

Another ATSSS steering mode may be defined to support multi-USIM UEs to take advantage of connecting to both 3GPP and non-3GPP accesses or between two 3GPP accesses such as between two 5G accesses in a time demultiplex manner. This new steering mode may require a multi-USIM UE 201 to register to 3GPP access for one USIM and register to non-3GPP (or another 3GPP) access for another USIM. PDU sessions may then be created over both 3GPP and non-3GPP (or another 3GPP) accesses using the MA PDU session establishment procedure and with the addition of a multi-USIM indicator to trigger the creation of ATSSS rules with the new steering mode. For the two 3GPP access case, two standalone PDU session establishment procedures may be executed in their respective systems and with the multi-USIM indicator to enable the new steering mode. This new steering mode may indicate to the network to steer traffic from an access that is not available to the other access that is available for PDU sessions belonging to different USIMs. This new steering mode may be applied to multi-USIM scenarios where the USIMs are from the same MNO with intra-MNO coordination but may also be applied to multi-USIM scenarios where the USIMs are from different MNOs with inter-MNO coordination. The application of this new steering mode may also be utilized in scenarios where a UE 201 communicates to both a PLMN and an SNPN to provide seamless communications between the PLMN and the SNPN.

Using FIG. 3 and the MA PDU session establishment procedure from [2] as references, the following enhancements are disclosed to enable the new steering mode for multi-USIM UEs. For the scenario where the new steering mode is applied to 3GPP only RATs, the MA PDU session procedure is replaced with the standalone PDU session establishment procedure. In regards to step 1 of FIG. 3, the UE 201 provides a 3-tuple consisting of a multi-USIM indicator with the temporary identifier and PDU session ID of the other USIM in the MA PDU Session Establishment request. The PDU session ID of the other USIM may be empty if the UE 201 has not yet created a PDU session for that USIM. In step 3 of FIG. 3, the AMF 208 informs the SMF 207 that the request is for a MA PDU Session and includes the multi-USIM indicator and PDU session ID (if available) of the other USIM. The MA PDU indicator may not be included in the standalone PDU session scenario. The AMF 208 may have already been notified by the UE 201 during registration procedures that the two USIMs are linked together. Therefore, the UE contexts maintained by the AMF 208 will have indicated the MA PDU session may include PDU session IDs of either USIM. In addition, authentication and authorization procedures have been executed to enable creating PDU sessions between the USIMs. In step 7 of FIG. 3, the SMF 207 sends an "MA PDU Request" indication and the multi-USIM indicator to the PCF in the SM Policy Control Create message. The PCF decides whether the MA PDU session is allowed or not based on operator policy or subscription data. The MA PDU session is replaced with a single PDU session in the standalone PDU session scenario. In addition, the PCF includes Policy Charging and Control (PCC) rules with ATSSS information that incorporates a new steering mode for multi-USIM. The SMF 207 derives both ATSSS and MAR rules to incorporate this new multi-USIM steering mode.

In the remaining steps of FIG. 3, the SMF 207 establishes the user-plane resources over the 3GPP access, e.g., over the access where the PDU Session Establishment Request was sent on. The N4 rules sent to the UPF 206 includes the new steering mode "Multi-USIM" or "MUSIM" in the Multi-Access Rule (MAR) with the appropriate CN tunnel information to forward data packets to the corresponding access networks, whether 3GPP or non-3GPP (or another 3GPP RAT). Likewise, the ATSSS rules include the "Multi-USIM" or "MUSIM" steering mode and are sent to the UE 201 in the accept response. The accept response may also include the same PDU session ID of the other USIM to be used as the PDU session ID for the current USIM. This links the PDU sessions together.

Figure 11:
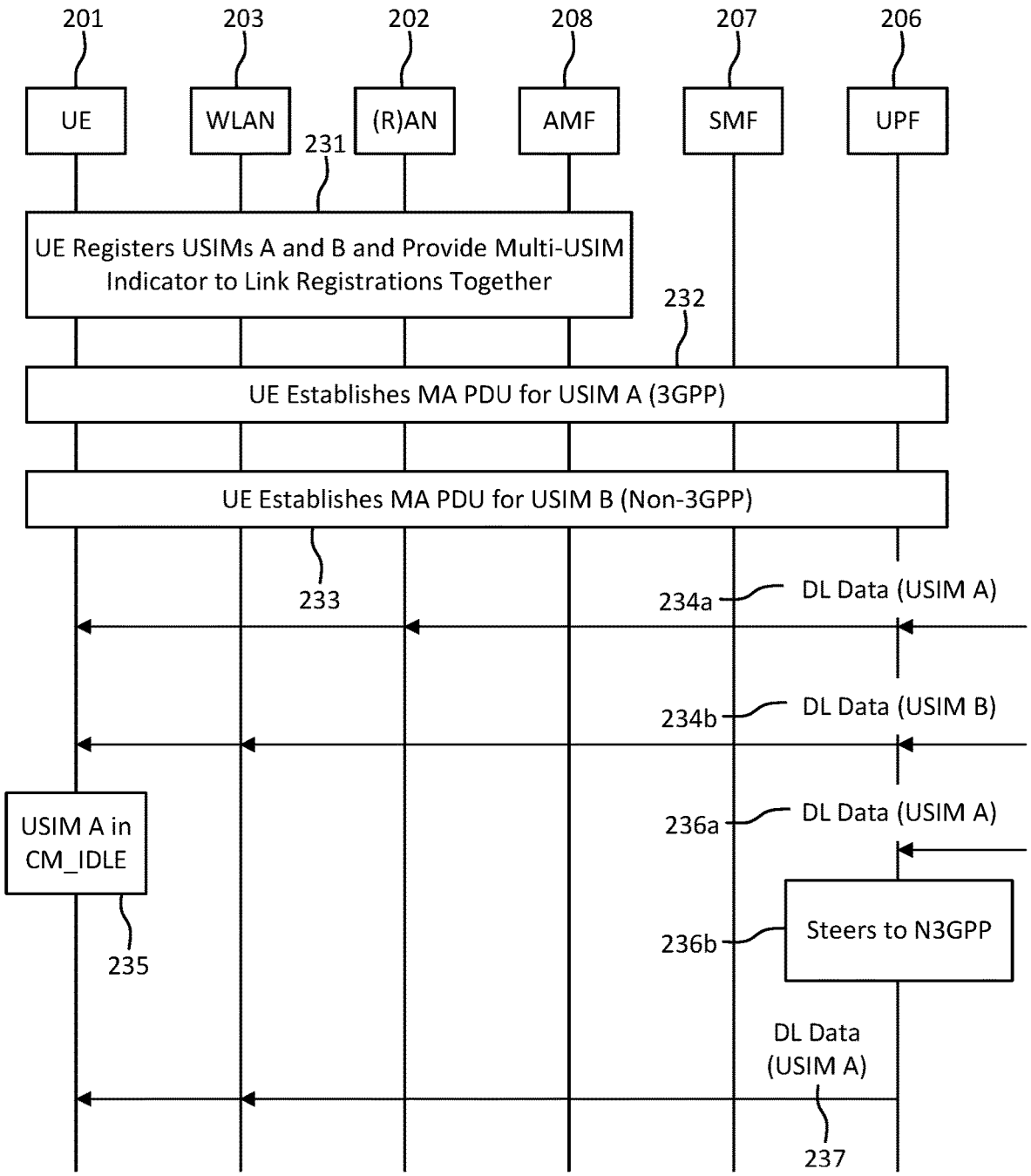
FIG. 11 illustrates an exemplary Multi-USIM Steering Mode.

FIG. 11 shows an example procedure of a multi-USIM UE 201 interacting with the core network 204 to utilize the multi-USIM steering mode between 3GPP (RAN 202) and non-3GPP accesses (WLAN 203). At step 231: A multi-USIM UE 201 registers USIMs A and B with a multi-USIM indicator and a temporary identifier of the other USIM, which links the registrations together. During each registration, the core network 204 authenticates and authorizes the other USIM to allow for the sharing of multi-access PDU sessions created for each USIM. At step 232: The UE 201 creates MA PDU for USIM A using the previously described procedure. At step 233: Likewise, the UE 201 creates an MA PDU for USIM B and the SMF 207 generates the ATSSS and MAR rules for the UE 201 and UPF 206, respectively. The PDU session ID may be the same as the PDU session ID associated with USIM A or it may be different. If the PDU session IDs are different, the SMF 207 should inform the UPF 206 that the PDU session IDs are linked together and therefore downlink data may be steered between the two PDU sessions. There will be a MAR created that informs the UPF 206 to steer data packets from an unavailable access to the available access.

Figure 1:
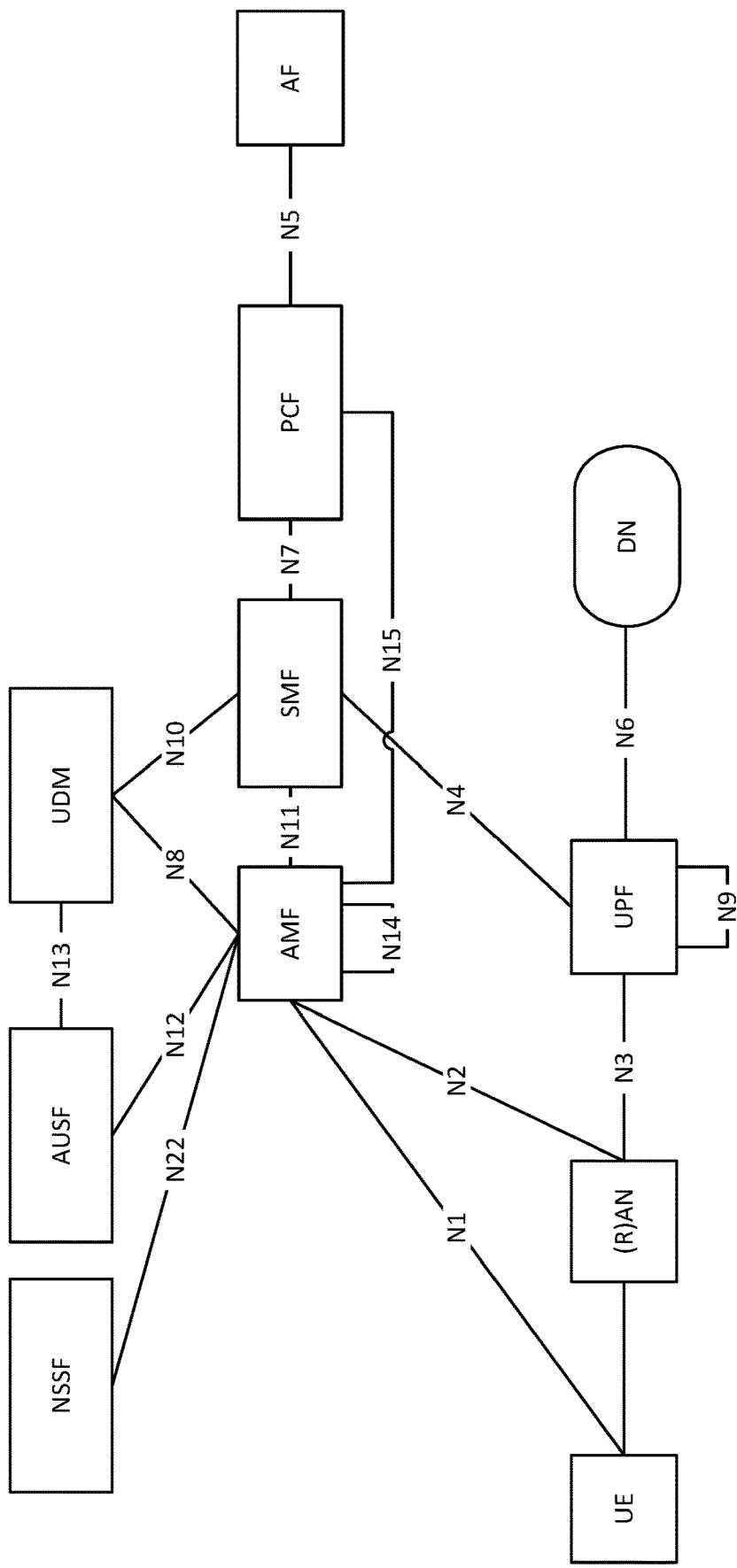
FIG. 1 illustrates an exemplary Non-Roaming 5G System Architecture in reference point representation.
Figure 2:
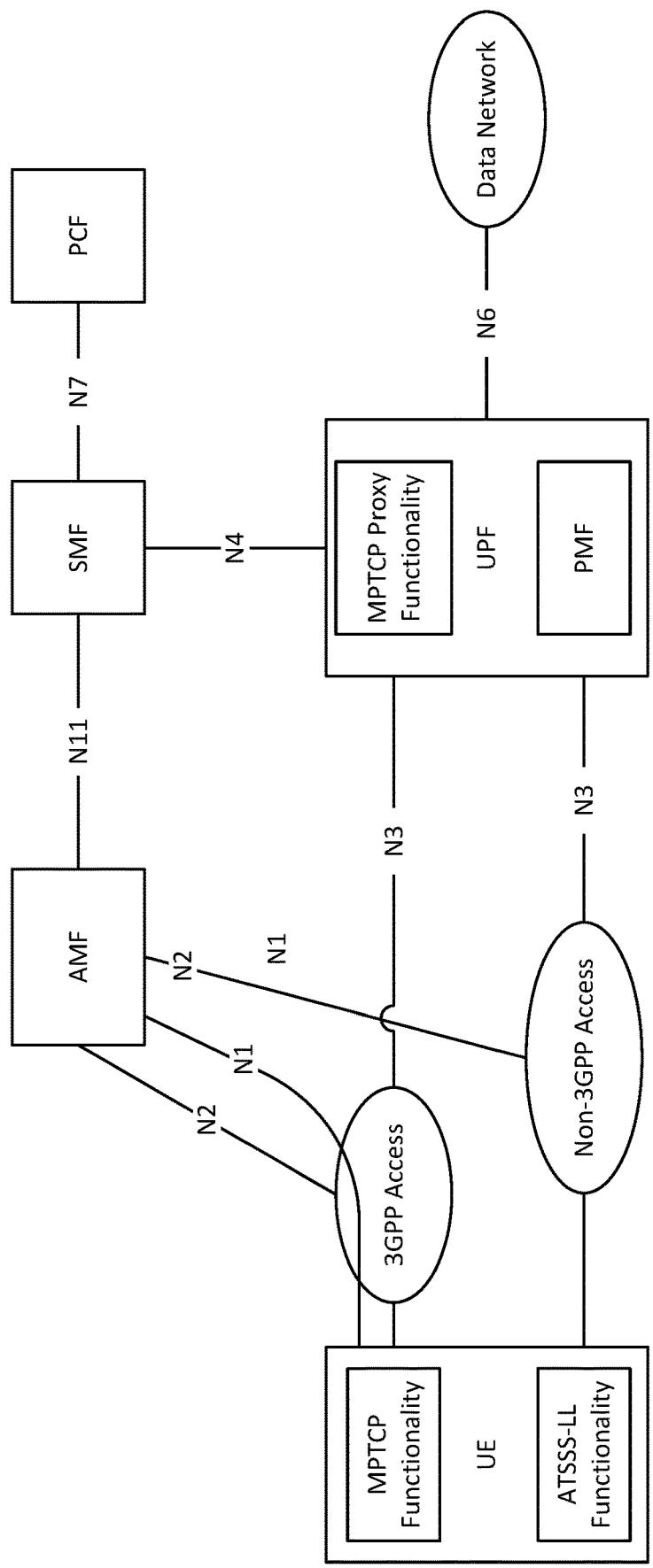
FIG. 2 illustrates an exemplary Non-roaming and Roaming with Local Breakout architecture for ATSSS support.

With continued reference to FIG. 11, at step 234: Downlink data is available and routed by the UPF 206 over the appropriate access networks: DL data for USIM A is steered over 3GPP access and DL data for USIM B is steered over non-3GPP access. Step 235: After some time, the UE 201 goes into CM_IDLE state for USIM A. At step 236: Downlink data is available for USIM A but there is no tunnel information available in the UPF 206 for USIM A. Rather than forwarding the DL data to SMF 207 and AMF 208 to page the UE 201, the UPF 206 utilizes the new Multi-USIM steering mode to steer the DL data from the PDU session associated with USIM A to the PDU session associated with USIM B based on the MAR and FAR. At step 237: UPF 206 steers the DL data for USIM A over the non-3GPP access to the UE 201 using the MAR created in step 233. As an example for this case, one of the MAR generated for the MA PDU session associated with USIM A specifies that if 3GPP access is not available, the data packet should be forwarded to a FAR that corresponds to the non-3GPP access associated with USIM B. The steering mode tells the UPF how to route traffic between 3GPP and Non-3GPP accesses (e.g., See FIG. 2 for what is meant by "access"). In this case, we state that the UPF "steer the DL data from the PDU session associated with USIM A to the PDU session associated with USIM B". Step 234 provides the details of which access is assigned to which USIM and step 236 explains why the UPF is steering the data using the new steering mode.

With the multi-USIM steering mode enabled, the UPF 206 may steer data traffic from the PDU session of an inactive USIM on one access to the PDU session of an active USIM on another access to avoid paging collisions for the inactive USIM. These PDU sessions were linked together during the PDU session establishment procedure that allows the UPF 206 to steer traffic between the two PDU sessions over different accesses. The UE 201 also performs similar steering over the different accesses (e.g. whether between 3GPP and non-3GPP accesses or between two 3GPP accesses) when sending UL data to the network. For the UE case, if a UE 201 has UL data for USIM A but the 3GPP access is not available and the non-3GPP access is available, the UE 201 can send the data for USIM A over the non-3GPP access associated with USIM B using the multi-USIM steering mode. The multi-USIM steering mode may also apply for cases where a multi-USIM UE TDMs between two 5G systems in which ATSSS is supported or between an ATSSS supported 5G system and an LTE system which supports ATSSS through interworking with the 5G system.

Configuration of UE Data Collection for Analytics

The NWDAF 205 can process data originating from the UE 201. The analytics results that come from processing UE data may be utilized by the OAM or other NFs to make decisions. 5GS system may be designed such that appropriate data are captured, which describe events that are detected at the UE 201 and describe the UE's context or UE's state. The data collection may be based on UE data collection rules and policies. These rules and policies may be configured at the UE 201 by the network. FIGS. 8A and 8B in previous section described general UE registration procedure, wherein UE data collection policies were delivered to the UE 201 when the UE registration was successful. UE data collection rules and policies may also be configured at the UE 201 in the event of UE policies update as described later in the 5G example section of this disclosure. The following sections describe what UE data are captured, when and how they are collected and sent to the NWDAF 205 in the core network 204.

The UE 201 may be configured with data collection rules and policies in the following ways:

First, On-demand, e.g., data is available when needed and can be collected. Data that are available and can be requested can be scheduled. Scheduled data are based on timers.

Second, Event-driven data, which may be based on local rules or events (e.g. every storage access), system events (e.g. data collected after each registration update).

The UE 201 may be also be configured with reporting rules. Reporting rules may be part of data collection policy. UE reporting rules may be one of the following:

First, scheduled, e.g., based solely on timers.

Second, event driven, such as based on system events, e.g., when UE 201 re-gains coverage.

While Table 2 offers an approach to group UE data into an analytics ID, the following descriptions disclose alternative approaches to which UE data may be grouped.

Configuration for On-Demand Data Collection from the UE

On-demand data can be those data which can be collected when needed. On-demand data can also be scheduled for collection. Scheduled data collection may be used in a variety of cases, e.g. for collecting reflect data whose occurrence is known ahead of time, so a schedule can be set for data collection. The data collection may be triggered by rules that are configured in the UE 201. The configuration procedure includes configuration of rules, which may include identifiers that indicate which data parameters need to be collected, time and frequency of collection. Hence, the UE data collection may be based on some pre-defined schedule. Therefore, the rules for data collection at the UE 201 may include the desired data parameter and supporting time attributes. The time attributes may indicate when the data should be collected and when the collected data should be reported. The parameters in Table 5 shows more UE centric data that may be collected by the UE that may be used by NWDAF 205 to detect the presence of cyber-attacks.

TABLE 5

Attributes for scheduled data collection

| Attributes | Descriptions |
| --- | --- |
| System data parameters | |
| Battery level | Percentage of remaining battery power |
| Memory utilization | Memory space utilized at a given time stamp |
| Memory to Storage delay | Delay due to big tasks (files) in the storage |
| Failed threads in CPU | CPU instruction flushed due to error |
| CPU pipeline performance | Success rate of commands in a CPU |

TABLE 5-continued

Attributes for scheduled data collection

| Attributes | Descriptions |
| --- | --- |
| CPU utilization | Percentage of utilization at a given time stamp |
| Organization efficiency | System organization efficiency, e.g. latency |
| CPU temperature | Temperature of the CPU at a given time stamp |
| Number of communication sessions | Number of open communication sessions (e.g. open sockets) |
| Task latency | Latency time of a task |
| UL data rate | Uplink data rate of a UE |
| DL data rate | Downlink data rate of a UE |
| Carrier power received | Strength of carrier sensed by the UE |
| CRC Errors | The total number of CRC errors detected |
| Sensor data parameters | |
| Speed of the device | Rate at which device is traveling. May involve multiple sensors. |
| Temperature | Temperature of the environment |
| GPS | Navigator of the device |
| acceleration | Rate of speed at a given time |
| position | Orientation of the device measured by gyroscope. |
| elevation | May involve GPS and other sensor to measure how high the device held from previous position. |
| humidity | Humidity of the air. |
| ECG data | Vital signs of a user |
| Bluetooth/ZigBee beacons | Measures presence of Bluetooth or Zigbee signals |
| Collection Time parameters | |
| Start time | Start time for data collection |
| End time | End time for data collection |
| Interval | Time gap specification between two collection triggers. |
| Frequency | How often data is collected per given unit of time |
| Sleep time | Time at which data collection is disabled |
| Mandatory Collection Conditions | Conditions that must be fulfilled in order for the UE to collect the parameter (e.g. the UE must attach to the HPLMN) |
| Disallowed Collection Conditions | Conditions that must be not be true in order for the UE to collect the parameter (e.g. the UE must not be roaming) |
| Reporting Time parameters | |
| Report window start time | Start time for a data reporting window |
| Report window end time | End time for a data reporting window |
| Mandatory Reporting Conditions | Conditions that must be fulfilled in order for the UE to send a report (e.g. the UE must attach to the HPLMN). |
| Disallowed Reporting Conditions | Conditions that must be not be true in order for the UE to send a report (e.g. the UE must not be roaming). |

Various layers in the UE 201 may have its own set of data that may be required at the NWDAF 205 for analysis. Scheduled data collection may be a continuous data collection processes such as tracking of GPS locations of a UE 201 after every pre-specified interval. A collection schedule may be pre-configured directly at the UE 201 or sent to the UE 201 after registration to the network.

It should also be appreciated that since, capabilities across different UEs may vary, a UE 201 may need to convey its data collection and supply capabilities to the network. The case in which UE data is collected and delivered to the network is based on UE's data collection and supply capability as described later in the disclosure.

The UE data may be sensor data, system data, time values, etc. Sensor data may be the data that is sensed and recorded from the available sensors in the UE 201. For example, a typical smartphone has multiple sensors. When activated, these sensors can continuously sense the environmental conditions. For example, direction of UE 201, acceleration of UE 201, GPS data, etc. Additionally, data can also be collected from within the UE 201, for example, a UE 201 can be configured to collect time data for every storage access; battery levels every few minutes; execution of UE policies; types of applications running, state of UE memory periodically or when a limit is met; number of notifications received, etc.

UE sensor data may be configured to collect data on an on-demand basis or data collection can be scheduled. However, the system data can be both on-demand or event driven. For instance, monitoring battery life every 15 minutes can be scheduled. However, storage access times cannot be scheduled. In other words, at what point of time the storage will be accessed is not known ahead of time.

Note that data collection rules may be thought of a template that specifies what data are to be collected and time and frequency of collection.

In the data driven cyber security application, UE 201 may be configured to observe memory and CPU utilization, speed by which battery is draining within a given duration, location of the device, number of requests within a given interval, the web addresses visited, files downloaded, application types running, types of services requested, speed of UE 201 when requests are happening, frequency of PDU session requests, target slice requested, number of PDU sessions requested, etc. Primary goal of an adversary could be to gain access into the UE system and further its attack towards the core network 204. If the adversary can gain access to the UE, it may exploit UE 201 in many ways. Based on a combination of different types of data collected from the UE 201 and a strategically designed algorithm may be able to flag a risky UE, which potentially could have been hijacked.

Network Enabled Data Request

Data may be collected by the network in an "ad-hoc" manner in an on-demand basis. This category of data collection involves network requesting data that are not pre-configured in the UE 201. In contrast, the network may require some data from the UE 201 at any point in time. For instance, NWDAF 205 may be instructed to verify certain system procedures or verify a set of data, which requires requesting data from the UE 201. For example, UE 201 may execute several URSP rules based on which the UE 201 chooses certain S-NSSAI, DNN, or SSC mode for an application ID. Execution of URSP may lead to sending data through a network slice and finally sending data to a specified data network. NWDAF 205 may be instructed to periodically verify if the URSP rules are executed correctly at the UE 201. For that matter, data on executed URSP rules may be requested by the network. NWDAF 205 may subscribe to the events in the network functions involved in network slices and the routes those packets take and, eventually compare the data collected from the UE 201 with the actual routes executed in the network to see if the URSP rules were executed correctly at the UE 201. Should any discrepancy be encountered, the NWDAF 205 may report it to the OAM or other functions so that proper course of actions may be taken. Alternatively, UE 201 data collection for accountability may be scheduled and periodic. Similarly, mechanisms may be implemented to verify QoS Rules and other SLA related policies.

The network requested data may be broken down into two categories. They may be one of the following: target data or supporting data.

Target data are proper data that may be compared with some other data such as the example discussed earlier where executed URSP rules were requested from the UE 201.

Supporting data may be data, such as contextual data, that may help draw correlation among the data collected to reach some conclusion. For instance, supporting data can help refine the probability of accuracy or degree of confidence.

Configurations for Event Driven Data Collection

Event driven data is the data that is generated when an event occurs. For these events, data collection may be achieved by following different methods, such as monitoring and capturing existing events or events captured by configured policies among others.

Monitoring and Capturing Existing Events

There are numerous processes happening in a UE. UE 201 can be configured to monitor those processes and internally trigger the data collection at points of interest. For example, data for execution of URSP policies count per given period; storage access times; notification when storage limit exceeds a specified capacity; types of commands executed in a row, etc. Table 6 depicts various event driven data attributes and their description.

TABLE 6

Attributes for Event Driven Data Collection

| Event Attributes | Description |
| --- | --- |
| UE storage access time | Report time data when the storage of UE is accessed. |
| UE memory load at a given time | Report memory load value at a given time. |
| Notification on storage limit | Report notification for confirmation and time value to indicate that the storage has reached a specified limit. |
| Attained a value in sensor reading | Report specified sensor value and time when the value was attained. |
| End of URSP execution and delay | Report time or latency for execution of URSP rules |
| A URSP rule executed | Report time and other contexts data when a URSP rule is executed. |
| User login times | Report user login time values. |
| Battery level attains a specified target limit | Report time value when the battery attains a specified level. |
| Types of commands executed in a row within specified time. | Capture and report types of command values (e.g. read memory, read storage and service request commands) executed in a row. |
| Congestion detection and duration | Report time duration of congestion value |
| Latency of a command or process | Report time value for a command or process |
| Application crash notification and context | Report time and application name value and context values (e.g. location, memory state, other active application names etc.) |
| Unverified application or functional software | Report application names and details if it is unverified. |
| Active group membership | Report number of groups the UE has active at a given time |
| Number of broadcast and multicast messages received between given times | Report number of broadcast and multicast messages received in each interval. |
| Applications downloaded within time period | Report description and numbers of applications downloaded within a given time. |
| Application usage percentage | Report application usage percentage within given time. |
| Continual notifications to certain servers. | Report notification frequency and times with target server IDs. |

TABLE 6-continued

Attributes for Event Driven Data Collection

| Event Attributes | Description |
|---|---|
| Data Collection Policies | |
| If (CPU Utilization < 50% ∧ Memory Utilization => 60% ∧ battery level < 10%) Then Get latency of URSP execution (where ∧ is logical AND) | Report latency value for URSP execution when CPU Utilization is greater than 50 percent, UE Memory Utilization is equal to or greater than 60 percent and UE's battery level is below 10% |
| If (receiver mode == broadcast v received mode == broadcast multicast) ∧ ANDSP Rule execution, Then Get CPU utilization (where ∧ is logical AND) | Report CPU utilization value when receiver mode is broadcast or multicast and when ANDSP is executed. |

Events Captured by Configured Policies

The second category of event driven data collection may be determined by configured data collection policies. A policy driven data specifies when certain predefined rules and specified constraints converge and data with specified parameter may be collected. Policy configuration may be directed to capture events and corresponding data of interest, which otherwise cannot be captured. For instance, a policy for data collection may be designed to capture data from the following scenario:

If the speed of the UE 201 may be above 35 mph and UE battery level is less than 50%; UE 201 achieves an elevation of 50 ft above the ground and; UE 201 may be within given cell numbers (e.g. 143, 144 and 146), then capture UL data rate for every PDU session for 20 seconds and hold.

Figure 12:
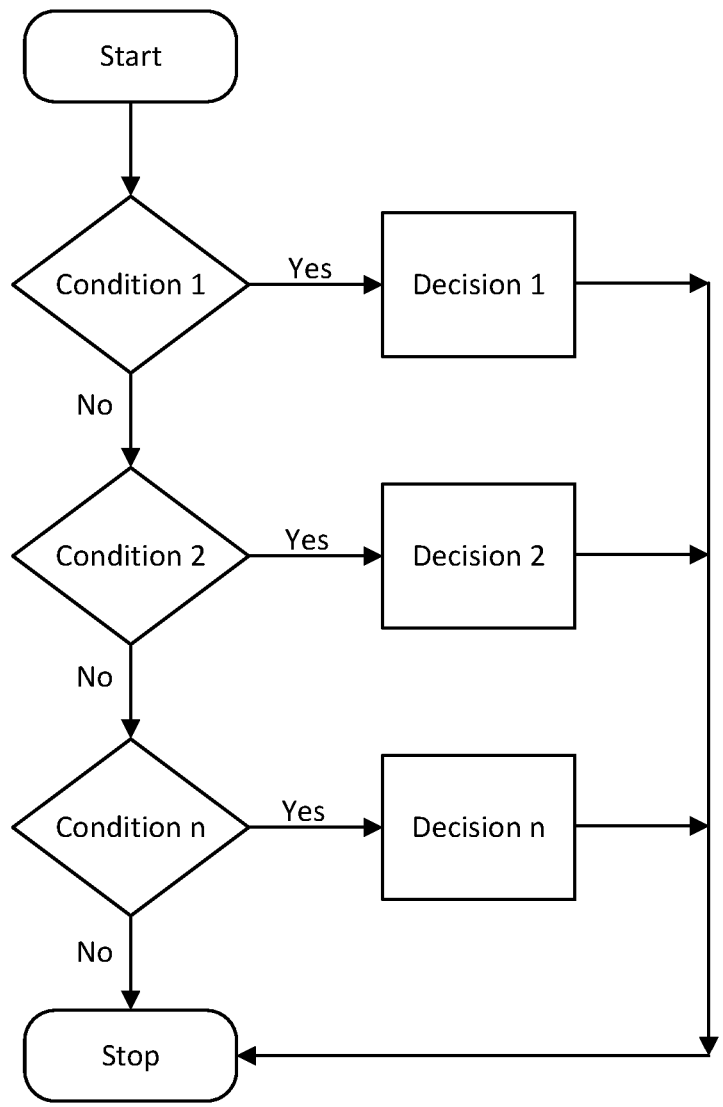
FIG. 12 illustrates an exemplary Event driven data collection policy structure.

Therefore, policies for data collection may take a structure of conditional statement, for example, if-else statements involving one or more conditions in a daisy chain fashion with logical operators. A data collection policy structure with if-else-elseif condition is depicted in FIG. 12. A Condition may be a set of events concatenated with a combination of logical OR and AND operators. Some example combinations of a Condition are as follows:
  a. Event A AND Event B AND Event C
  b. Event A OR Event B OR Event C
  c. (Event A AND Event B) OR Event C The decision for a Condition (e.g. Condition 1) would be to collect the outcome from the convergence of events guided by the logic.

Two separate conditions in the "if-else-elseif" policy structure refers to as OR logical structure with priority. For instance, if the Condition 1 is not met then Condition 2 is taken into consideration and then the next Condition. It should be noted that Condition 2 shall be considered if and only if Condition 1 is not met. Furthermore, only one condition will be realized from the series of Conditions. This is true for multiple Conditions in series. FIG. 12 depicts a policy structure.

UE policies may have additional constraints based on different contexts. There may be limitation in time, for example, for how long the data may be collected, or there may exist a limitation on volume of data, for example, how much data can be collected. Volume of data may be driven by storage capacity or other requirements. In scenarios such as resource scarcity or security compliance like least privilege, the UE 201 may need to establish the priority of the data collection. This means that some of the data or sensors get advantage over others. These constraints can be incorporated into UE data collection policies.

Collect, Hold and Send UE Data

UE 201 may be configured to collect data for certain period and send it to the NWDAF 205. For example, UE 201 could be configured to collect GPS or sensor readings every 5 minutes for 24 hours before sending it to the NWDAF 205. The collected data with time stamps and other context data may be packaged and sent to the network at the end of the day. Similarly, UE 201 may be configured to send the collected data only if some event occurs. For example, UE 201 could be configured to collect memory utilization data every 60 seconds for certain UE 201 processes, temporarily stored in the UE storage and this information could be reported to the network only when UE 201 moves into a new cell which acts as a trigger. The trigger for sending data to the network could also be time based. For example, UE application crash data could be collected over a day and sent to the network. The collected data may involve time of crash, application ID, memory utilized at that point and other contexts such as how many other apps were open, CPU utilization, cell strength, etc. These data could be collected and stored in the UE 201 locally and sent to the network at the end of the day or at a specified time.

In a Local Breakout roaming scenario, a VPLMN may be configured to send call detail record (CDR) and other charging information to the HPLMN. In addition, UE 201 may be configured to report the same information as contained in the CDR and other charging information to the HPLMN at a later time, to verify if the CDR collected from the VPLMN is accurate. UE 201 may collect the data and save it for future transmission to the HPLMN. When UE 201 returns back to the HPLMN, a procedure such as the registration update may trigger UE 201 to send the CDR information to the home network.

Sending UE Data Using PDU Sessions

A general method for sending the collected data is via an established a PDU session between the UE 201 and the core network 204. However, PDU sessions may be temporary. Therefore, if data was being sent continuously via a PDU session and if the PDU session is released or deactivated, the collection and delivery may be interrupted. In this scenario, there can be multiple different cases.

First, if there are other on-going PDU sessions, continuity of data delivery can be achieved by steering data to a different PDU session.

Second, if there are not any other on-going PDU sessions, the data delivery will be interrupted. However, data collection can still be continued and stored along with time stamps in a temporary UE storage and when a new PDU session is later established, the data from the temporary UE storage could be transferred to the NWDAF 205. But, if the data collection and delivery is in real time, the collected data may need to be flushed until the UE 201 establishes a new PDU session and data can be sent.

Alternatively, depending upon the type of data delivery, the data could be sent to the network via NAS messaging. The UE may include data collected for the NWDAF 205 and send it within a NAS container to the AMF, which then forwards the container to the NWDAF 205.

Collect and Hold Data from Out-of-Coverage UE

There are multiple scenarios of UE data collection and the scenario when UE 201 may be out-of-coverage.

In a first scenario, the UE 201 starts collecting data during coverage and UE 201 goes out of coverage.

In a second scenario, the UE 201 needs to collect data only when UE 201 may be out of coverage UE Starts Collecting Data During Coverage and UE Goes Out of Coverage The data collection may be ongoing where UE 201 may continuously be collecting data and sending to the network. When the in-coverage UE 201 goes out of coverage, sensors such as GPS and accelerometer can still function, and UE 201 can continue to collect data from these sensors.

If UE 201 was configured to report the collected data to the network, as it encounters itself of being out of coverage. It could start storing the collected data in a temporary storage within the UE 201. Whenever the UE 201 comes back into network coverage, it could then send the collected data to the network as the connection is established.

Data Collection when UE is Out of Coverage

The data collection on the other hand, may only be initiated when the UE 201 may be out of coverage. Similar to the previous case, the UE 201 may need to start collecting data and store it in a temporary storage within UE 201 and send it to the network when UE 201 comes back online.

For both the cases, it may be necessary to put limit on how long (time) and/or how much data (volume) the UE 201 should continue to collect when UE 201 goes out of coverage. In addition, if there are many active points of data collection, the volume of the data collected is prone to increase rapidly. Consequently, the UE storage space may not be able to handle the volume of collected data for very long. Given this scenario, the UE 201 may need to establish the priority of the data collection. This means that some of the sensors data or system data collection may need to be disabled temporarily and therefore, only the most important data may be collected for specified time or capacity. Defining priority for data collection may also depend on type of UE 201.

Another factor is the time duration for which the UE 201 may be out of coverage. The time duration for UE's out of coverage may be variable and can be minimal at times. Hence, disabling and enabling data collection frequently may cause degradation in performance and may drain battery power. Therefore, a time limit should be defined when UE 201 needs to stop or disable collecting data. This could also be limited by the temporary storage capacity.

The UE 201 may also be able to utilize side link and use UE-to-Network-Relay to send the data. Policies could be designed to consider PC5 (ProSe) interface to transfer UE 201 collected data to the network when the UE 201 may be out of coverage.

UE Capabilities-Based Data Selection and Collection

With regard to previous descriptions, data can be configured based on what NWDAF 205 needs. Once the needed data has been identified, the parameters for collection of data could be configured as scheduled data collection or appropriate data collection policies could be configured in the UE 201 such that data are collected based on the event driven policies.

Figure 13:
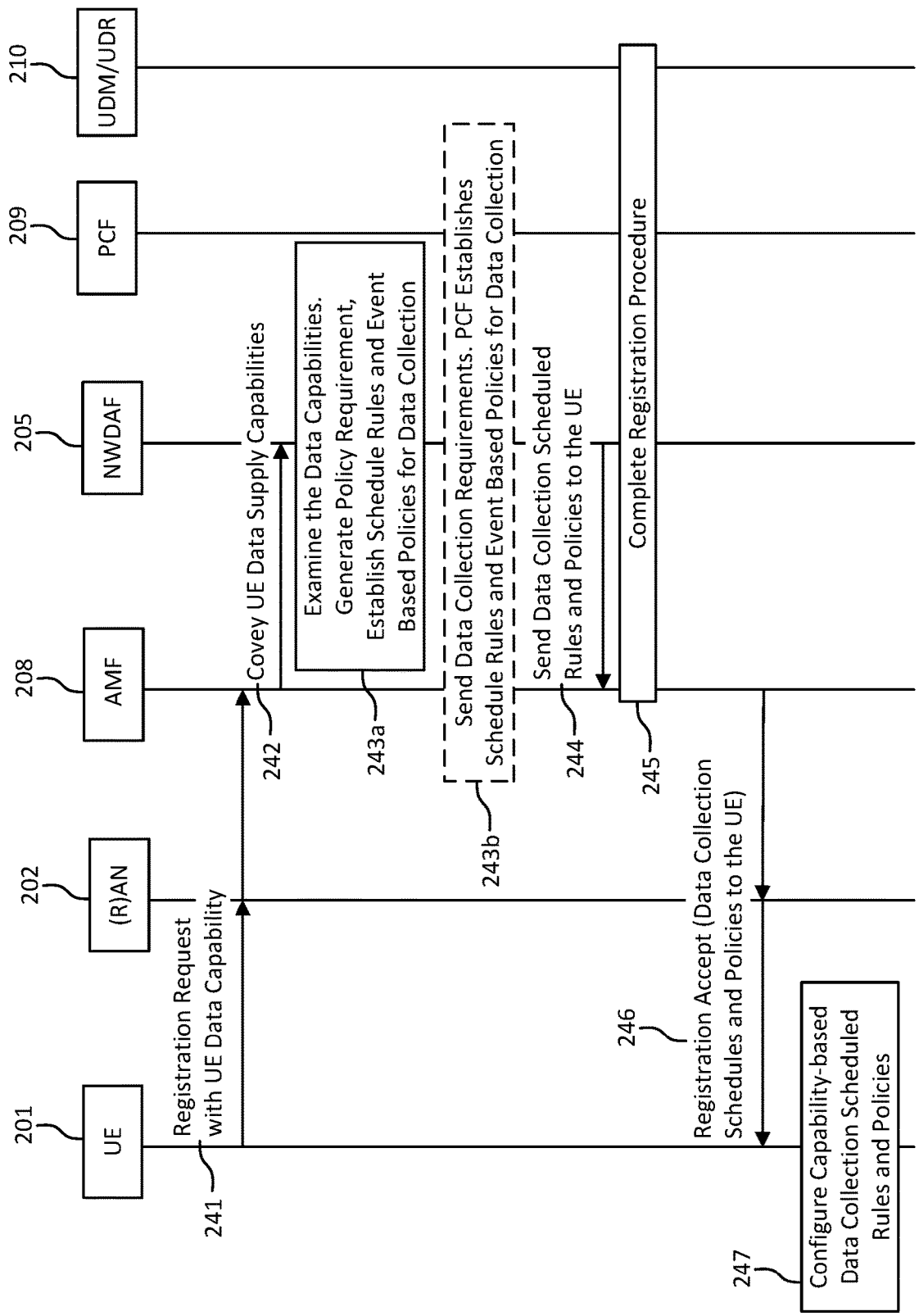
FIG. 13 illustrates an exemplary UE capability-based data collection rules and policies configuration.

But data collection may be constrained by what UE 201 can offer. Not all UE 201 has the same capability to supply data or capability to collect certain type of data. This capability may be based on type of UE, type of application it runs, privacy, and security constraints, etc. Hence, the UE 201 may need to convey UE data collection capabilities before NWDAF 205 in the core network 204 can demand for the required data or configure policies demanding required data. FIG. 13 shows an enhancement in registration procedure wherein a UE 201 may be able to send its data supply capabilities to the core network 204, based on which the NWDAF 205 may be able to craft data collection requirements and policies and send it to the UE 201. Note that previously it was disclosed that a UE 201 may provide analytics reporting capability indicator to the core network 204 and receive a data analytics collection policy. The procedure in FIG. 13 adds support for a UE 201 to provide UE 201 capabilities to the core network 204 so an NWDAF 205 may derive collection rules from the available capabilities in the UE 201.

In Step 241 of FIG. 13, UE 201 sends registration request to the network via RAN 202. In the registration request message, UE 201 may include UE data collection capability (UDCC). UDCC includes the details about what data UE 201 can collect and supply to the network upon request. It includes types of data, sensors type parameters, sensor data types, context data parameters for each sensor, data parameters from different layers of the UE systems, data schema information for each data type, etc. UDCC also may include constraint on what data could be collected from the UE 201. For example, UDCC may already cover privacy or security aspect of the UE 201 and not offer data such as UE memory utilization data for analytics. Alternatively, UDCC may be pre-configured at the UE 201.

In Step 242 of FIG. 13, AMF 208 receives the registration request and identifies UDCC indication. NWDAF 205 may have subscribed to AMF 208 and hence, AMF 208 invokes Namf_Communication_N1MessageNotify to the NWDAF 205 which conveys the UDCC information.

In Step 243-a of FIG. 13, NWDAF 205 receives UDCC information from the AMF. NWDAF 205 may parse the UDCC information and, identify what data are available from the UE 201. Based on the data parameters available NWDAF 205 may prepare rules and policy requirements such as what type of policy is required. For instance, NWDAF 205 may consider a simple configuration command or data collection rule instead of complex context-aware data collection policy.

Based on the policy requirements identified, NWDAF 205 may use an inbuilt policy generator function to generate required data collection policy. As discussed previously, data collection requirement may simply include configuration of scheduled data collection rules or event driven data collection policies or both.

Alternatively, the UDCC may be sent to the OAM, where it may be examined. OAM may compose policies or prepare requirements for policies and, send those requirements to the PCF where policies are built.

In Step 243-b, of FIG. 13 Alternatively, NWDAF 205 may request PCF 209 to generate data collection policies. Once NWDAF 205 receives UDCC from the UE 201 via AMF 208, it identifies the UE's capability for data collection and delivery and prepares requirement for policy generation. It may request data collection policy to the PCF 209 by sending the rules and policy requirements. PCF 209 may prepare required data collection policies and send back to the NWDAF 205 or AMF.

In Step 244 of FIG. 13, if NWDAF 205 generated the UE data collection rules and policies, it sends them to the AMF 208.

In Step 245 of FIG. 13, regular registration process continues. As step 242-step 244 of FIG. 13 are happening, there may be an ongoing general registration process.

In Step 246 of FIG. 13, provided that the UE registration procedure is successful, the AMF 208 prepares a Registration Accept message for the UE 201. The AMF 208 may include UE data collection rules and policies in the Registration Accept message and send it to the UE 201 via RAN.

In Step 247 of FIG. 13, the UE 201 receives UE data collection rules and policies in the Registration Accept Message. UE 201 may configure itself for data collection. Data collection, hence, falls within the UDCC criteria.

Actions Based on NWDAF Data Analytics

NDWAF 205 may be enhanced to collect data from the UE 201 as discussed in previous sections. The NWDAF 205 may use data that is collected from UEs and data that is collected from NFs as input data for analytics. The data analytics outcomes may be sent to different NFs, based on which, NFs may take action.

NWDAF Analytics for NFs

The NWDAF analytics may guide the NFs to take some action such that it may need to re-configure the NFs. The re-configuration can involve reconfiguration of different policies, updating subscriptions, updating timer values for NFs, restricting UEs from service, etc., wherein the impact may be within the scope of core network 204. This may impact the UE 201 indirectly. For example, the core network 204 may fire up (e.g., generate or activate) two different UPFs and split the UE traffic.

NWDAF Analytics Impact on UE

The NWDAF analytics may, on the other hand, impact UEs 201 in such a way that may change the behavior of the UE 201. When NFs act, UE 201 may be impacted in multiple ways.

In a first way, the NWDAF data analytics outcome may influence the NFs to make changes as discussed previously. For example, the NWDAF 205 may be tracking UE behavior and the behavior of different network slices. Based on the data received from the UE 201, the NWDAF 205 produces analytics and sends it to the NFs. Based on the data analytics report received, the NFs may consequently treat the UE 201 differently. For instance, the traffic from the UE 201 may be divided into separate UPFs, multiple SMF 207 instances may be assigned for the UE's traffic, timer values within the SMF 207 or AMF 208 may change, timer values that are sent to the UE 201 may change, etc.

In a second way, the NWDAF data analytics outcome may impact the NFs to make changes, but the changes made by the NFs may impact the UE 201 and hence, the immediate impact is evident at the UE 201. For instance, based on the UE behavior data, which may include data about registration behavior, locations visited, frequencies switched, the services requested from the network, applications used, type of tunneling used, etc., the NWDAF 205 may perform data analysis. As a result of the NWDAF data analytics report conveyed to the NFs (e.g., AMF, PCF, UDM etc.), the network may decide to steer the UE 201 to a different network slice. This decision may translate to the update of UE Subscription information at the UDM, sending to the UE 201 a new set of allowed S-NSSAIs, sending updated URSP policies, UE configuration update, etc.

Figure 14:
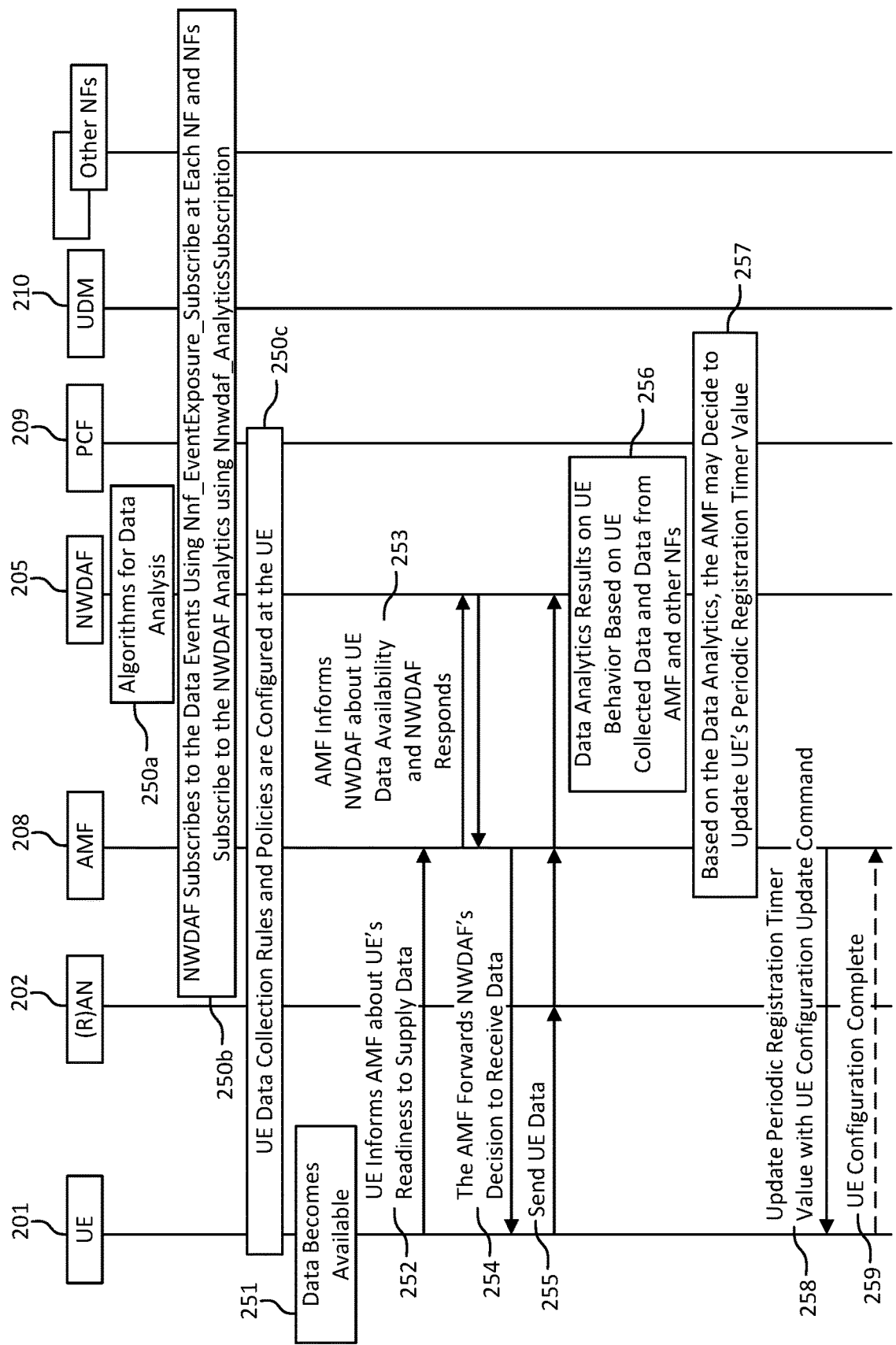
FIG. 14 illustrates an exemplary NWDAF driven UE timer update with UE Configuration Update command.

FIG. 14 involves an example procedure where NWDAF analytics influences NFs to make changes which impacts the UE 201.

NWDAF Driven Periodic Registration Timer Update Via UE Configuration Update

This section presents an example procedure wherein data analytics produced by the NWDAF, which is based on the data collected from the UE 201 and the NFs in the core network 204, may consequently enable the AMF 208 to update UE configuration. FIG. 14 depicts such a procedure.

In Step 250a of FIG. 14-a NWDAF 205 is equipped with data analytics functionality which consists of algorithms (recursive algorithms, machine learning algorithms, numeric algorithms, etc.) whose analytics results can help make decisions.

In Step 250-b of FIG. 14 NWDAF 205 subscribes to the data events from NFs including the AMF 208 using Nnf_EventExposure_Subscribe. Similarly, the NFs may subscribe to the NWDAF analytics using Nnwdaf_AnalyticsSubscription_Subscribe.

In Step 250-c of FIG. 14, the 5GS may be enhanced wherein, network configures UE data collection rules and policies at the UE 201. As discussed previously, these rules and policies may be delivered during UE registration, UE registration update or UE configuration update procedure. Alternatively, the rules and policies may be pre-configured locally in the UE 201.

In Step 251 of FIG. 14, the configured UE data collection rules or policies are executed and UE 201 may be ready to send data to the network.

In Step 252 of FIG. 14, UE 201 may inform to the AMF 208 about its readiness to supply data to the NWDAF 205.

In Step 253 of FIG. 14, the AMF 208 may inform the NWDAF 205 about UE's readiness to send data. NWDAF 205 may prepare itself to receive UE data and send an acknowledgment back to the AMF.

In Step 254 of FIG. 14, upon receiving the acknowledgment from the NWDAF 205, the AMF 208 may send a ready-to-receive UE data signal to the UE 201.

Note that messages in step 250-c—step 254 may be exchanged via NAS or PDU Session.

In Step 255 of FIG. 14, UE 201 may be enhanced to collect data based on the UE data collection rules and policies configured by the network at the UE 201 and, send the collected data over to the NWDAF 205 during a PDU Session. The data may be scheduled data or event driven data. Alternatively, UE 201 may send the collected data using NAS messaging.

In Step 256 of FIG. 14, NWDAF 205 may analyze the collected data. NWDAF 205 may also collect data from other NFs including the AMF 208 and then produce data analytics results. The analytics results may be committed for each NF in the core network 204.

In Step 257 of FIG. 14, the NWDAF 205 may send the data analytics outcome to the AMF 208 by means of NWDAF_AnalyticsSubscription_Notify. Based on the analytics result the AMF 208 may elect to update the Periodic Registration Timer value for the UE 201. AMF 208 may update this change in the UE Subscription at the UDM/UDR. In addition, network may establish a new timer policy, which can incorporate dynamic conditions of the UE 201, wherein the policy may direct the UE 201 on what timer value to use when certain condition is met. Hence, the timer policy may take a form of conditional if-else statement. For instance, if UE 201 elects to use S-NSSAI 'X' and targets to reach DNN 'Q', UE 201 may use Registration Update timer 'A', otherwise, it may use Registration Timer 'B'. The following is a list of example timer policies that may be sent to the AMF.

In a first timer policy, a timer policy may provide the UE 201 with a Service Gap Timer for each slice in the UE's Allowed or Configured S-NSSAI and the UE 201 may apply the largest Service Game Timer value of any slice that has an active PDU session.

In a second timer policy, a timer policy may provide the rules that indicate that Reflective QoS Timers and PDU Session Release Timers should be extended or shortened when the UE 201 may be registered to the certain slices, in certain areas, or running certain types of applications. This may be useful in scenarios where the optimal Reflective QoS Timer and PDU Session Release Timers depends on what applications the UE 201 may be likely to be running.

In a third timer policy, a timer policy may indicate that the periodic RAN Notification Area Update timer or the UE Non-3GPP Deregistration timer should be extended or shortened when the UE 201 may be registered to the certain slices, in certain areas, running certain types of applications, or moving at a certain velocity.

In Step 258 of FIG. 14, the AMF 208 sends UE Configuration Update Command including UE parameters, which includes the updated Periodic Registration Timer value or updated UE timer policy. The change in Periodic Registration Timer impacts change in other timer values such as the mobile reachable timer and Mobility Management back-off time for UE 201.

In Step 259 of FIG. 14, if the UE Configuration Update Indication requires acknowledgement of the UE Configuration Update Command, then the UE 201 shall send a UE Configuration Update complete message to the AMF.

UE Data Privacy and Utilization

3GPP TR 23.700-91 V0.3.0 [9] study indicates a need for user privacy during the collection and utilization of UE data by the NWDAF 205. Although the study scopes out the user consent aspect for authorization of data collection for data analytics, there are aspects of data collection for which, privacy and usage control of the data is critical. This section discusses mechanisms to control data and data utilization so as to protect privacy aspects of the UE 201.

Control Over Data Utilization

Data utilization can be limited by establishing a compliance and utilization policies in the 5GS. An agreement between the user of the UE 201 and the MNO may be established wherein, the usage of collected data may be limited by establishing the following:

First, a cardinality for the type of data collected may be established, which mandates how many times the data may be used for analytics by the NWDAF 205. UE 201 may be enhanced to mark the cardinality of the data before sending it to the network.

Second, time limitation on how long the UE 201 collected data can be stored in the network by the MNO may be established.

Third, any resulting NWDAF analytics data information, modified or not, may not be shared by the network to a third party without consent of the user. User consent is required if UE data analytics information is shared outside of the PLMN where UE 201 may be registered. 5GS system may be enhanced wherein the core network 204 must get user consent from the UE 201 if network is to share the collected UE data or the data analytics results to a third party.

Fourth, when required, user of the UE 201 must have access to the collected data and able to trigger 5GS to flush the data collected from the UE 201 or collected in the core network 204 on UE's behalf. Note that this feature of user privacy is mandated by GDPR in Europe.

Note that for each point discussed, an accountability report may be created. The requirements for control of data utilization may be driven by SLA between the service provider (MNO) and the user (consumer) of the service and the UE 201. The accountability report is the basis for whether the governance policies (e.g., GDPR) or SLAs complied to a satisfactory level. The accountability report may be stored on behalf of the UE 201 in the network, reported to the OAM or may be sent to the UE 201.

Limiting Data at the UE

UE 201 data may be limited by following mechanisms, such as preprocessing or based on sector, among other things.

Limiting Data by Preprocessing

Data collected from the UE 201 in its original form may be valuable. However, data may be required to be limited for privacy, security, or compliance reasons. To reduce the risk of collected data from being used against the UE 201, the UE 201 may be configured with a capability to preprocess the data before sending it for data analysis. Preprocessing may involve the following:

Packaging data: Data may be packaged such that only information that needs to be shared are included in the schema.

Filtering data: Data may be limited based on some criteria (e.g. intensity, sensor type, layer from where it is collected, user information, sector of the system, location where it was collected, the equipment handling entity (authority) etc.). For instance, UE CPU utilization and memory utilization data may be more critical than sharing UE's gyroscope data.

Anonymizing data: Data may be anonymized before sending it to the network. Anonymization may include removing information not just limited to user identity but also information such as CPU types, Manufacturer IDs, Model batch number, country made etc.

Aggregating data: Data may be aggregated before it is sent to the network. For example, an average of collected data may be sent. This may be for privacy as well as network performance reasons.

Limiting Data Based on Sector

Data may be collected from various layers and sectors in the UE 201. The UE 201 may be equipped to limit the collection and delivery of UE data based on where the data is collected from. For example, application layer data or, data that relates to CPU and memory utilization may not be sent for analytics.

User Control Over UE Data Collection

The user may need to have control over data collection on its device. Although, a different set of agreement may have been previously made for data collection, user may need a capability to control when and where the data should not be collected. Stopping data collection may be dynamic and driven by user's desires. For example, a user may not want data to be collected when the user is sleeping, between certain times, for certain duration or at certain places etc. Therefore, a UE 201 may be equipped with a capability that provides user to disable or enable data collection from the UE 201.

User control for data collection may be further extended during data collection policy updates from the network. When a new policy update is requested to the UE 201 or arrives at the UE 201, UE 201 may trigger a consent for user to accept the data collection policy update or reject it, as UE data collection policy may be driven by UE 201 capabilities which may further depend on UE contexts such as location, time, active user and user's attributes (e.g. multi-user scenario), Multi-SIM, etc.

5G Examples

Previous sections disclosed various aspects of UE data collection which included types of UE data collected, trigger for data collection and, rules and policies that can direct the trigger instants for collection. Furthermore, it is disclosed to utilize UE Registration procedure to indicate to the network the UE's capability for data collection and, to deliver UE data collection policies to the UE 201 with the UE Registration Accept or UE Configuration Update message.

The data collection rules for scheduled data collection as well as event driven UE data collection policies described in the previous sections, may be delivered and configured at the UE 201 via the UE Registration Accept message during UE's general registration procedure or UE registration update procedure.

The UE data collection policy discussed previously included data collection from the UE 201 during a PDU session. However, various types of data may also be collected via control plane via NAS messaging.

In addition to UE registration procedure, UE data collection rules and policies may be delivered and configured at the UE 201 at any time via UE Configuration Update procedure. The general UE Configuration Update procedure for transparent UE Policy delivery procedure from clause 4.2.4.3 of TS 23.502 [2] may be used with some modification as described in FIG. 15.

Figure 15:
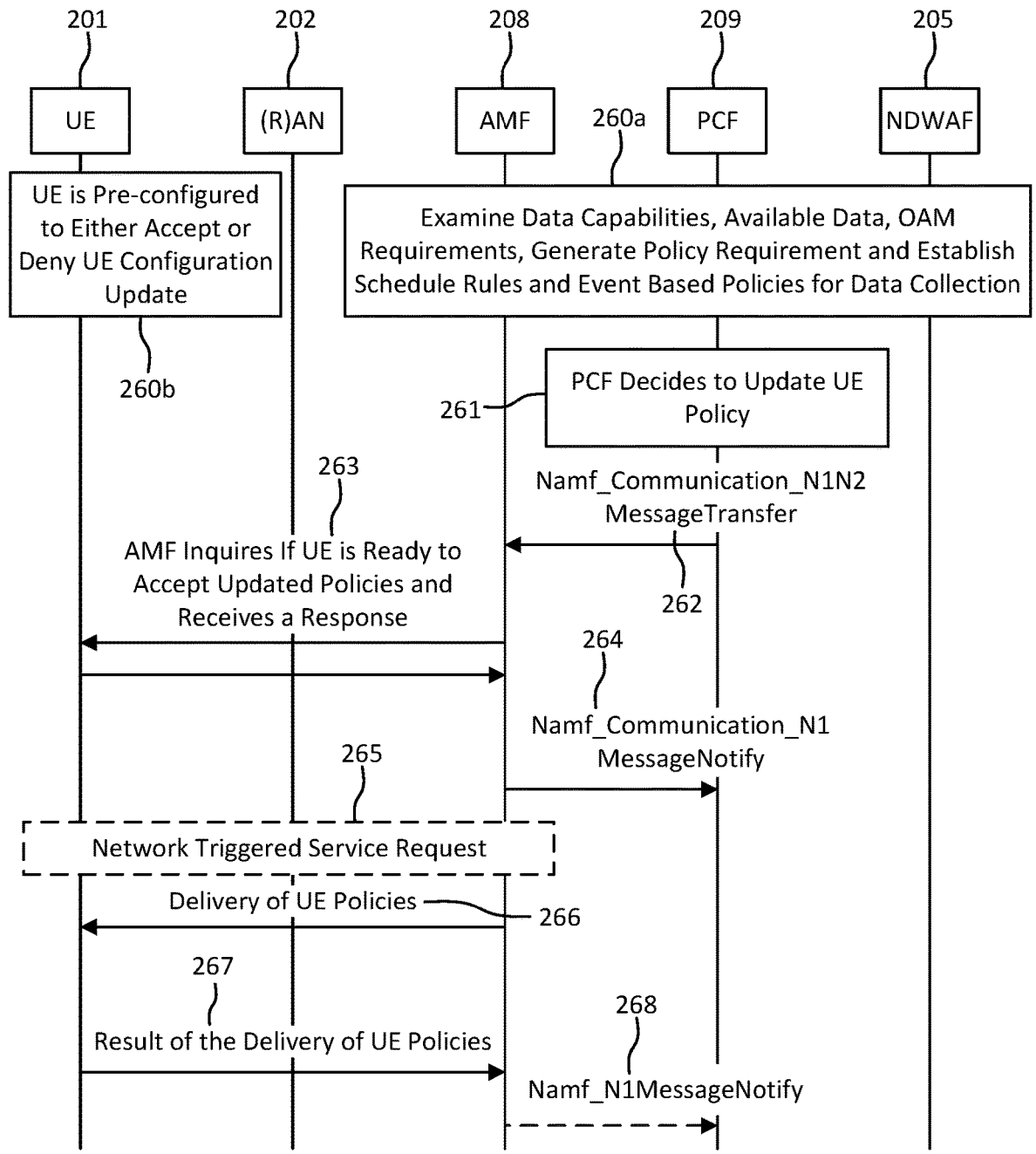
FIG. 15 illustrates an exemplary UE Data Collection Policy Delivery using UE Configuration Update procedure.

In Step 260-*a* of FIG. 15, NWDAF 205 may participate along with AMF 208 and other NFs (not shown in the FIG. 15) in generating requirements for UE data collection rules and policies, which may be based on OAM requirements, NF requirements, present algorithms, available data, UE data delivery capabilities (FIG. 13) etc. The requirement may be conveyed to the PCF 209. PCF 209 may generate UE data collection rules and policies.

In Step 260-*b* of FIG. 15, UE 201 may be configured to either accept or deny UE configuration update from the network for UE data collection. A user of the UE 201 may use GUI to choose such configuration.

In Step 261 of FIG. 15, PCF decides to update UE data collection rules and policies procedures based on triggering conditions such as an initial registration, registration with 5GS when the UE 201 moves from EPS to 5GS, or need for updating UE policy such as network triggered UE policy update case (e.g. the change of UE location, the change of Subscribed S-NSSAIs etc.), trigger to begin collection of data with updated policy etc.

In Step 262 of FIG. 15, PCF invokes Namf_Communication_N1N2MessageTransfer service operation provided by the AMF. UE Policy Container includes UE data collection rules and policies.

In Step 263 of FIG. 15, UE 201 may be notified by the network about the UE data collection policy update. UE 201 sends a response to the AMF 208 about UE's selection to either accept or deny the policy configuration update.

In Step 264 of FIG. 15, the AMF 208 notifies the PCF 209 using Namf_Communication_N1MessageNotify about whether UE 201 can accept policy configuration update.

In Step 265 of FIG. 15, Provided that UE 201 can accept the UE configuration update, the AMF 208 may trigger service request as described in section 4.2.3.3 of TS 23.502 [2].

If the user has opted out from accepting updated UE data collection policy configuration, the AMF 208 may not send the configuration update. Otherwise, UE 201 may receive UE policy update.

Note that UE 201 may be set to always receive UE configuration update from the network. In that case, UE 201 may always receive UE configuration update from the network. The data collection configuration, such as what data to collect, when to collect and send them to the network may be adjusted using local policy configuration at the UE 201.

In Step 266 of FIG. 15, if UE 201 may beset to receive the update, the AMF 208 sends UE configuration update via RAN.

Figure 4:
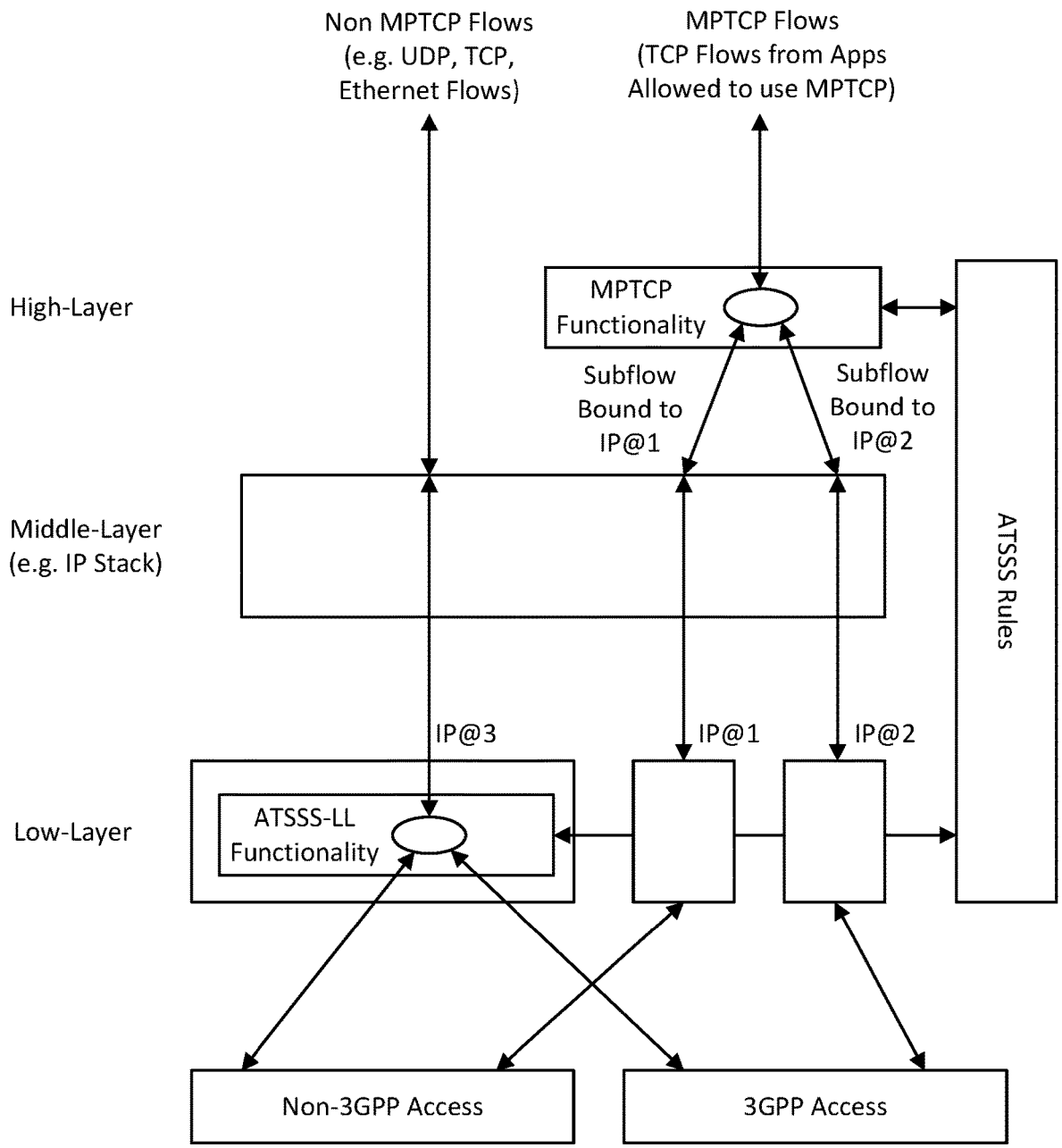
FIG. 4 illustrates exemplary steering functionalities in a UE model.
Figure 5:
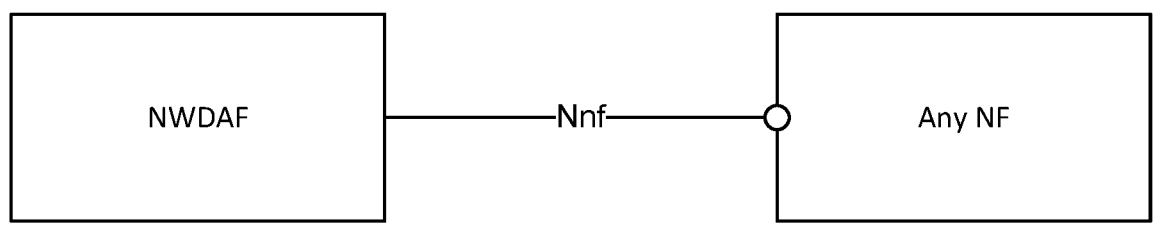
FIG. 5 illustrates an exemplary Data Collection architecture from any NF.

Step 267 of FIG. 15 and Step 268 of FIG. 15 is similar to Step 4-Step 5 of FIG. 4.2.4.3-1 of TS 23.502 [2] except for the significant subject matter that in the policy container, PCF 209 include UE data collection rules and policies.

The UE configuration update for UE data collection rules and policies may be updated frequently and triggered by previously configured UE data collection policies. For example, UE's battery may have drained much faster than normal within a given period. For instance, the NWDAF 205 may analyze that it is unusual for UE 201 to have battery percentage below UE's daily average between 30% and 60% within 30 minutes. At the same time, UE 201 may be using a non-3GPP access type, requesting services too frequently during a time, at the time slot of the day when UE traffic is usually thin. These events may then trigger the collection of certain data the UE 201 provides to NWDAF 205. For instance, NWDAF 205 may come across a case where it may need other sensor data, or the frequency of data collection may need to be different than the previously configured data collection policies. Hence, the NWDAF 205 could craft an event driven policy to include "event expressions" as discussed previously in that says "if delta in battery level>70%, collect data of all applications in use and with their usage percentages" and send this updated data collection policy to the UE 201 in the policy container using UE Configuration Update procedure.

Figure 16:
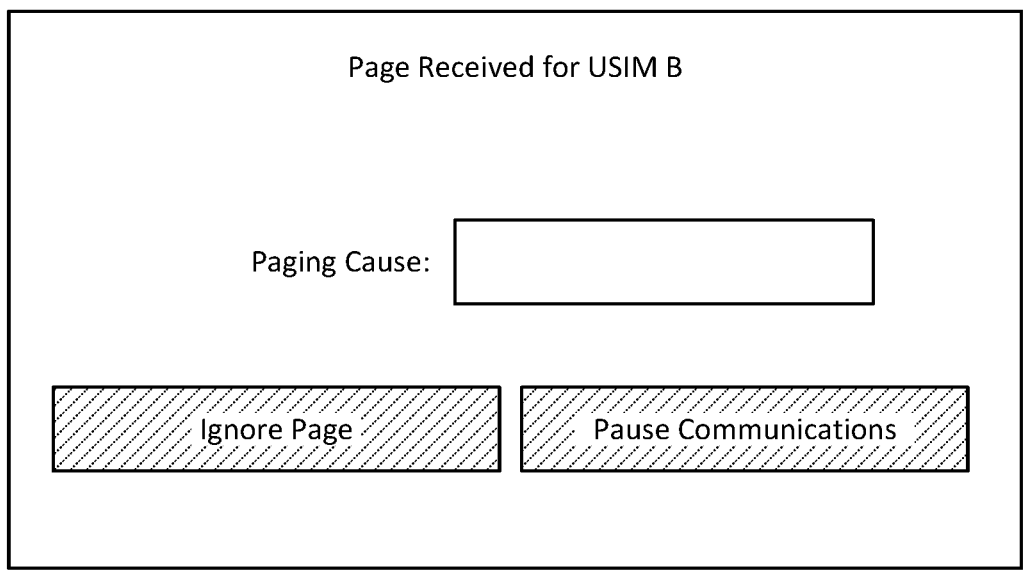
FIG. 16 illustrates an exemplary Example GUI.

FIG. 16 shows an example GUI for the scenario of FIG. 9. The GUI is shown to the user of the UE 201 during step 212 of FIG. 9 after receiving the paging cause from a page for USIM B. The user is given the option to ignore the page and continue with the ongoing activities with USIM A or to request a pause in communications with the network of USIM A. In this case, the user decides to pause the communications with the network of USIM A and presses the Pause Communications button. Operations continue to step 213 and the rest of the steps of FIG. 9 where the UE 201 makes a request to pause the communications with the network of USIM A.

Figure 17:
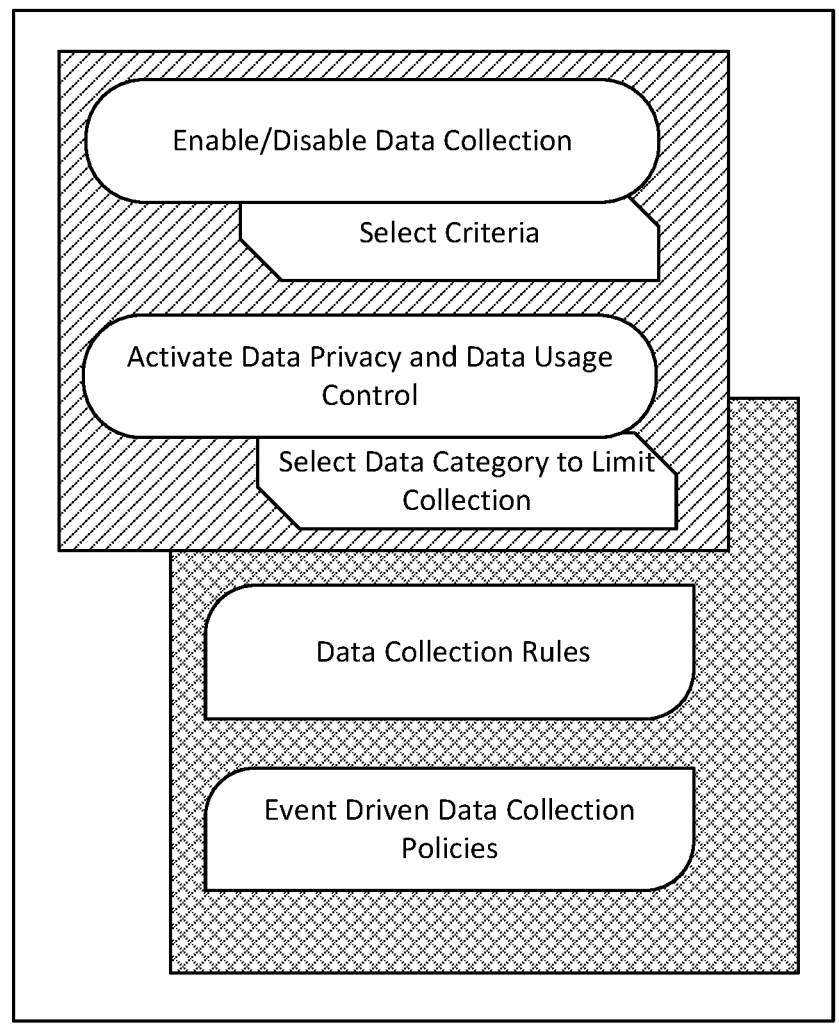
FIG. 17 illustrates and exemplary GUI showing UE application for user privacy and configured data collection policies.

FIG. 17 depicts an example GUI which shows a front end where it provides application for user to enable or disable UE data collection and button to activate data privacy and limit UE data for collection. It further depicts a backend where UE 201 has configured the received data collection rules and event driven data collection policies from the network.

It is understood that the entities performing the steps illustrated herein, such as FIGS. 3, 4, 5, 6, 7, 8A, 8B, 9, 10, and 11, or FIGS. 12, 13, 14, and 15, may be logical entities. The steps may be stored in a memory of, and executing on a processor of, a device, server, or computer system such as those illustrated in FIG. 18C or FIG. 18D. Skipping steps, combining steps, or adding steps between exemplary methods disclosed herein (e.g., FIGS. 3, 8A, 8B, 9, 10, 11, 12, 13,

14, and 15) is contemplated. Table 7 discloses exemplary abbreviations and definitions that may be used herein.

TABLE 7

Abbreviations and Definitions

| Abbreviations | Definitions |
|---|---|
| 3GPP | Third Generation Partnership Project |
| 5GS | 5G System |
| AF | Application Function |
| AMF | Access and Mobility Management Function |
| ATSSS | Access Traffic Steering, Switching, Splitting |
| CDR | Charging Data Record |
| CN | Core Network |
| DL | Downlink |
| FAR | Forwarding Action Rule |
| GBR | Guarantee Bit Rate |
| GUI | Graphical User Interface |
| IP | Internet Protocol |
| MAR | Multi-Access Rule |
| MNO | Mobile Network Operator |
| NAS | Non-Access Stratum |
| NF | Network Function |
| OAM | Operation Administration and Maintenance |
| PCC | Policy Charging and Control |
| PCF | Policy Control Function |
| PDU | Protocol Data Unit |
| PLMN | Public Land Mobile Network |
| PMF | Performance Measurement Function |
| QoS | Quality of Service |
| RAN | Radio Access Network |
| RRC | Radio Resource Control |
| RTT | Round Trip Time |
| SID | Study Item Description |
| SIM | Subscriber Identity Module |
| SMF | Session Management Function |
| SUPI | Subscription Permanent Identifier |
| UDCC | UE Data Collection Capability |
| UDM | Unified Data Management |
| UE | User Equipment |
| UL | Uplink |
| UL-CL | Uplink Classifier |
| UP | User Plane |
| UPF | User Plane Function |
| URSP | User Route Selection Policy |
| USIM | Universal Subscriber Identity Module |

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 18A:
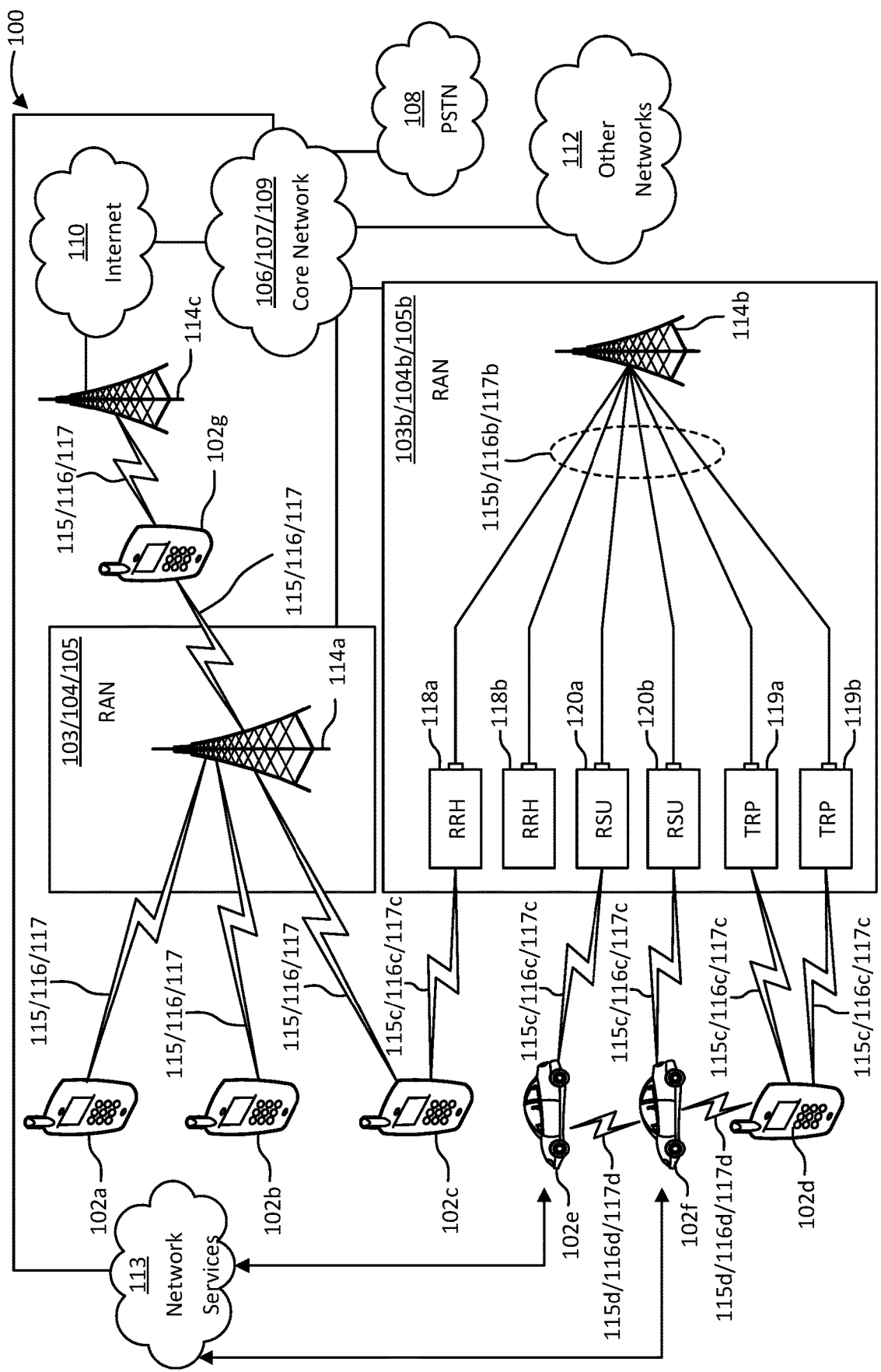
FIG. 18A illustrates an example communications system.

FIG. 18A illustrates an example communications system 100 in which the methods and apparatuses of traffic steering enhancements for cellular networks, such as the systems and methods illustrated in FIG. 1 through FIG. 11 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 18A, 18B, 18C, 18D, 18E, or 18F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 18A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of traffic steering enhancements for cellular networks, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 18A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of traffic steering enhancements for cellular networks, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 18A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over Internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 18A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of traffic steering enhancements for cellular networks, as disclosed herein. For example, the WTRU 102g shown in FIG. 18A may be configured to communicate with the base station 114a, which may employ a cellular-based radio technology, and with the base station 114c, which may employ an IEEE 802 radio technology.

Although not shown in FIG. 18A, it will be appreciated that a User Equipment may make a wired connection to a gateway. The gateway may be a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115c/116c/117c may equally apply to a wired connection.

Figure 18B:
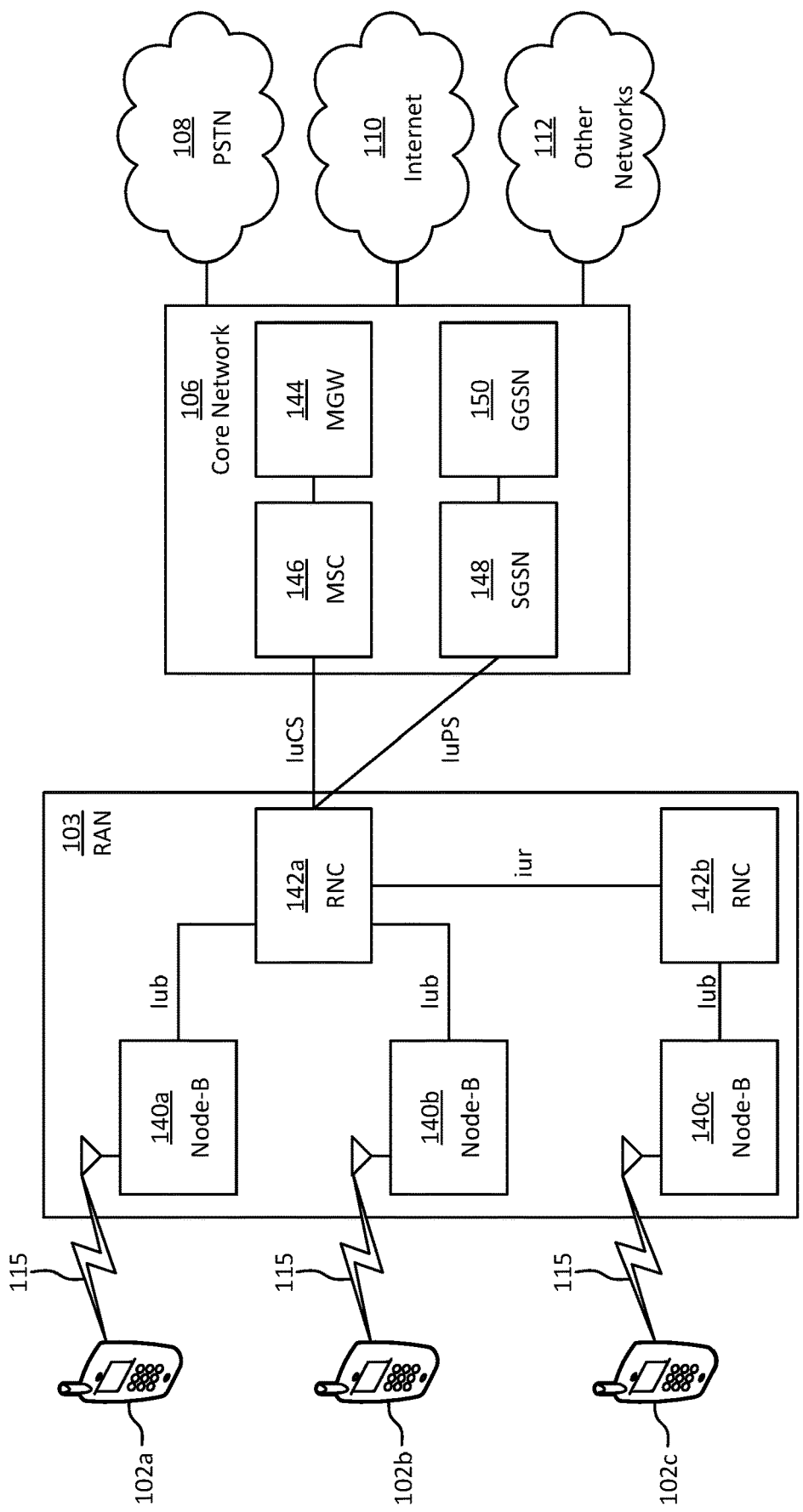
FIG. 18B illustrates an exemplary system that includes RANs and core networks.

FIG. 18B is a system diagram of an example RAN 103 and core network 106 that may implement methods, systems, and devices of traffic steering enhancements for cellular networks, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 18B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 18B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 18B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 18C:
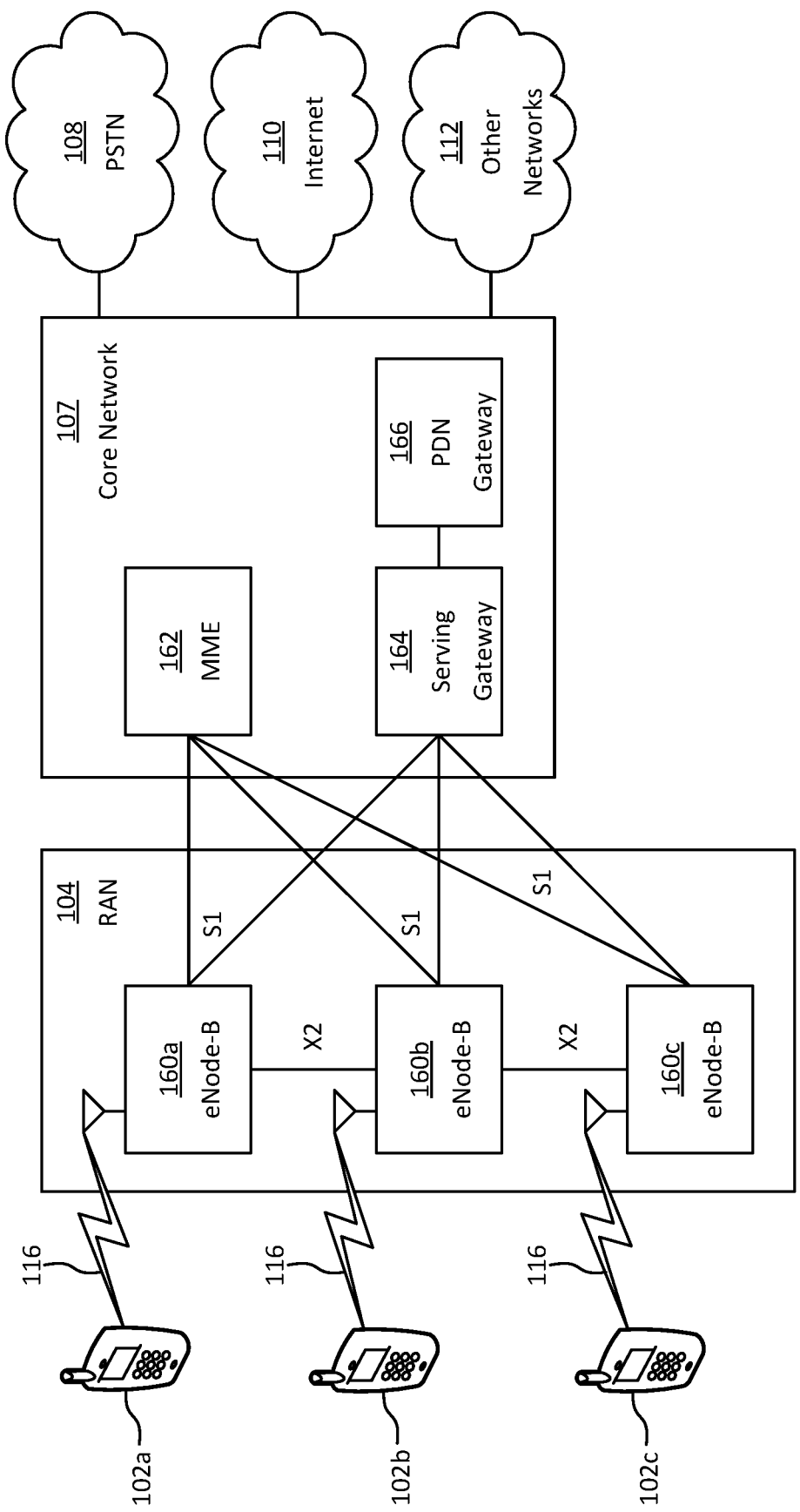
FIG. 18C illustrates an exemplary system that includes RANs and core networks.

FIG. 18C is a system diagram of an example RAN 104 and core network 107 that may implement methods, systems, and devices of traffic steering enhancements for cellular networks, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 18C, the eNode-Bs 160a, 160b, and 160c may communicate with one another over an X2 interface.

The core network 107 shown in FIG. 18C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 18D:
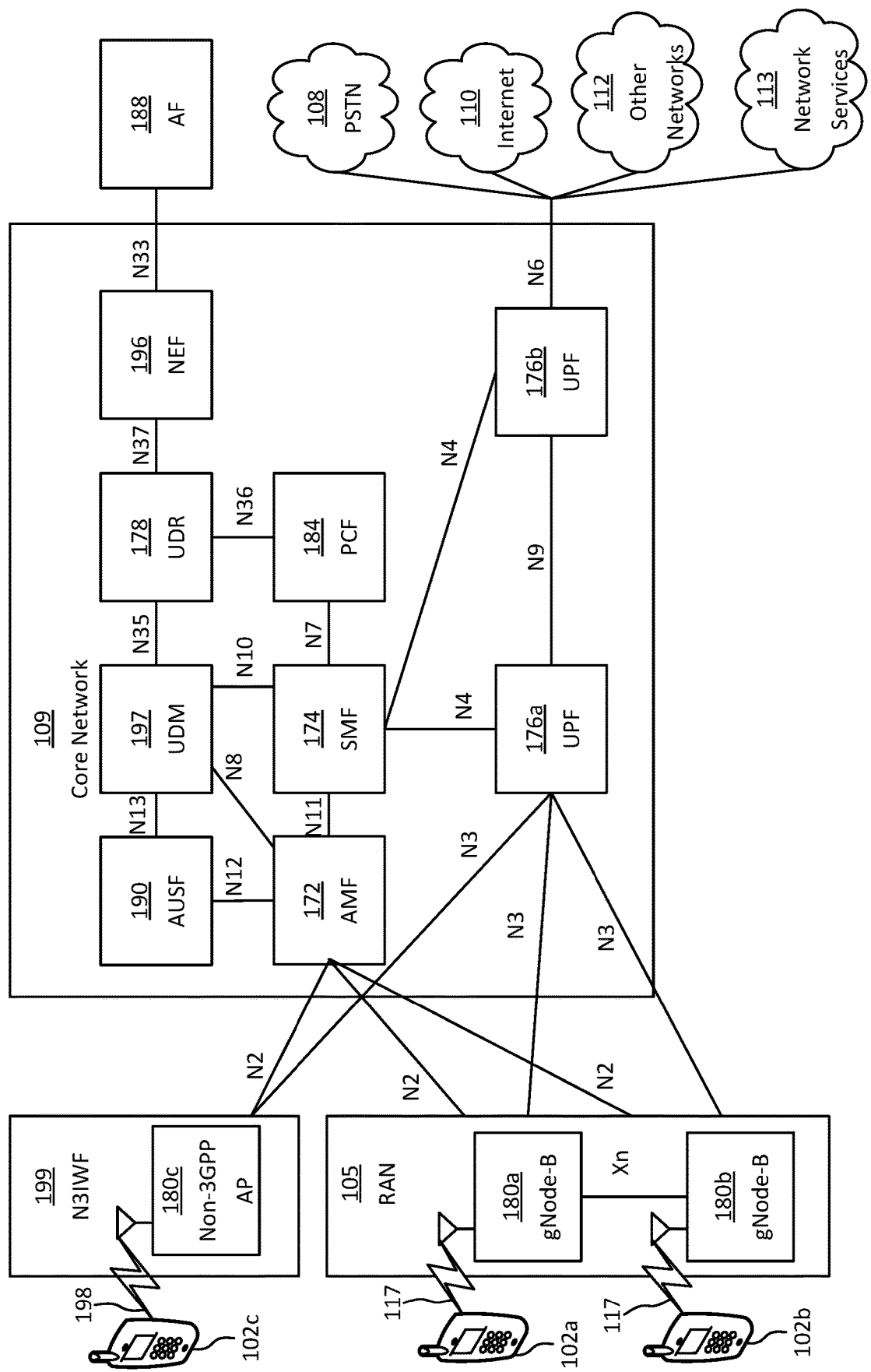
FIG. 18D illustrates an exemplary system that includes RANs and core networks.

FIG. 18D is a system diagram of an example RAN 105 and core network 109 that may implement methods, systems, and devices of traffic steering enhancements for cellular networks, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 18D, the gNode-Bs 180a and 180b may communicate with one another over an Xn interface, for example.

The core network 109 shown in FIG. 18D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 18G.

In the example of FIG. 18D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 18D shows that network functions directly connect with one another, however, it should be appreciated that they may communicate via routing agents such as a diameter routing agent or message buses.

In the example of FIG. 18D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 18D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 18D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 18D, in a network slicing scenario, a WTRU 102a, 102b, or 102c may connect with an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 18A, 18C, 18D, or 18E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 18A, 18B, 18C, 18D, or 18E are provided by way of example only, and it is understood that the subject matter disclosed and claimed herein may be embodied or implemented in any similar communication system, whether presently defined or defined in the future.

Figure 18E:
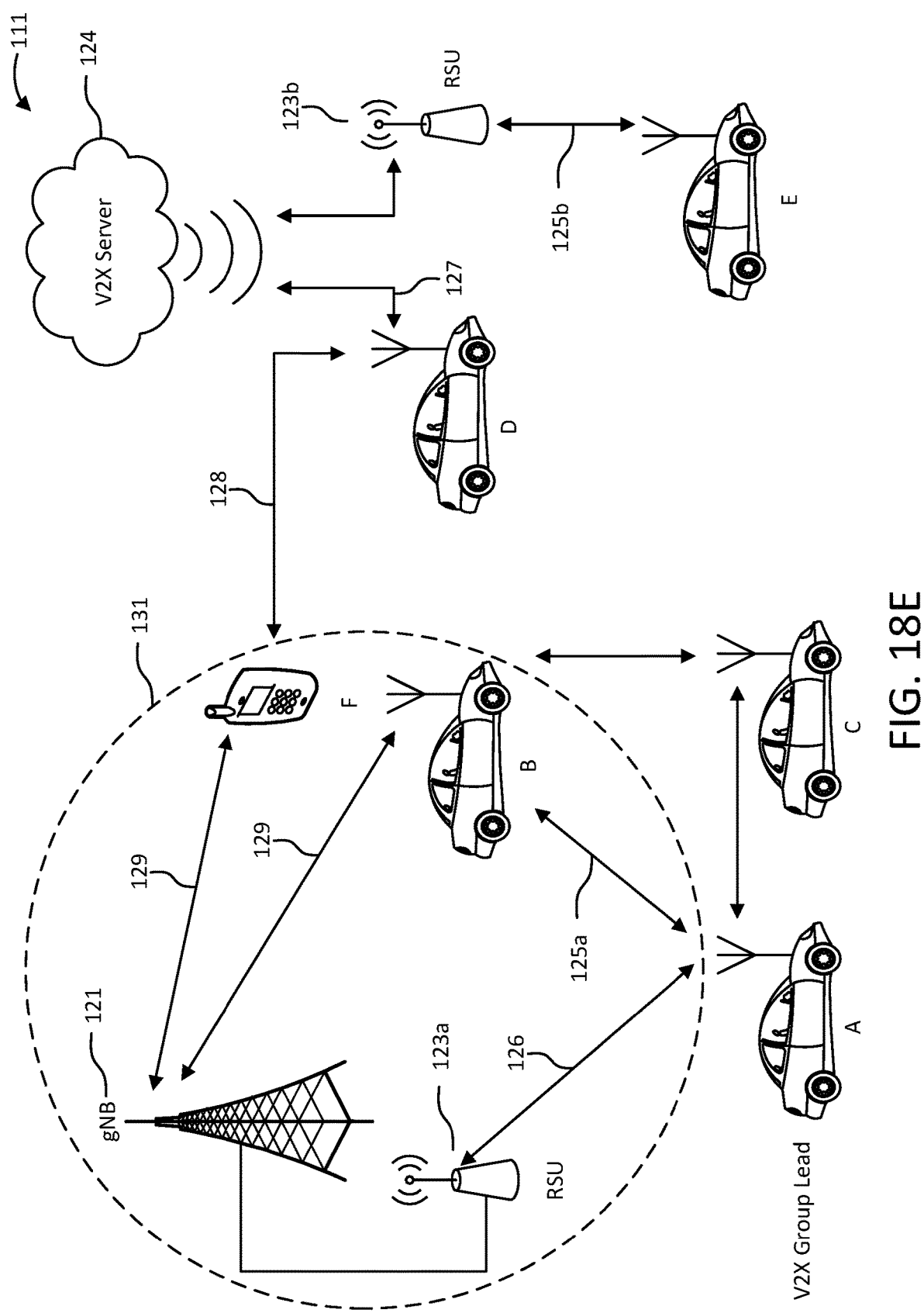
FIG. 18E illustrates another example communications system.

FIG. 18E illustrates an example communications system 111 in which the systems, methods, apparatuses that implement traffic steering enhancements for cellular networks, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 18E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 18E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 18F:
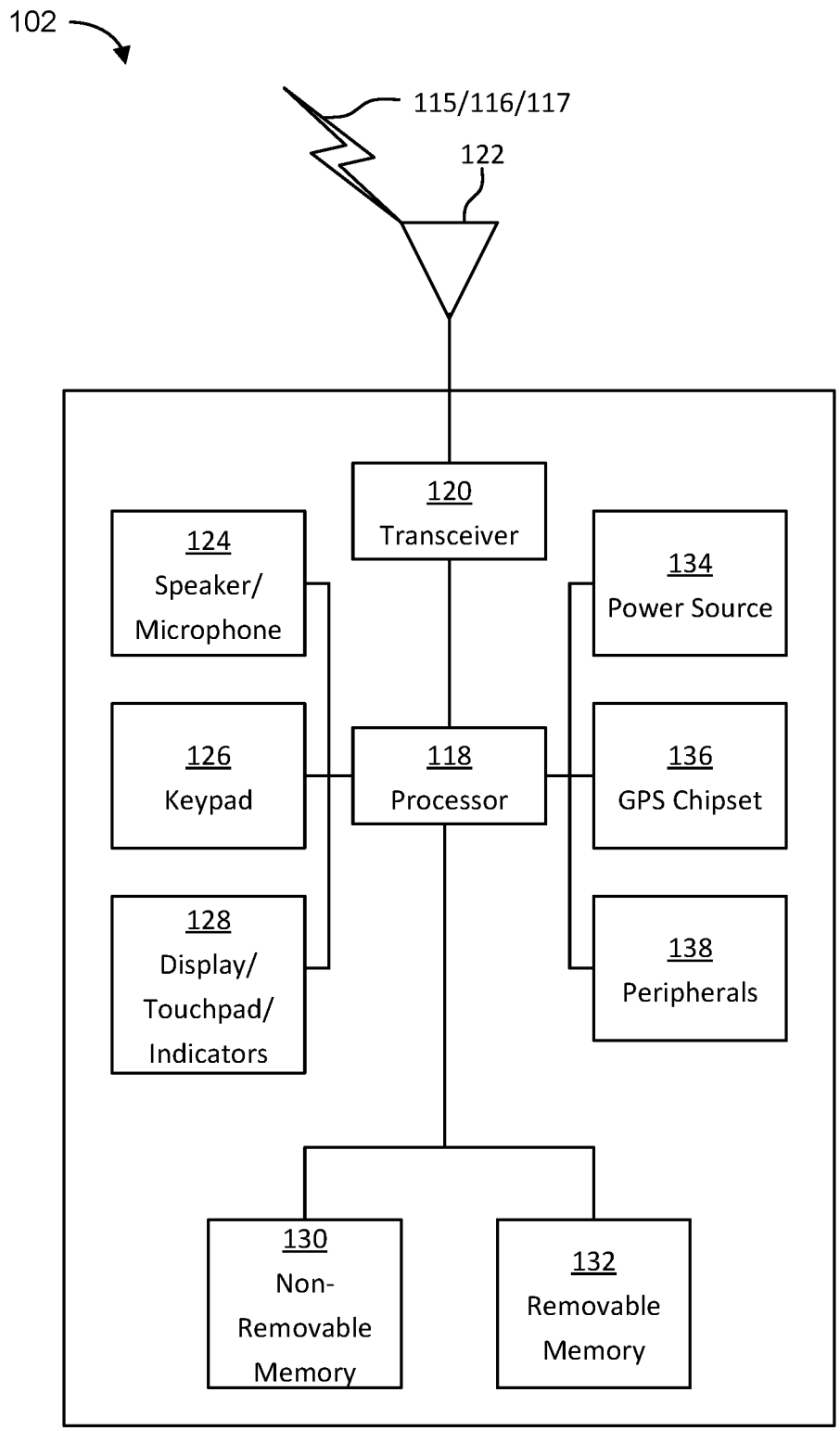
FIG. 18F is a block diagram of an example apparatus or device, such as a WTRU.

FIG. 18F is a block diagram of an example apparatus or device WTRU 102 that may be configured for wireless communications and operations in accordance with the systems, methods, and apparatuses that implement traffic steering enhancements for cellular networks, described herein, such as a WTRU 102 of FIG. 18A, 18B, 18C, 18D, or 18E, or FIGS. 3, 4, 5, 6, 7, 8, 9, 10, and 11 (e.g., UEs). As shown in FIG. 18F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 18F and may be an exemplary implementation that performs the disclosed systems and methods for traffic steering enhancements for cellular networks described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 18F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 18A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 18F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the traffic steering enhancements for cellular networks in some of the examples described herein are successful or unsuccessful, or otherwise indicate a status of traffic steering enhancements for cellular networks and associated components. The control lighting patterns, images, or colors on the display or indicators 128 may be reflective of the status of any of the method flows or components in the FIG.'s illustrated or discussed herein (e.g., FIGS. 3, 8A, 8B, 9, 10, and 11, etc.). Disclosed herein are messages and procedures of traffic steering enhancements for cellular networks. The messages and procedures may be extended to provide interface/API for users to request resources via an input source (e.g., speaker/microphone 124, keypad 126, or display/touchpad/indicators 128) and request, configure, or query traffic steering enhancements for cellular networks related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 18G:
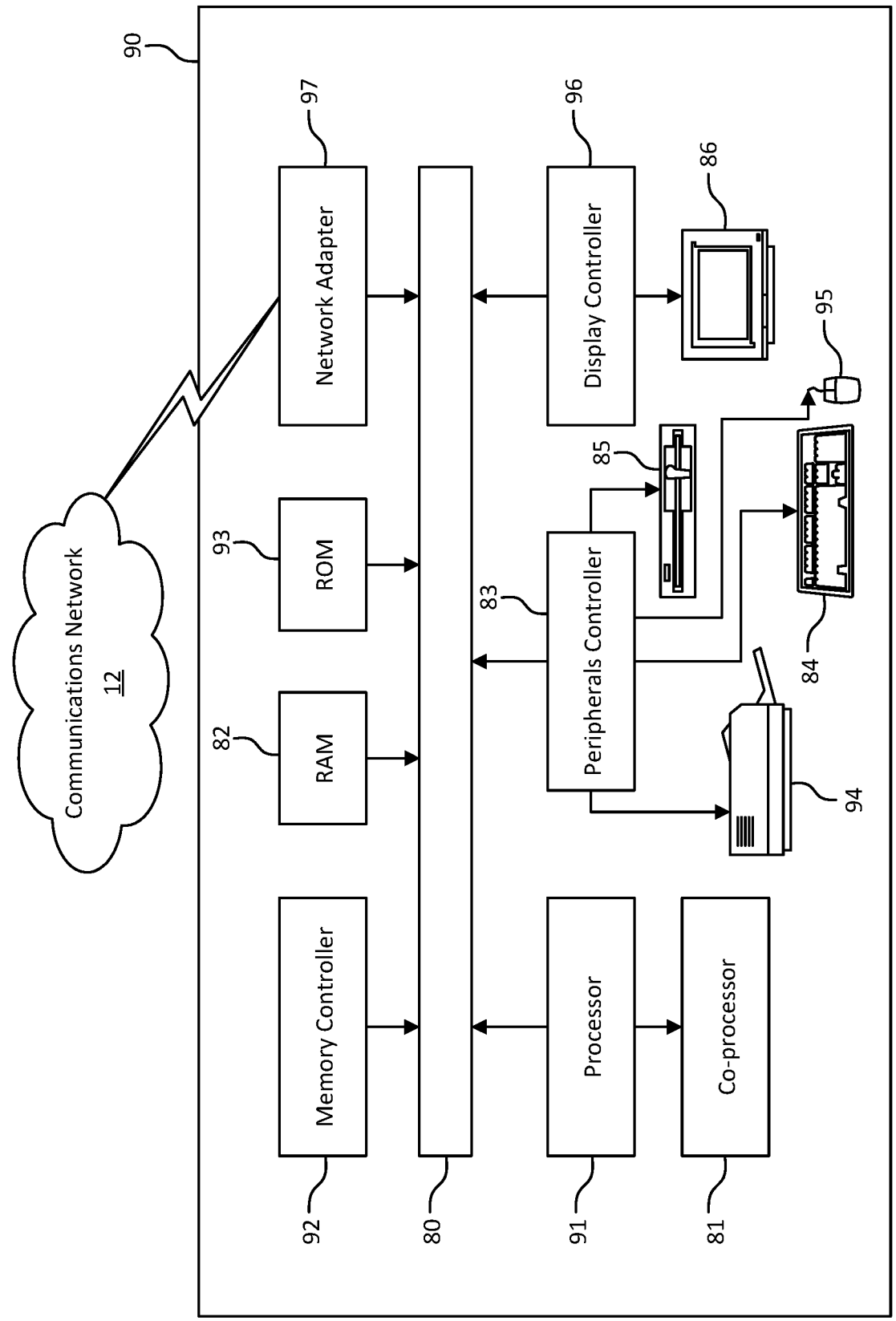
FIG. 18G is a block diagram of an exemplary computing system.

FIG. 18G is a block diagram of an exemplary computing system 90 in which one or more apparatuses of the communications networks illustrated in FIGS. 18A, 18C, 18D and 18E as well as traffic steering enhancements for cellular networks, such as the systems and methods illustrated in FIG. 3 through FIG. 16 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for traffic steering enhancements for cellular networks, such as receiving message over the control plane or user plane.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 18A, 18B, 18C, 18D, or 18E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—traffic steering enhancements for cellular networks—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for means for traffic steering enhancements for cellular networks. Methods, systems, and apparatuses, among other things, as described herein may provide for UE includes analytics reporting capability indicator in a request message to the network; the network generates a data analytics collection policy; the network returns the data analytics collection policy in the response to the UE; and UE reports data for analytics purposes using the PMF protocol. UE sends a pause request to a user plane function of the CN; the request is forwarded to a session management entity and a mobility management function; the mobility management function determines whether to enable the suspension of communications and returns session information of other UE sessions impacted by the suspension to the session management entity; session management entity notifies user plane functions of the suspension for all sessions associated with the UE; and user plane function returns the status of the pause request to the UE 201. UE informs core network that UE supports providing data for analytics and has traffic steering capability; Core network generates and returns to UE a data analytics reporting policy; UE dynamically steers UL traffic between 3GPP and non-3GPP access based on performance measurements obtained by the UE; and core network dynamically steers DL traffic to UE between 3GPP and non-3GPP access based on analytics information provided by analytics function. UE creates a PDU session for a first USIM over a first access network with a multi-USIM indicator or a temporary identifier of a second USIM; UE creates a PDU session for a second USIM over a second access network with a multi-USIM indicator, a temporary identifier of a first USIM, and optionally a PDU session identifier associated with the first USIM; depending on access network availability, the network steers data traffic for a first USIM to the access network of a second USIM and vice versa; and depending on access network availability, the UE steers data traffic for a first USIM to the access network of a second USIM and vice versa. All combinations in this paragraph and below paragraph (including the removal or addition of steps) are contemplated in a manner that is consistent with the detailed description.

Methods, systems, and apparatuses, among other things, as described herein may provide for means for traffic steering enhancements for cellular networks. Data collected may be enhanced for other purposes as well, for example actions NWDAF can take based on the generated analytics and impacts to other NFs and the UE. Methods, systems, and apparatuses, among other things, as described herein may provide for sending, by a user equipment, a first message, the first message may inform the core network (e.g., server of the core network) that the user equipment is available or capable to collect or transmit data for (e.g., to be used in) analytics; in response to sending the first message, receiving, by the user equipment, a second message, the second message may include an acknowledgement of the first message or an indication of a policy to use for collecting the data for analytics for a period, wherein the policy may be sent in the second message or a subsequent message, retrieved from another network device, or preconfigured on the user equipment; based on the second message (e.g., based on the indication of the policy or threshold met for information of Tables, such as Table 2), collecting the data for the analytics; and based on a trigger (e.g., time period as passed, an event occurred, threshold met for information of Tables, such as Table 2), sending the data for analytics to the network for processing for the analytics. Methods, systems, and apparatuses, among other things, as described herein may provide for receiving, by a network device, a first message, the first message indicating that the user equipment is available or capable to collect UE specific data to be used for analytics for the core network; in response to receiving the first message, sending, by the user equipment, a second message to the user equipment, the second message comprising an indication of a policy for the user equipment to use for collecting the data for analytics for a period, wherein the policy may be sent in the second message or a subsequent message or preconfigured on the user equipment; receiving the collected data for the analytics; and using the collected data for analytics. The first message may be a registration request or a PDU session establishment request. The policy may provide an indication of a time schedule or an occurrence of a predefined event that triggers collecting the data for the analytics. Table 5 lists attributes for scheduled data collection. Table 6 describes Attributes for Event Driven Data Collection. The policy may provide for an indication that the data collection request may be received from the core network at any time and that data request triggers collecting the data for the analytics. The first message may be a request message usually used for connecting with an access network. The first message may include particular capabilities of the user equipment to collect types of data or how often data can be collected. Methods, systems, and apparatuses, among other things, as described herein may provide for receiving a first message from a user equipment, the first message indicating that the user equipment is capable of collecting data for analytics; in response to the first message, sending a second message, the second message comprising an indication of a policy to use by the user equipment for collecting the data for analytics; and receiving, based on a trigger, data from the user equipment for processing for the analytics, the data being collected by the user equipment based on the second message. The policy may provide an indication of a time schedule or an occurrence of a predefined event that triggers collecting the data for the analytics All combinations in this paragraph and previous paragraph (including the removal or addition of steps) are contemplated in a manner that is consistent with the detailed description.

What is claimed:

1. A user equipment comprising:
a processor; and
a memory, coupled with the processor, configured to store instructions,
wherein the processor is configured to execute the instructions stored in the memory to:
transmit a first message to a cellular network, wherein the first message comprises information associated with a plurality of capabilities of the user equipment, and the plurality of capabilities of the user equipment is associated
with data collection;
receive a second message based on the transmission of the first message, wherein
the second message comprises an indication of a policy;
collect specific data based on the policy and the second message, wherein the data collection corresponds to the collection of the specific data;
receive performance measurements based on a performance measurement function (PMF), wherein the PMF is associated with the user equipment; and
transmit, based on a trigger, the specific data to the cellular network, wherein the trigger is based on the received performance measurements.

2. The user equipment of claim 1, wherein the second message further comprises the policy.

3. The user equipment of claim 1, wherein the user equipment includes the policy.

4. The user equipment of claim 1, wherein the first message is one of a registration request or a packet data unit (PDU) session establishment request.

5. The user equipment of claim 1, wherein
the plurality of capabilities is associated with at least one of the collection of the specific data, types of the specific data, or a frequency of the collection of the specific.

6. The user equipment of claim 1, wherein
the policy includes an indication of at least one of a time schedule of a specific event or an occurrence of the specific event, and
the specific event triggers the data collection.

7. The user equipment of claim 1, wherein
the processor is further configured to receive a data collection request from a core network,
the policy includes an indication of the reception of the data collection request, and
the data collection request triggers the data collection.

8. The user equipment of claim 1, wherein
the policy includes an indication of threshold battery level, and
the threshold battery level triggers the data collection.

9. The user equipment of claim 1, wherein
the policy includes an indication of a threshold number of handovers, and
the threshold number of handovers triggers the data collection.

10. The user equipment of claim 1, wherein
the policy includes an indication of a threshold number of packet data unit sessions, and
the threshold number of packet data unit sessions triggers the data collection.

11. A method, comprising:
transmitting a first message to a cellular network, wherein
the first message comprises information associated with a plurality of capabilities of a user equipment, and
the plurality of capabilities of the user equipment is associated with a data collection;
receiving a second message based on the transmission of the first message, wherein
the second message comprises an indication of a policy;
collecting specific data based on the policy and the second message, wherein the data collection corresponds to the collection of the specific data;
receiving performance measurements based on a performance measurement function (PMF), wherein the PMF is associated with the user equipment; and
transmitting, based on a trigger, the specific data to the cellular network, wherein the trigger is based on the received performance measurements.

12. The method of claim 11, wherein the first message is one of a registration request or a packet data unit (PDU) session establishment request.

13. The method of claim 11, wherein
the policy includes an indication of a threshold number of handovers, and the threshold number of handovers triggers the data collection.

14. The method of claim 11, wherein the second message further comprises the policy.

15. The method of claim 11, wherein the user equipment includes the policy.

16. The method of claim 11, wherein
the plurality of capabilities is associated with at least one of the collection of the specific data, types of the specific data, or a frequency of the collection of the specific.

17. The method of claim 11, wherein
the policy includes an indication of a time schedule of a specific event or an occurrence of the specific event, and
the specific event triggers the data collection.

18. A method, comprising:
receiving a first message from a user equipment, wherein
the first message that comprises information associated with a plurality of capabilities of the user equipment, and
the plurality of capabilities of the user equipment is associated with a data collection;
transmitting, to the user equipment, a second message based on the reception of the first message, wherein
the second message comprises an indication of a policy;
transmitting, to the user equipment, performance measurements based on a performance measurement function (PMF), wherein the PMF is associated with the user equipment; and
receiving, based on a trigger, specific data from the user equipment, wherein
the user equipment collects the specific data based on the second message and the policy,
the data collection corresponds to the collection of the specific data, and
the trigger is based on the performance measurements.

19. The method of claim 18, wherein the first message is a packet data unit (PDU) session establishment request.

20. The method of claim 18, wherein
the policy includes an indication of at least one of a time schedule of a specific event or an occurrence of the specific event, and
the specific event triggers the data collection.

* * * * *